US008843371B2

(12) United States Patent
Levien et al.

(10) Patent No.: US 8,843,371 B2
(45) Date of Patent: Sep. 23, 2014

(54) SPEECH RECOGNITION ADAPTATION SYSTEMS BASED ON ADAPTATION DATA

(75) Inventors: Royce A. Levien, Lexington, MA (US); Richard T. Lord, Tacoma, WA (US); Robert W. Lord, Seattle, WA (US); Mark A. Malamud, Seattle, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 13/564,649

(22) Filed: Aug. 1, 2012

(65) Prior Publication Data

US 2014/0039881 A1 Feb. 6, 2014

Related U.S. Application Data

(63) Continuation of application No. 13/564,647, filed on Aug. 1, 2012, and a continuation-in-part of application No. 13/564,651, filed on Aug. 1, 2012, and a continuation-in-part of application No. 13/564,650, filed on Aug. 1, 2012, and a continuation-in-part of application No. 13/538,866, filed on Jun. 29, 2012, and a continuation-in-part of application No. 13/538,855, filed on Jun. 29, 2012, and a continuation-in-part of application No. 13/485,738, filed on May 31, 2012, and a continuation-in-part of application No. 13/485,733, filed on May 31, 2012.

(51) Int. Cl.
*G10L 15/00* (2013.01)
*G10L 15/06* (2013.01)

(52) U.S. Cl.
USPC ............................ 704/244; 704/243; 704/231

(58) Field of Classification Search
USPC .................................................. 704/231–257
See application file for complete search history.

(56) References Cited

U.S. PATENT DOCUMENTS

| 7,162,414 | B2* | 1/2007 | Stanford ........................ 704/201 |
| 7,194,409 | B2* | 3/2007 | Balentine et al. ............. 704/253 |
| 7,219,058 | B1* | 5/2007 | Rose et al. .................... 704/238 |
| 8,082,147 | B2 | 12/2011 | Parthasarathy et al. |
| 2002/0147579 | A1* | 10/2002 | Kushner et al. ............... 704/207 |
| 2002/0188446 | A1* | 12/2002 | Gao et al. ...................... 704/240 |
| 2003/0088421 | A1* | 5/2003 | Maes et al. ................. 704/270.1 |
| 2003/0191639 | A1* | 10/2003 | Mazza .......................... 704/231 |
| 2004/0199388 | A1* | 10/2004 | Armbruster et al. .......... 704/251 |
| 2008/0015848 | A1 | 1/2008 | Arizmendi et al. |
| 2009/0063144 | A1* | 3/2009 | Rose et al. .................... 704/236 |
| 2009/0265217 | A1* | 10/2009 | Aurenz ........................... 705/10 |
| 2009/0290689 | A1* | 11/2009 | Watanabe et al. .......... 379/88.01 |
| 2010/0283829 | A1 | 11/2010 | De Beer et al. |
| 2011/0029307 | A1* | 2/2011 | Parthasarathy et al. ....... 704/231 |
| 2012/0014568 | A1 | 1/2012 | Conwell et al. |

OTHER PUBLICATIONS

PCT International Search Report; International App. No. PCT/US13/48640; Jan. 14, 2014; pp. 1-2.

* cited by examiner

*Primary Examiner* — Jesse Pullias

(57) ABSTRACT

The instant application includes computationally-implemented systems and methods that include managing adaptation data, the adaptation data is at least partly based on at least one speech interaction of a particular party, facilitating transmission of the adaptation data to a target device when there is an indication of a speech-facilitated transaction between the target device and the particular party, such that the adaptation data is to be applied to the target device to assist in execution of the speech-facilitated transaction, and facilitating acquisition of adaptation result data that is based on at least one aspect of the speech-facilitated transaction and to be used in determining whether to modify the adaptation data. In addition to the foregoing, other aspects are described in the claims, drawings, and text.

38 Claims, 56 Drawing Sheets

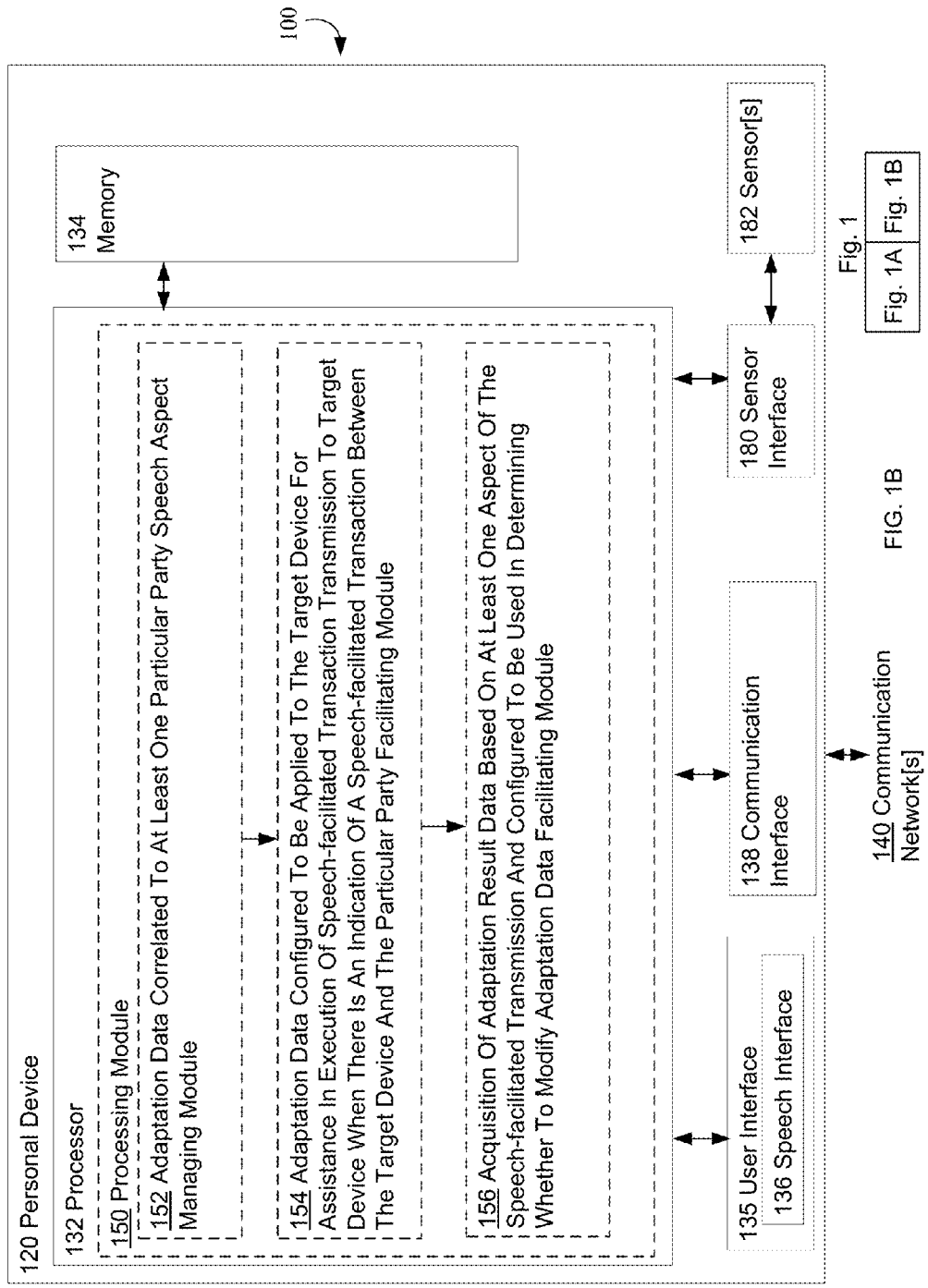

152 Adaptation Data Correlated To At Least One Particular Party Speech Aspect Managing Module

| 238 Adaptation Data Correlated To At Least One Particular Party Speech Aspect Storing Module | 240 Adaptation Data Correlated To At Least One Particular Party Speech Aspect Access Controlling Module | 242 Adaptation Data Correlated To At Least One Characteristic Of Particular Party Speech Managing Module | 244 Adaptation Data Comprising Instructions For Adapting A Speech Recognition Component For Processing A Portion Of The Speech Facilitated Transaction Managing Module | 246 Adaptation Data Comprising Instructions For Updating A Speech Recognition Component For Processing A Portion Of The Speech Facilitated Transaction Managing Module | 248 Adaptation Data Comprising Instructions For Supplementing A Speech Recognition Component For Processing A Portion Of The Speech Facilitated Transaction Managing Module |

Fig. 2

| Fig. 2A | Fig. 2B | Fig. 2C | Fig. 2D | Fig. 2E | Fig. 2F | Fig. 2G |

FIG. 2C

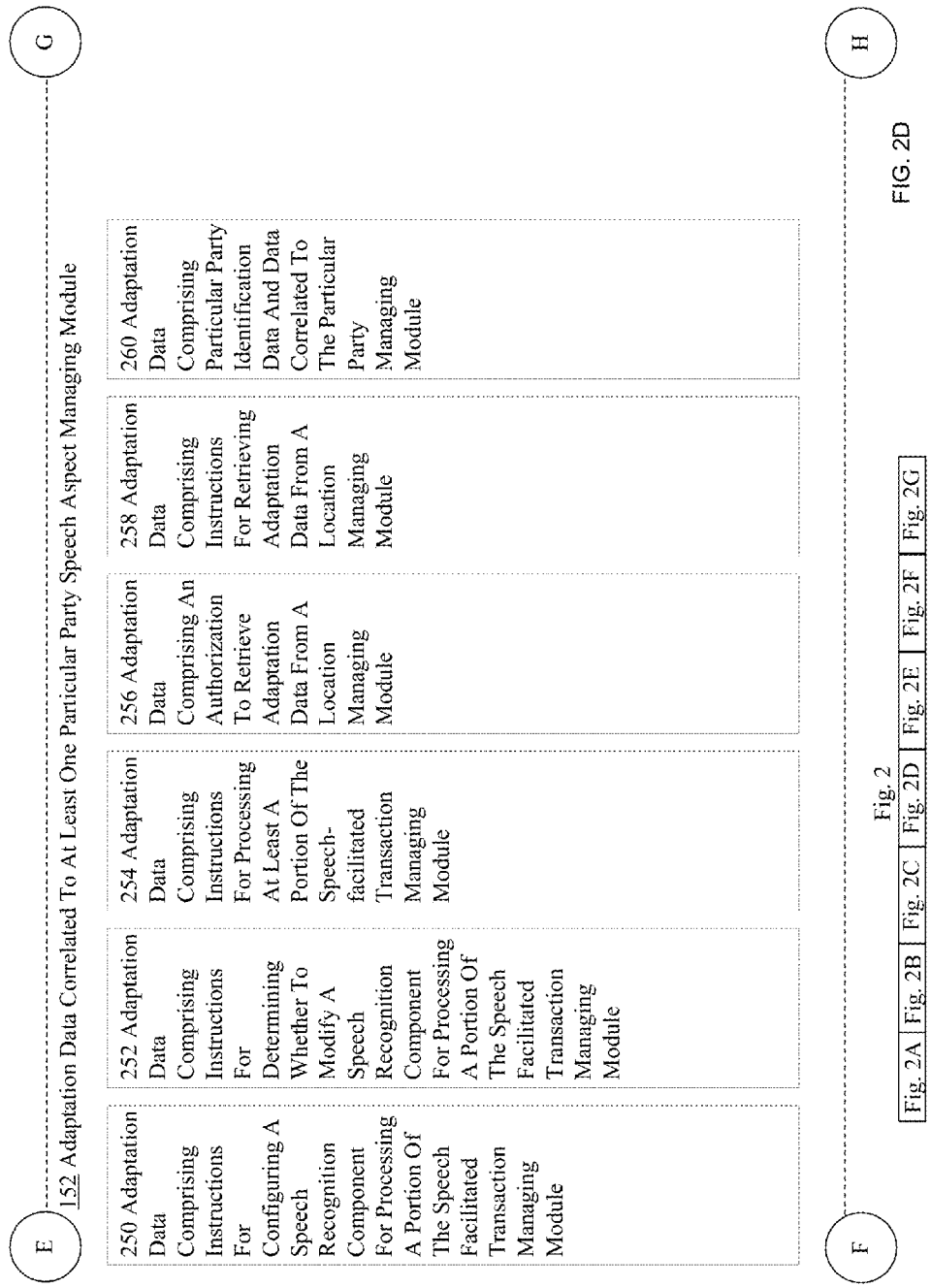

152 Adaptation Data Correlated To At Least One Particular Party Speech Aspect Managing Module 262 Adaptation Data At Least Partly Based On At Least One Particular Party Speech Interaction With A Particular Device Managing Module 264 Adaptation Data At Least Partly Based On At Least One Particular Party Speech Interaction With A Smartphone Managing Module 266 Adaptation Data At Least Partly Based On At Least One Particular Party Speech Interaction With A Further Party Using A Smartphone Managing Module 268 Adaptation Data At Least Partly Based On At Least One Particular Party Speech Interaction To Operate A Smartphone Managing Module 270 Adaptation Data Comprising Instructions For Processing At Least A Portion Of The Speech-facilitated Transaction Managing Module 272 Adaptation Data Comprising Data Linking Particular Party Pronunciation Of One Or More Phonemes To One Or More Concepts Managing Module 274 Adaptation Data Comprising Data Linking Particular Party Pronunciation Of One Or More Audibly Distinguishable Sounds To One Or More Concepts Managing Module 276 Adaptation Data Comprising One Or More Particular Party Speech Characteristics Managing Module

FIG. 2E

| Fig. 2A | Fig. 2B | Fig. 2C | Fig. 2D | Fig. 2E | Fig. 2F | Fig. 2G |

Fig. 2

| Fig. 2A | Fig. 2B | Fig. 2C | Fig. 2D | Fig. 2E | Fig. 2F | Fig. 2G |

154 Adaptation Data Configured To Be Applied To The Target Device For Assistance In Execution Of Speech-facilitated Transmission To Target Device When There Is An Indication Of A Speech-facilitated Transaction Between The Target Device And The Particular Party Facilitating Module 302 Adaptation Data Configured To Be Applied To The Automated Airline Ticket Counter For Assistance In Execution Of Speech-facilitated Transmission To Target Device When There Is An Indication Of A Speech-facilitated Transaction Between The Target Device And The Particular Party Facilitating Module 304 Adaptation Data Configured To Be Applied To The Automated Airline Ticket Counter For Assistance In Execution Of Speech-facilitated Transmission To Target Device Upon Detection Of An Indication From The Automated Airline Ticket Counter Of A Speech-facilitated Transaction Between The Target Device And The Particular Party Facilitating Module 306 Adaptation Data Configured To Be Applied To The Automated Airline Ticket Counter For Assistance In Execution Of Speech-facilitated Transaction Transmission To Target Device Upon Indication From The Automated Airline Ticket Counter That The Particular Party Has Pressed A Button On The Automated Airline Ticket Counter Facilitating Module 308 Adaptation Data Configured To Be Applied To The Automated Airline Ticket Counter For Assistance In Execution Of Speech-facilitated Transaction Transmission To Target Device Upon Indication From The Automated Airline Ticket Counter That The Particular Party Has Pressed A Button Indicating A Request To Carry Out At Least A Portion Of The Transaction Using Speech Facilitating Module 310 Adaptation Data Comprising A Training Set Of At Least One Word And Pronunciation For Assistance In Execution Of Speech-facilitated Transaction Transmission To Target Device Upon Indication From The Automated Airline Ticket Counter That The Particular Party Has Pressed A Button Indicating A Request To Carry Out At Least A Portion Of The Transaction Using Speech Facilitating Module

Fig. 3

| Fig. 3A | Fig. 3B | Fig. 3C | Fig. 3D | Fig. 3E | Fig. 3F | Fig. 3G | Fig. 3H | Fig. 3I |

FIG. 3A

154 Adaptation Data Configured To Be Applied To The Target Device For Assistance In Execution Of Speech-facilitated Transaction Transmission To Target Device When There Is An Indication Of A Speech-facilitated Transaction Between The Target Device And The Particular Party Facilitating Module

| 312 Adaptation Data Configured To Be Applied To The Target Device For Assistance In Execution Of Speech-facilitated Transaction Transmitting To Target Device When There Is An Indication Of A Speech-facilitated Transaction Between The Target Device And The Particular Party Module | 314 Instruction For Transmitting Adaptation Data Configured To Be Applied To The Target Device For Assistance In Execution Of Speech-facilitated Transaction Transmission To Target Device When There Is An Indication Of A Speech-facilitated Transaction Between The Target Device And The Particular Party Transmitting Module | 316 Instruction For Permitting Access To Adaptation Data By The Target Device For Assistance In Execution Of Speech-facilitated Transaction Transmission To Target Device When There Is An Indication Of A Speech-facilitated Transaction Between The Target Device And The Particular Party Transmitting Module | 318 Adaptation Data Configured To Be Received By The Target Device For Assistance In Execution Of Speech-facilitated Transaction When There Is An Indication Of A Speech-facilitated Transaction Between The Target Device And The Particular Party Broadcasting Module |

| 320 Adaptation Data Configured To Be Received By The Target Device When The Target Device Is In A Capable Range, Said Adaptation Data For Assistance In Execution Of Speech-facilitated Transaction When There Is An Indication Of A Speech-facilitated Transaction Between The Target Device And The Particular Party Broadcasting Module |

Fig. 3

| Fig. 3A | Fig. 3B | Fig. 3C | Fig. 3D | Fig. 3E | Fig. 3F | Fig. 3G | Fig. 3H | Fig. 3I |

FIG. 3B

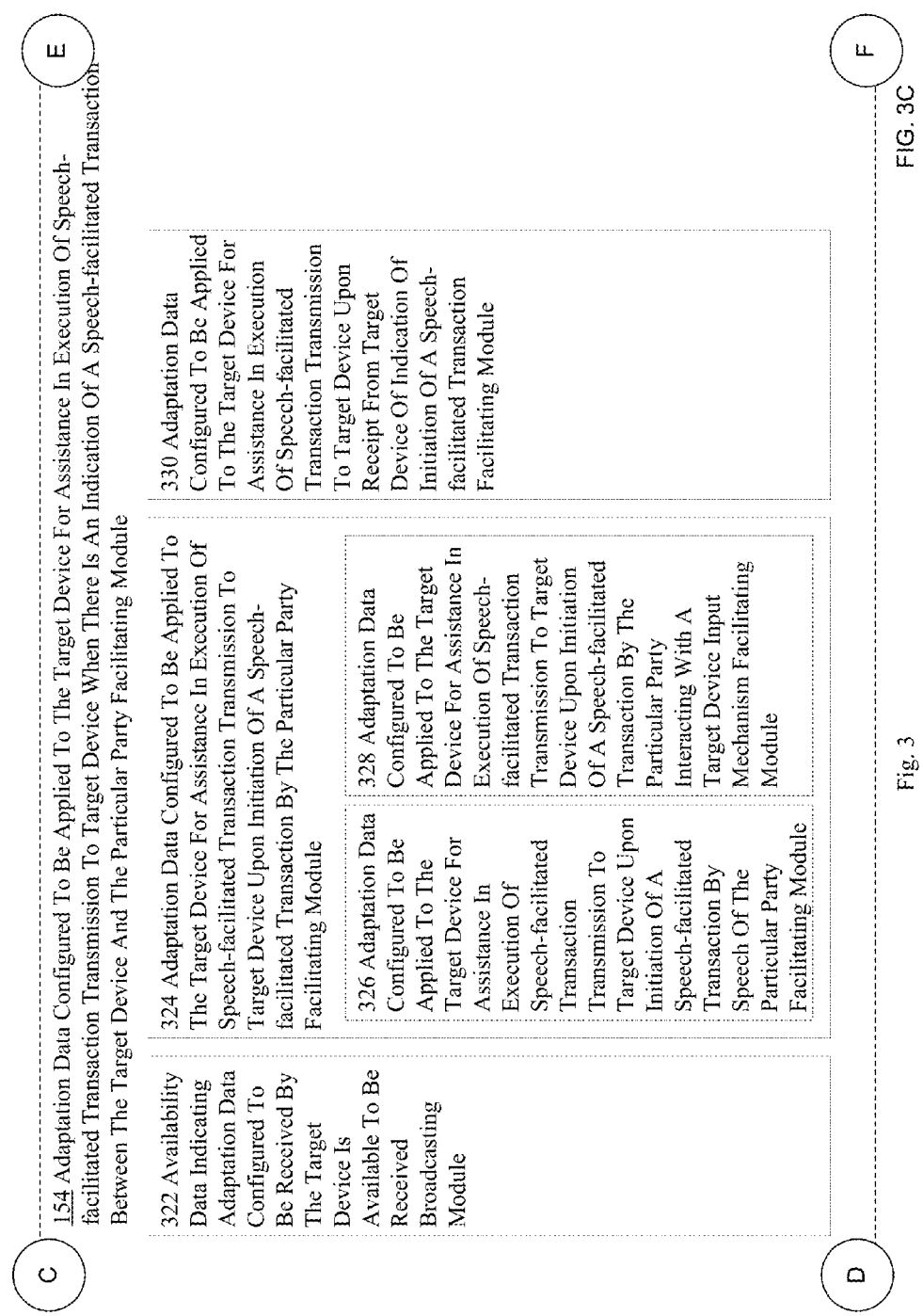

154 Adaptation Data Configured To Be Applied To The Target Device For Assistance In Execution Of Speech-facilitated Transaction Transmission To Target Device When There Is An Indication Of A Speech-facilitated Transaction Between The Target Device And The Particular Party Facilitating Module 332 Adaptation Data Configured To Be Applied To The Target Device For Assistance In Execution Of Speech-Facilitated Transaction Transmission To Target Device When There Is An Indication From The Target Device Of A Status Of The Speech-facilitated Transaction Between The Target Device And The Particular Party Facilitating Module

| 334 Adaptation Data Configured To Be Applied To The Target Device For Assistance In Execution Of Speech-facilitated Transaction Transmission To Target Device When There Is An Indication From The Target Device Of A Particular Number Of Attempts To Receive Speech From The Particular Party Facilitating Module | 336 Adaptation Data Configured To Be Applied To The Target Device For Assistance In Execution Of Speech-facilitated Transaction Transmission To Target Device When There Is An Indication From The Target Device Of A Particular Number Of Attempts To Receive A Particular Type Of Response From The Particular Party Facilitating Module | 338 Adaptation Data Configured To Be Applied To The Target Device For Assistance In Execution Of Speech-facilitated Transaction Transmission To Target Device When There Is An Indication From The Target Device Of A Particular Number Of Failed Attempts To Receive A Particular Type Of Response From The Particular Party Facilitating Module | 340 Adaptation Data Configured To Be Applied To The Target Device For Assistance In Execution Of Speech-facilitated Transaction Transmission To Target Device When There Is An Indication From The Target Device That A Speech Recognition Component Is Processing Speech Of The Particular Party Below A Particular Success Rate Facilitating Module |

154 Adaptation Data Configured To Be Applied To The Target Device For Assistance In Execution Of Speech-facilitated Transaction Transmission To Target Device When There Is An Indication Of A Speech-facilitated Transaction Between The Target Device And The Particular Party Facilitating Module 332 Adaptation Data Configured To Be Applied To The Target Device For Assistance In Execution Of Speech-Facilitated Transaction Transmission To Target Device When There Is An Indication From The Target Device Of A Status Of The Speech-facilitated Transaction Between The Target Device And The Particular Party Facilitating Module

| 342 Adaptation Data Configured To Be Applied To The Target Device For Assistance In Execution Of Speech-facilitated Transaction Transmission To Target Device When There Is An Indication From The Target Device That A Speech Recognition Component Is Processing Speech Of The Particular Party Below A Particular Estimated Success Rate Facilitating Module | 344 Adaptation Data Configured To Be Applied To The Target Device For Assistance In Execution Of Speech-facilitated Transaction Transmission To Target Device When There Is An Indication From The Target Device That A Speech Recognition Component Has A Particular Speech Recognition Rate Below A Particular Threshold Facilitating Module | 346 Adaptation Data Configured To Be Applied To The Target Device For Assistance In Execution Of Speech-facilitated Transaction Transmission To Target Device When There Is An Indication From The Target Device That A Speech Recognition Component Has A Particular Speech Recognition Error Rate Above A Particular Threshold Facilitating Module | 348 Adaptation Data Configured To Be Applied To The Target Device For Assistance In Execution Of Speech-facilitated Transaction Transmission To Target Device When There Is An Indication From The Target Device That A Speech Recognition Component Has A Confidence Rate Below A Particular Threshold Facilitating Module | 350 Adaptation Data Configured To Be Applied To The Target Device For Assistance In Execution Of Speech-facilitated Transaction Transmission To Target Device When There Is An Indication From The Target Device That A Speech Recognition Component Has A Substitution Error Rate Above A Particular Threshold Facilitating Module |

FIG. 3E

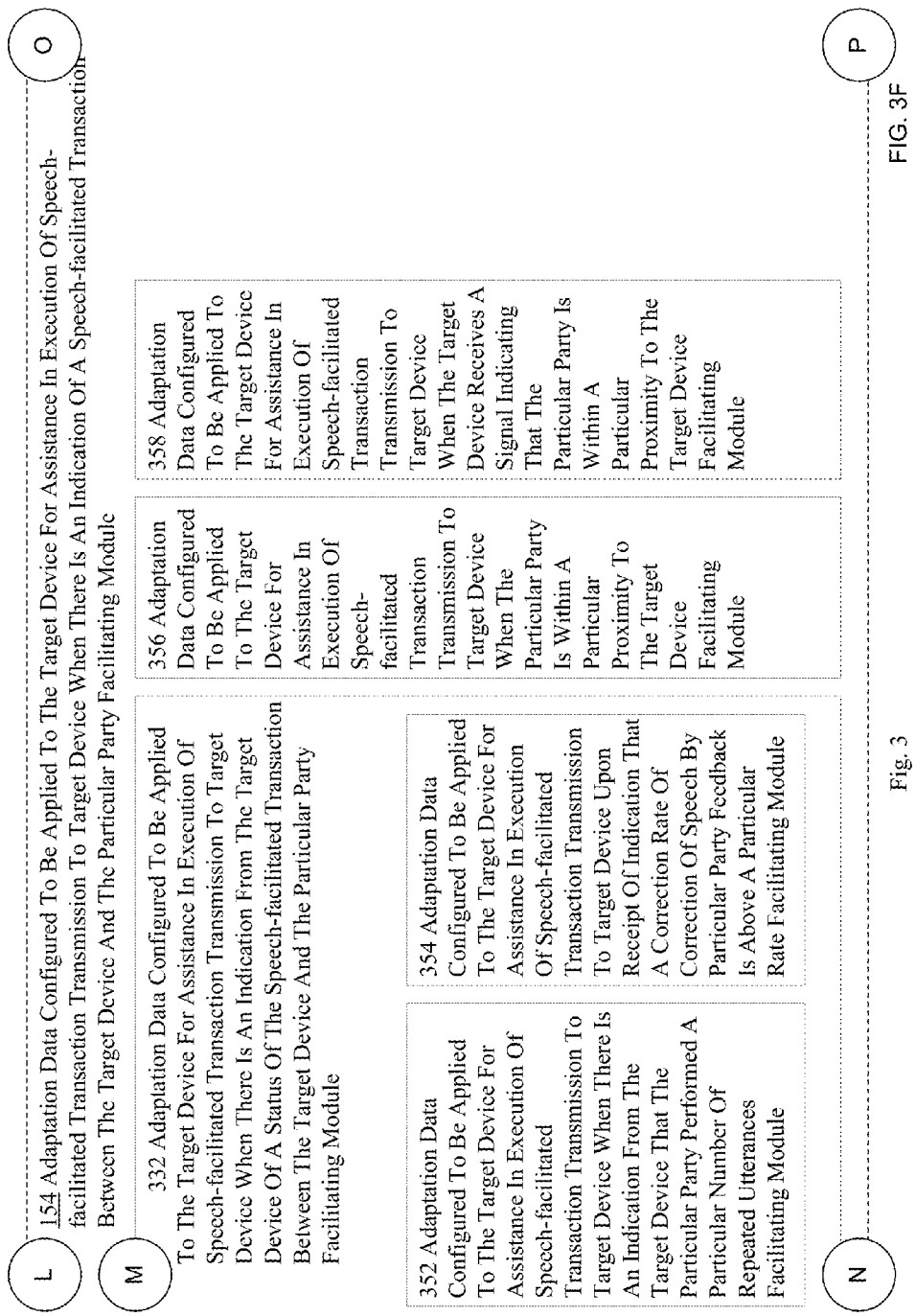

154 Adaptation Data Configured To Be Applied To The Target Device For Assistance In Execution Of Speech-facilitated Transaction Transmission To Target Device When There Is An Indication Of A Speech-facilitated Transaction Between The Target Device And The Particular Party Facilitating Module 360 Adaptation Data Configured To Be Applied To The Target Device For Assistance In Execution Of Speech-facilitated Transaction Transmission To Target Device When A Particular Device Is Interacting With The Target Device Facilitating Module 362 Adaptation Data Configured To Be Applied To The Target Device For Assistance In Execution Of Speech-facilitated Transaction Transmission To Target Device When The Particular Device Is Transmitting Or Receiving Data With The Target Device Facilitating Module 364 Adaptation Data Configured To Be Applied To The Target Device For Assistance In Execution Of Speech-facilitated Transaction Transmission To Target Device When The Particular Device Is Coupled To The Target Device Facilitating Module 366 Adaptation Data Configured To Be Applied To The Target Device For Assistance In Execution Of Speech-facilitated Transaction Transmission To Target Device When A Smartphone Associated With The Particular Party Is Coupled To The Target Device Facilitating Module 368 Adaptation Data Configured To Be Applied To The Target Device For Assistance In Execution Of Speech-facilitated Transaction Transmission To Target Device When A Key Associated With The Particular Party Is Inserted Into The Target Device Facilitating Module 370 Adaptation Data Configured To Be Applied To The Target Device For Assistance In Execution Of Speech-facilitated Transaction Transmission To Target Device When A Key Associated With The Particular Party Is Inserted Into A Motor Vehicle Facilitating Module 372 Adaptation Data Configured To Be Applied To The Target Device For Assistance In Execution Of Speech-facilitated Transaction Transmission To Target Device Upon Receipt Of Indication That The Particular Device Is Coupled To The Target Device Facilitating Module

154 Adaptation Data Configured To Be Applied To The Target Device For Assistance In Execution Of Speech-facilitated Transaction Transmission To Target Device When There Is An Indication Of A Speech-facilitated Transaction Between The Target Device And The Particular Party Facilitating Module

| 374 Adaptation Data Configured To Be Applied To A Speech Recognition Component Of The Target Device For Assistance In Execution Of Speech-facilitated Transaction Transmission To Target Device When There Is An Indication Of A Speech-facilitated Transaction Between The Target Device And The Particular Party Facilitating Module | 376 Adaptation Data Configured To Modify A Speech Recognition Component Of The Target Device For Assistance In Execution Of Speech-facilitated Transaction Transmission To Target Device When There Is An Indication Of A Speech-facilitated Transaction Between The Target Device And The Particular Party Facilitating Module | 378 Adaptation Data Configured To Supplement A Speech Recognition Component Of The Target Device For Assistance In Execution Of Speech-facilitated Transaction Transmission To Target Device When There Is An Indication Of A Speech-facilitated Transaction Between The Target Device And The Particular Party Facilitating Module | 380 Adaptation Data Configured To Replace A Speech Recognition Component Of The Target Device For Assistance In Execution Of Speech-facilitated Transaction Transmission To Target Device When There Is An Indication Of A Speech-facilitated Transaction Between The Target Device And The Particular Party Facilitating Module |

Fig. 3

| Fig. 3A | Fig. 3B | Fig. 3C | Fig. 3D | Fig. 3E | Fig. 3F | Fig. 3G | Fig. 3H | Fig. 3I |

FIG. 3H

154 Adaptation Data Configured To Be Applied To The Target Device For Assistance In Execution Of Speech-facilitated Transaction Transmission To Target Device When There Is An Indication Of A Speech-facilitated Transaction Between The Target Device And The Particular Party Facilitating Module

380 Adaptation Data Configured To Replace A Speech Recognition Component Of The Target Device For Assistance In Execution Of Speech-facilitated Transaction Transmission To Target Device When There Is An Indication Of A Speech-facilitated Transaction Between The Target Device And The Particular Party Facilitating Module

382 Adaptation Data Configured To Be Applied To The Target Device To Improve Accuracy In Processing Speech Received During Execution Of The Speech-facilitated Transaction Transmission To Target Device When There Is An Indication Of A Speech-facilitated Transaction Between The Target Device And The Particular Party Facilitating Module

384 Adaptation Data Configured To Be Applied To The Target Device To Improve Performance In Processing Speech Received During Execution Of The Speech-facilitated Transaction Transmission To Target Device When There Is An Indication Of A Speech-facilitated Transaction Between The Target Device And The Particular Party Facilitating Module

386 Adaptation Data Configured To Be Applied To The Target Device To Improve Speed In Processing Speech Received During Execution Of The Speech-facilitated Transaction Transmission To Target Device When There Is An Indication Of A Speech-facilitated Transaction Between The Target Device And The Particular Party Facilitating Module

388 Adaptation Data Configured To Be Applied To The Target Device For Assistance In Execution Of Speech-facilitated Transaction Transmission To Target Device During The Speech-facilitated Transaction Between The Target Device And The Particular Party Facilitating Module

390 Adaptation Data Configured To Be Applied To The Target Device To Perform At Least One Step In Processing Speech Of The Speech-facilitated Transaction Transmission To Target Device When There Is An Indication Of A Speech-facilitated Transaction Between The Target Device And The Particular Party Facilitating Module

| Fig. 3A | Fig. 3B | Fig. 3C | Fig. 3D | Fig. 3E | Fig. 3F | Fig. 3G | Fig. 3H | Fig. 3I |

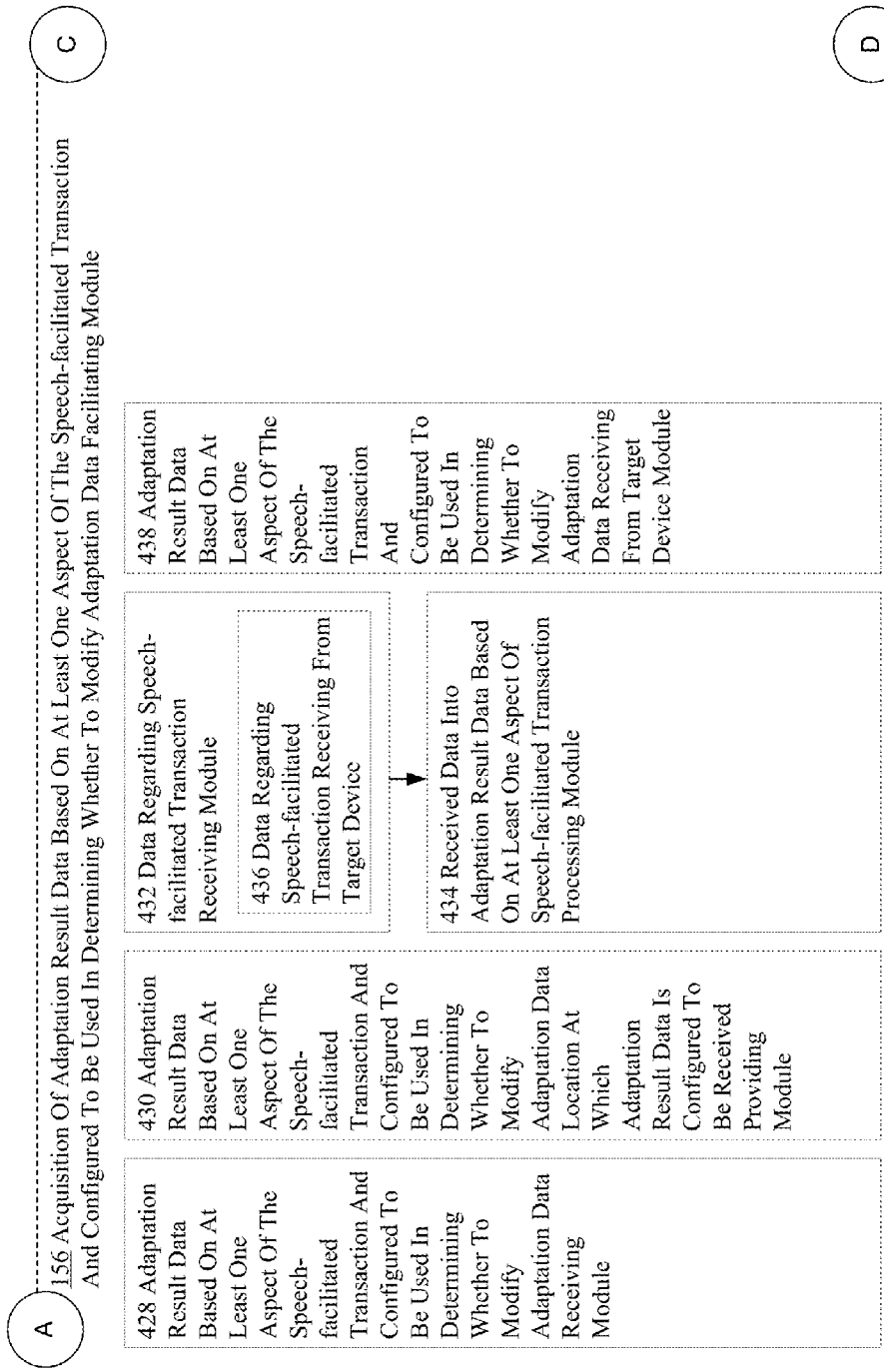

156 Acquisition Of Adaptation Result Data Based On At Least One Aspect Of The Speech-facilitated Transaction And Configured To Be Used In Determining Whether To Modify Adaptation Data Facilitating Module

| 470 Request For Particular Party To Complete A Survey Regarding The Speech-facilitated Transaction Presenting Module | 472 Result Of Survey Regarding The Speech-facilitated Transaction Collecting Module | 474 Result Of Survey Regarding The Speech-facilitated Transaction Retrieving Module |

476 Acquisition Of Adaptation Result Data Based Analysis Of The Speech-facilitated Transaction And Configured To Modify Whether To Modify Adaptation Data Facilitating Module

| 478 Acquisition Of Adaptation Result Data Based Target Device-performed Analysis Of The Speech-facilitated Transaction And Configured To Be Used In Determining Whether To Modify Adaptation Data Facilitating Module | 480 Acquisition Of Adaptation Result Data Based Analysis Of A Recognition Rate Of One Or More Words Of The Speech-facilitated Transaction And Configured To Be Used In Determining Whether To Modify Adaptation Data Facilitating Module |

| 482 Acquisition Of Adaptation Result Data Based Analysis Of An Error Rate Of At Least A Portion Of The Speech-facilitated Transaction And Configured To Be Used In Determining Whether To Modify Adaptation Data Facilitating Module | 484 Acquisition Of Adaptation Result Data Based Analysis Of A Repeated Word Rate In The Speech-facilitated Transaction And Configured To Be Used In Determining Whether To Modify Adaptation Data Facilitating Module |

FIG. 4E

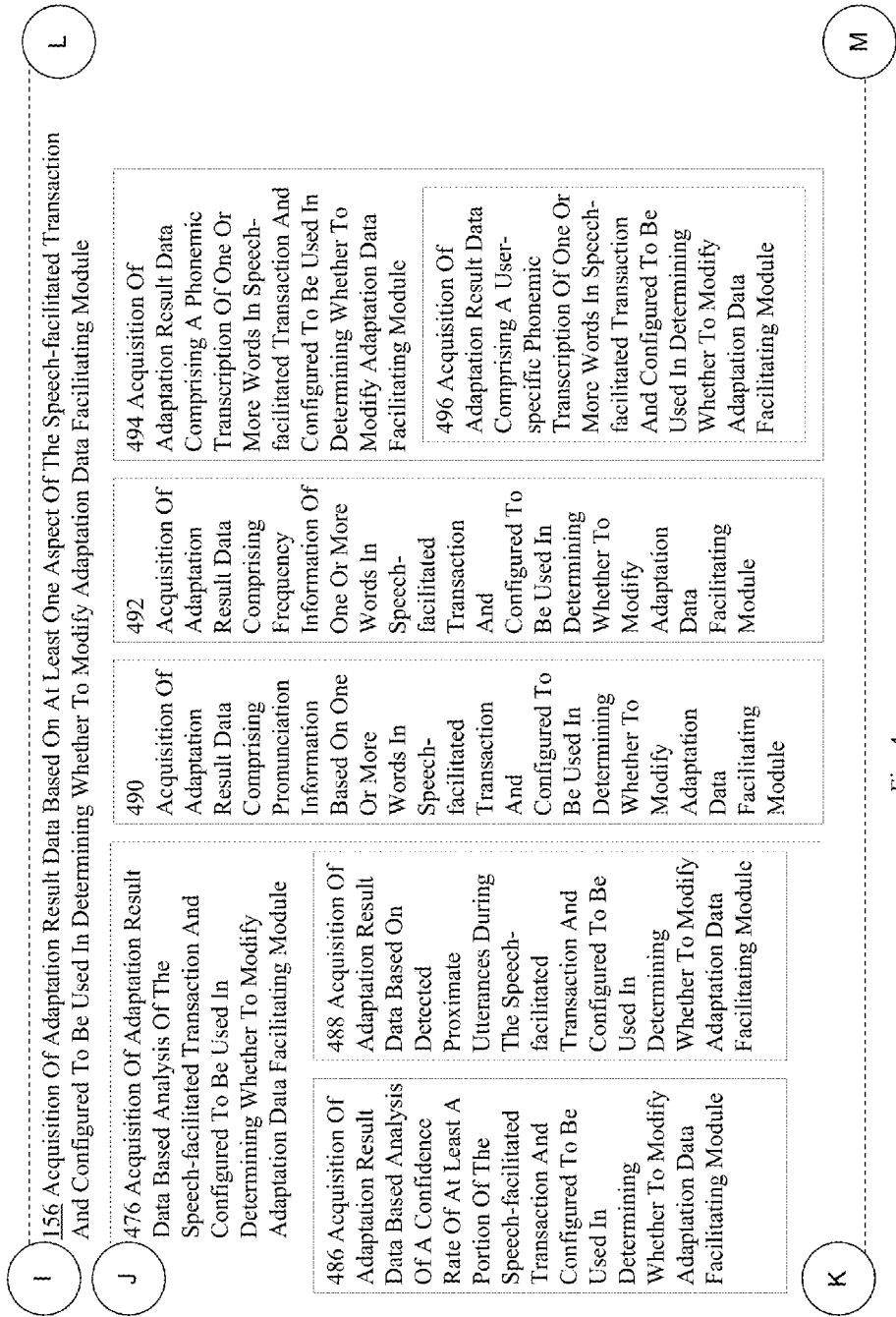

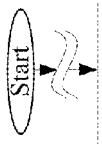

504 facilitating transmission of the adaptation data to a target device when there is an indication of a speech-facilitated transaction between the target device and the particular party, wherein the adaptation data is configured to be applied to the target device to assist in execution of the speech-facilitated transaction 702 facilitating transmission of the adaptation data to an automated airline ticket counter when there is an indication of a speech-facilitated transaction between the target device and the particular party, wherein the adaptation data is configured to be applied to the target device to assist in execution of the speech-facilitated transaction 704 facilitating transmission of the adaptation data to the automated airline ticket counter upon detection of an indication from the automated airline ticket counter of a speech-facilitated interaction with the particular party, wherein the adaptation data is configured to be applied to the target device to assist in execution of the speech-facilitated transaction 706 transmitting the adaptation data to the automated airline ticket counter upon detection of an indication from the automated airline ticket counter that the particular party has pressed a button on the automated airline ticket counter, wherein the adaptation data is configured to be applied to the target device to assist in execution of the speech-facilitated transaction 708 transmitting the adaptation data to the automated airline ticket counter upon detection of an indication from the automated airline ticket counter that the particular party has pressed a button on the automated airline ticket counter indicating a request to complete at least a portion of the transaction via speech communication, wherein the adaptation data is configured to be applied to the automated airline ticket counter to assist in execution of the speech-facilitated transaction

FIG. 7A

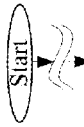

504 facilitating transmission of the adaptation data to a target device when there is an indication of a speech-facilitated transaction between the target device and the particular party, wherein the adaptation data is configured to be applied to the target device to assist in execution of the speech-facilitated transaction 732 facilitating transmission of the adaptation data to the target device upon receipt of an indication from the target device of a status of the speech-facilitated transaction between the target device and the particular party, wherein the adaptation data is configured to be applied to the target device to assist in execution of the speech-facilitated transaction

| 734 facilitating transmission of the adaptation data to the target device upon receipt of an indication from the target device of a particular number of attempts to receive speech from the particular party, wherein the adaptation data is configured to be applied to the target device to assist in execution of the speech-facilitated transaction | 736 facilitating transmission of the adaptation data to the target device upon receipt of an indication from the target device of a particular number of attempts to receive a particular type of response from the particular party, wherein the adaptation data is configured to be applied to the target device to assist in execution of the speech-facilitated transaction | 738 facilitating transmission of the adaptation data to the target device upon receipt of an indication from the target device of a particular number of failed attempts to receive a particular type of response from the particular party, wherein the adaptation data is configured to be applied to the target device to assist in execution of the speech-facilitated transaction | 740 facilitating transmission of the adaptation data to the target device upon receipt of an indication from the target device that a speech recognition component of the target device is processing speech of the particular party below a particular success rate |

FIG. 7E

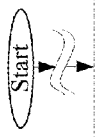

FIG. 7G 504 facilitating transmission of the adaptation data to a target device when there is an indication of a speech-facilitated transaction between the target device and the particular party, wherein the adaptation data is configured to be applied to the target device to assist in execution of the speech-facilitated transaction 732 facilitating transmission of the adaptation data to the target device upon receipt of an indication from the target device of a status of the speech-facilitated transaction between the target device and the particular party, wherein the adaptation data is configured to be applied to the target device to assist in execution of the speech-facilitated transaction 752 facilitating transmission of the adaptation data to the target device upon receipt of an indication from the target device that the particular party has performed a particular number of repeated utterances 754 facilitating transmission of the adaptation data to the target device upon receipt of an indication from the target device that a correction rate of correction of speech by particular party feedback is above a particular rate 756 facilitating transmission of the adaptation data to a target device when the target device is within a particular proximity to the particular party, wherein the adaptation data is configured to be applied to the target device to assist in execution of the speech-facilitated transaction 758 facilitating transmission of the adaptation data to a target device upon receipt of a signal indicating that the target device is within a particular proximity to the particular party, wherein the adaptation data is configured to be applied to the target device to assist in execution of the speech-facilitated transaction

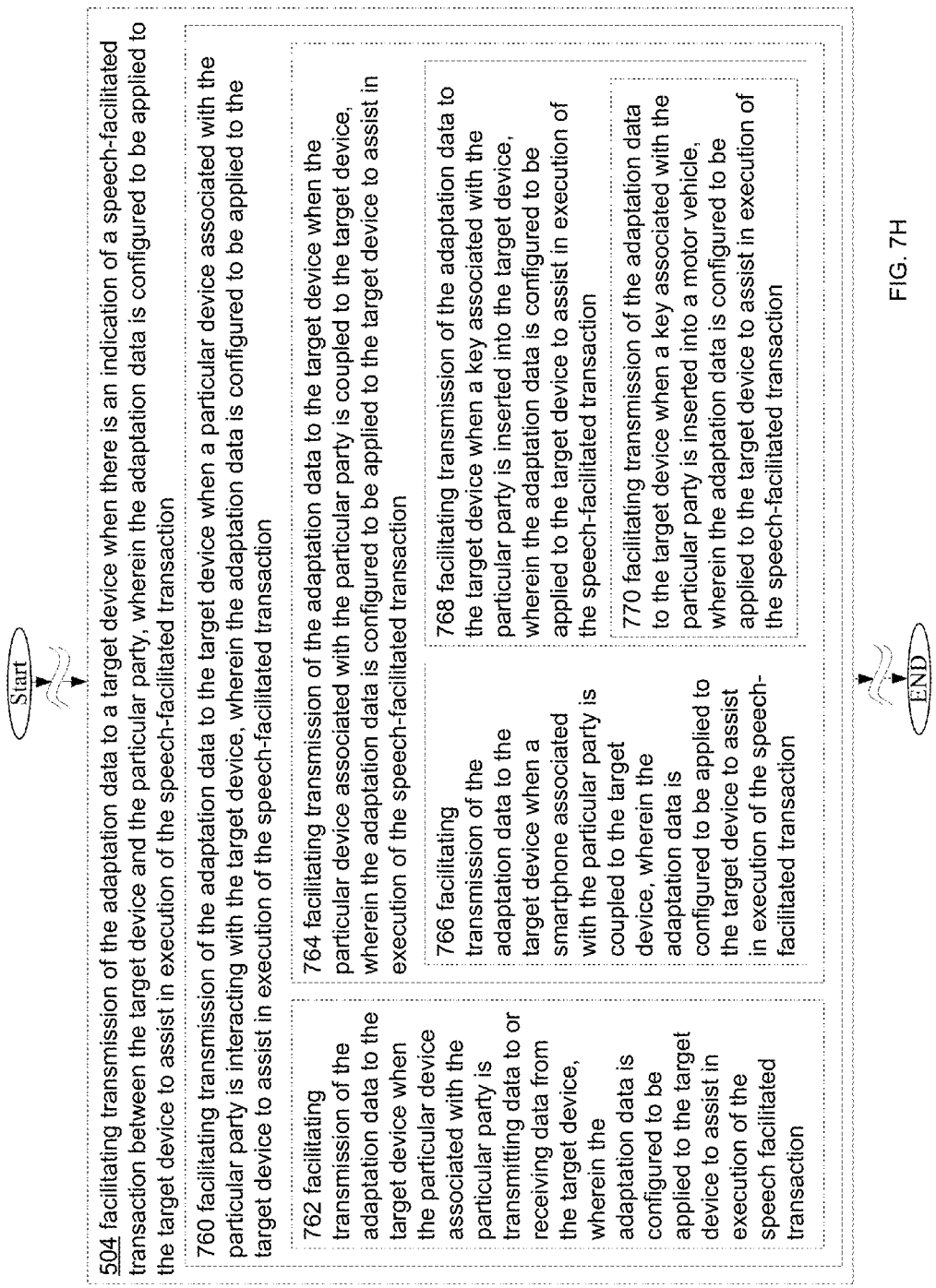

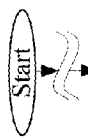

504 facilitating transmission of the adaptation data to a target device when there is an indication of a speech-facilitated transaction between the target device and the particular party, wherein the adaptation data is configured to be applied to the target device to assist in execution of the speech-facilitated transaction 760 facilitating transmission of the adaptation data to the target device when a particular device associated with the particular party is interacting with the target device, wherein the adaptation data is configured to be applied to the target device to assist in execution of the speech-facilitated transaction 772 facilitating transmission of the adaptation data to the target device upon indication that the particular device associated with the particular party is coupled to the target device, wherein the adaptation data is configured to be applied to the target device to assist in execution of the speech-facilitated transaction 774 facilitating transmission of the adaptation data to a target device when there is an indication of a speech-facilitated transaction between the target device and the particular party, wherein the adaptation data is configured to be applied to a speech recognition component of the target device to assist in execution of the speech-facilitated transaction 776 facilitating transmission of the adaptation data to a target device when there is an indication of a speech-facilitated transaction between the target device and the particular party, wherein the adaptation data is configured to modify a speech recognition component of the target device to assist in execution of the speech-facilitated transaction 778 facilitating transmission of the adaptation data to a target device when there is an indication of a speech-facilitated transaction between the target device and the particular party, wherein the adaptation data is configured to supplement a speech recognition component of the target device to assist in execution of the speech-facilitated transaction

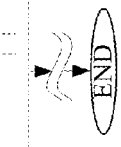

FIG. 7I

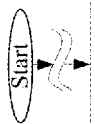

504 facilitating transmission of the adaptation data to a target device and the particular party, wherein the adaptation data is configured to be applied to the target device to assist in execution of the speech-facilitated transaction between the target device when there is an indication of a speech-facilitated transaction 780 facilitating transmission of the adaptation data to a target device when there is an indication of a speech-facilitated transaction between the target device and the particular party, wherein the adaptation data is configured to replace a speech recognition component of the target device to assist in execution of the speech-facilitated transaction 782 facilitating transmission of the adaptation data to a target device when there is an indication of a speech-facilitated transaction between the target device and the particular party, wherein the adaptation data is configured to be applied to the target device to improve accuracy in processing speech received during execution of the speech-facilitated transaction 784 facilitating transmission of the adaptation data to a target device when there is an indication of a speech-facilitated transaction between the target device and the particular party, wherein the adaptation data is configured to be applied to the target device to improve performance in processing speech received during execution of the speech-facilitated transaction 786 facilitating transmission of the adaptation data to a target device when there is an indication of a speech-facilitated transaction between the target device and the particular party, wherein the adaptation data is configured to be applied to the target device to improve speed in processing speech received during execution of the speech-facilitated transaction 788 facilitating transmission of the adaptation data to a target device when there is an indication of a speech-facilitated transaction between the target device and the particular party, wherein the adaptation data is configured to be applied to the target device to process speech received during execution of the speech-facilitated transaction

FIG. 7J

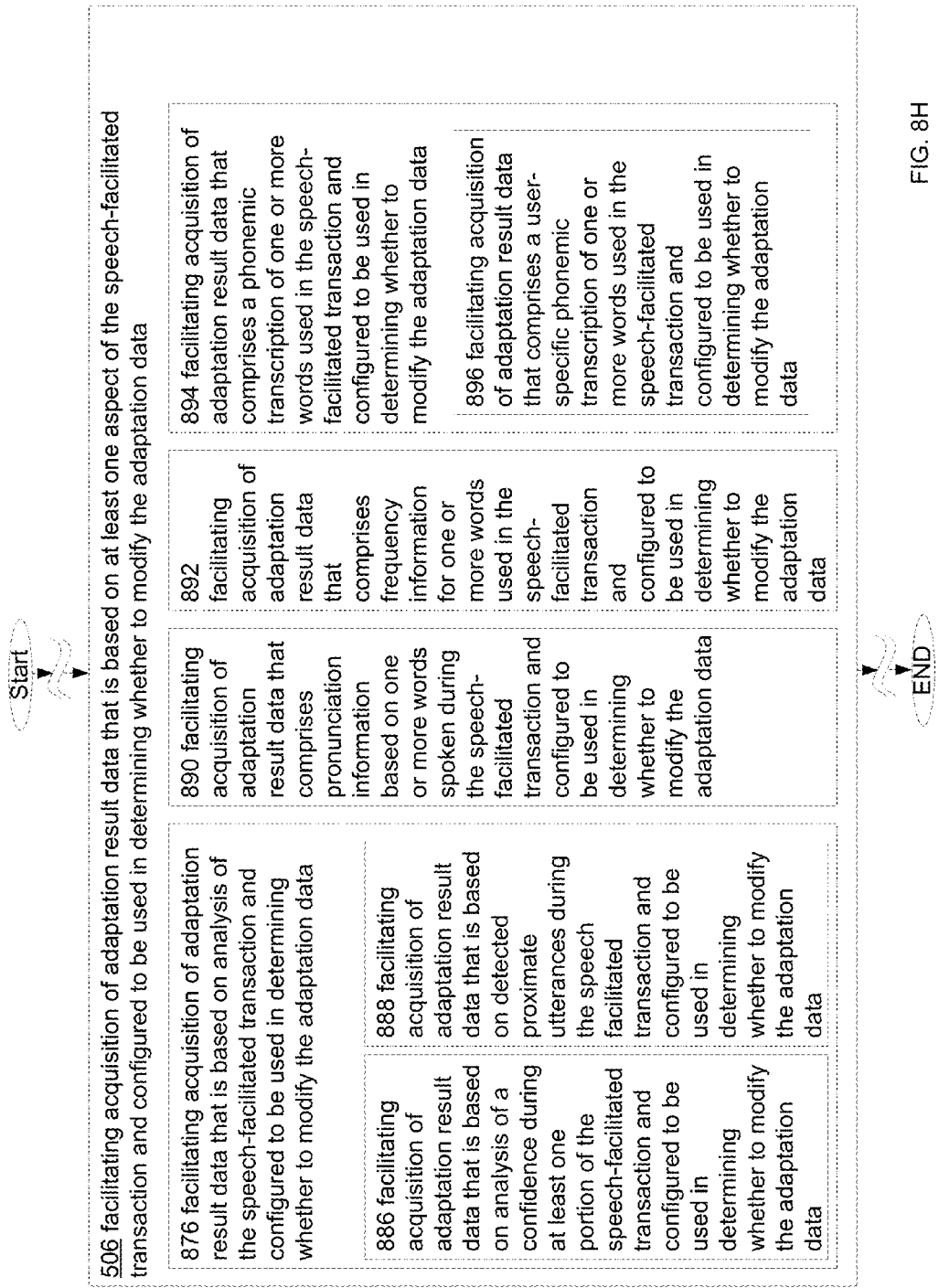

SPEECH RECOGNITION ADAPTATION SYSTEMS BASED ON ADAPTATION DATA

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications, including any priority claims, is incorporated herein by reference to the extent such subject matter is not inconsistent herewith.

RELATED APPLICATIONS

For purposes of the USPTO extra-statutory requirements, the present application constitutes a continuation of U.S. patent application Ser. No. 13/564,647, entitled SPEECH RECOGNITION ADAPTATION SYSTEMS BASED ON ADAPTATION DATA, naming Royce A. Levien, Richard T. Lord, Robert W. Lord, Mark A. Malamud, and John D. Rinaldo, Jr. as inventors, filed 1 Aug. 2012, which is currently co-pending or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, *Benefit of Prior-Filed Application*, USPTO Official Gazette Mar. 18, 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above, but expressly points out that such designation(s) are not to be construed in any way as any type of commentary and/or admission as to whether or not the present application contains any new matter in addition to the matter of its parent application(s).

For purposes of the USPTO extra-statutory requirements, the present application constitutes a continuation-in-part of U.S. patent application Ser. No. 13/485,733, entitled SPEECH RECOGNITION ADAPTATION SYSTEMS BASED ON ADAPTATION DATA, naming Royce A. Levien, Richard T. Lord, Robert W. Lord, Mark A. Malamud, and John D. Rinaldo, Jr. as inventors, filed 31 May 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/485,738, entitled SPEECH RECOGNITION ADAPTATION SYSTEMS BASED ON ADAPTATION DATA, naming Royce A. Levien, Richard T. Lord, Robert W. Lord, Mark A. Malamud, and John D. Rinaldo, Jr. as inventors, filed 31 May 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/538,855, entitled SPEECH RECOGNITION ADAPTATION SYSTEMS BASED ON ADAPTATION DATA, naming Royce A. Levien, Richard T. Lord, Robert W. Lord, Mark A. Malamud, and John D. Rinaldo, Jr. as inventors, filed 29 Jun. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/538,866, entitled SPEECH RECOGNITION ADAPTATION SYSTEMS BASED ON ADAPTATION DATA, naming Royce A. Levien, Richard T. Lord, Robert W. Lord, Mark A. Malamud, and John D. Rinaldo, Jr. as inventors, filed 29 Jun. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/564,650, entitled SPEECH RECOGNITION ADAPTATION SYSTEMS BASED ON ADAPTATION DATA, naming Royce A. Levien, Richard T. Lord, Robert W. Lord, Mark A. Malamud, and John D. Rinaldo, Jr. as inventors, filed 1 Aug. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/564,651, entitled SPEECH RECOGNITION ADAPTATION SYSTEMS BASED ON ADAPTATION DATA, naming Royce A. Levien, Richard T. Lord, Robert W. Lord, Mark A. Malamud, and John D. Rinaldo, Jr. as inventors, filed 1 Aug. 2012, which is currently co-pending or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above, but expressly points out that such designation(s) are not to be construed in any way as any type of commentary and/or admission as to whether or not the present application contains any new matter in addition to the matter of its parent application(s).

BACKGROUND

This application is related to portable speech adaptation data.

SUMMARY

A computationally implemented method includes, but is not limited to, managing adaptation data, wherein the adaptation data is at least partly based on at least one speech interaction of a particular party, facilitating transmission of the adaptation data to a target device when there is an indication of a speech-facilitated transaction between the target device and the particular party, wherein the adaptation data is configured to be applied to the target device to assist in execution of the speech-facilitated transaction, and facilitating acquisition of adaptation result data that is based on at least one aspect of the speech-facilitated transaction and configured to be used in determining whether to modify the adaptation data. In addition to the foregoing, other method aspects are described in the claims, drawings, and text forming a part of the present disclosure.

In one or more various aspects, related systems include but are not limited to circuitry and/or programming for effecting the herein referenced method aspects; the circuitry and/or programming can be virtually any combination of hardware, software, and/or firmware in one or more machines or article of manufacture configured to effect the herein-referenced method aspects depending upon the design choices of the system designer.

A computationally-implemented system includes, but is not limited to, means for managing adaptation data, wherein the adaptation data is at least partly based on at least one speech interaction of a particular party, means for facilitating transmission of the adaptation data to a target device when there is an indication of a speech-facilitated transaction between the target device and the particular party, wherein the adaptation data is configured to be applied to the target device to assist in execution of the speech-facilitated transaction, and means for facilitating acquisition of adaptation result data that is based on at least one aspect of the speech-facilitated transaction and configured to be used in determining whether to modify the adaptation data. In addition to the foregoing, other system aspects are described in the claims, drawings, and text forming a part of the present disclosure.

A computationally-implemented system includes, but is not limited to, circuitry for managing adaptation data, wherein the adaptation data is at least partly based on at least one speech interaction of a particular party, circuitry for facilitating transmission of the adaptation data to a target device when there is an indication of a speech-facilitated transaction between the target device and the particular party, wherein the adaptation data is configured to be applied to the target device to assist in execution of the speech-facilitated transaction, and circuitry for facilitating acquisition of adaptation result data that is based on at least one aspect of the speech-facilitated transaction and configured to be used in determining whether to modify the adaptation data. In addition to the foregoing, other system aspects are described in the claims, drawings, and text forming a part of the present disclosure.

A computer program product comprising an article of manufacture bears instructions including, but not limited to, one or more instructions for managing adaptation data, wherein the adaptation data is at least partly based on at least one speech interaction of a particular party, one or more instructions for facilitating transmission of the adaptation data to a target device when there is an indication of a speech-facilitated transaction between the target device and the particular party, wherein the adaptation data is configured to be applied to the target device to assist in execution of the speech-facilitated transaction, and one or more instructions for facilitating acquisition of adaptation result data that is based on at least one aspect of the speech-facilitated transaction and configured to be used in determining whether to modify the adaptation data. In addition to the foregoing, other computer program product aspects are described in the claims, drawings, and text forming a part of the present disclosure.

A device specified by computational language includes, but is not limited to, one or more interchained groups of ordered matter arranged to manage adaptation data, wherein the adaptation data is at least partly based on at least one speech interaction of a particular party, one or more interchained groups of ordered matter arranged to facilitate transmission of the adaptation data to a target device when there is an indication of a speech-facilitated transaction between the target device and the particular party, wherein the adaptation data is configured to be applied to the target device to assist in execution of the speech-facilitated transaction, and one or more interchained groups of ordered matter arranged to facilitate acquisition of adaptation result data that is based on at least one aspect of the speech-facilitated transaction and configured to be used in determining whether to modify the adaptation data. In addition to the foregoing, other hardware aspects are described in the claims, drawings, and text forming a part of the present disclosure.

A computer architecture comprising at least one level, includes, but is not limited to architecture configured to be managing adaptation data, wherein the adaptation data is at least partly based on at least one speech interaction of a particular party, architecture configured to be facilitating transmission of the adaptation data to a target device when there is an indication of a speech-facilitated transaction between the target device and the particular party, wherein the adaptation data is configured to be applied to the target device to assist in execution of the speech-facilitated transaction, and architecture configured to be facilitating acquisition of adaptation result data that is based on at least one aspect of the speech-facilitated transaction and configured to be used in determining whether to modify the adaptation data. In addition to the foregoing, other architecture aspects are described in the claims, drawings, and text forming a part of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 1, including FIGS. 1A and 1B, shows a high-level block diagram of a personal device 120 operating in an exemplary environment 100, according to an embodiment.

FIG. 2, including FIGS. 2A-2G, shows a particular perspective of the adaptation data correlated to at least one particular party speech aspect managing module 152 of the personal device 120 of environment 100 of FIG. 1.

FIG. 3, including FIGS. 3A-3I, shows a particular perspective of the adaptation data configured to be applied to the target device for assistance in execution of speech-facilitated transaction transmission to target device when there is an indication of a speech-facilitated transaction between the target device and the particular party facilitating module 154 of the personal device 120 of environment 100 of FIG. 1.

FIGS. 4A-4H, shows a particular perspective of the acquisition of adaptation result data based on at least one aspect of the speech-facilitated transmission and configured to be used in determining whether to modify adaptation data facilitating module 156 of the personal device 120 of environment 100 of FIG. 1.

FIG. 7A is a high-level logic flowchart of a process depicting alternate implementations of the adaptation data transmission facilitating operation 504 of FIG. 5.

FIG. 7E is a high-level logic flowchart of a process depicting alternate implementations of the adaptation data transmission facilitating operation 504 of FIG. 5.

FIG. 7G is a high-level logic flowchart of a process depicting alternate implementations of the adaptation data transmission facilitating operation 504 of FIG. 5.

FIG. 7H is a high-level logic flowchart of a process depicting alternate implementations of the adaptation data transmission facilitating operation 504 of FIG. 5.

FIG. 7I is a high-level logic flowchart of a process depicting alternate implementations of the adaptation data transmission facilitating operation 504 of FIG. 5.

FIG. 7J is a high-level logic flowchart of a process depicting alternate implementations of the adaptation data transmission facilitating operation 504 of FIG. 5.

FIG. 8H is a high-level logic flowchart of a process depicting alternate implementations of the adaptation result data acquisition facilitating operation 506 of FIG. 5.

DETAILED DESCRIPTION

Figure 1A:
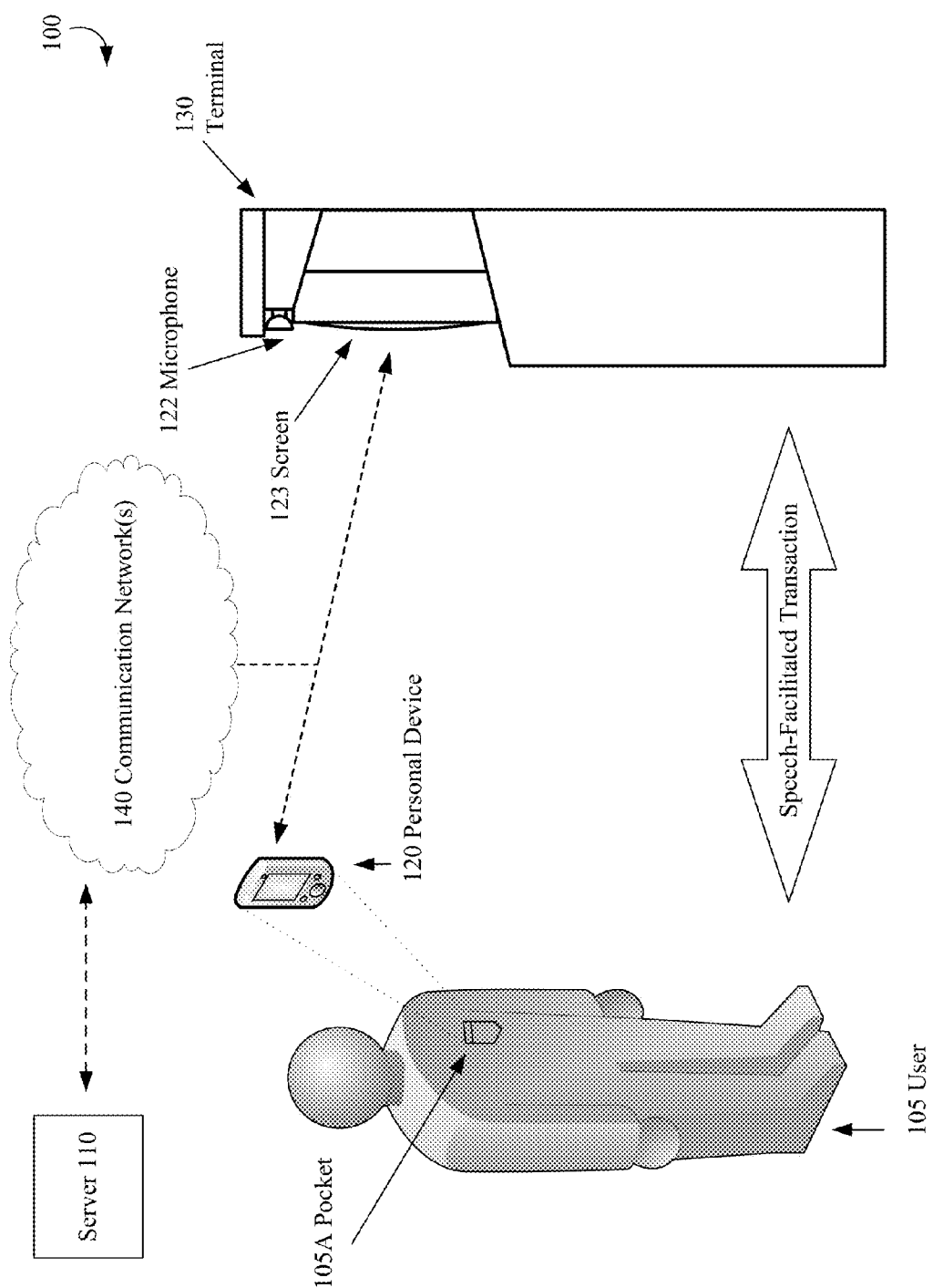

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

The proliferation of automation in many transactions is apparent. For example, Automated Teller Machines ("ATMs") dispense money and receive deposits. Airline ticket counter machines check passengers in, dispense tickets, and allow passengers to change or upgrade flights. Train and subway ticket counter machines allow passengers to purchase a ticket to a particular destination without invoking a human interaction at all. Many groceries and pharmacies have self-service checkout machines which allow a consumer to pay for goods purchased by interacting only with a machine. Large companies now staff telephone answering systems with machines that interact with customers, and invoke a human in the transaction only if there is a problem with the machine-facilitated transaction.

Nevertheless, as such automation increases, convenience and accessibility may decrease. Self-checkout machines at grocery stores may be difficult to operate. ATMs and ticket counter machines may be mostly inaccessible to disabled persons or persons requiring special access. Where before, the interaction with a human would allow disabled persons to complete transactions with relative ease, if a disabled person is unable to push the buttons on an ATM, there is little the machine can do to facilitate the transaction to completion. While some of these public terminals allow speech operations, they are configured to the most generic forms of speech, which may be less useful in recognizing particular speakers, thereby leading to frustration for users attempting to speak to the machine. This problem may be especially challenging for the disabled, who already may face significant challenges in completing transactions with automated machines.

In addition, smartphones and tablet devices also now are configured to receive speech commands. Speech and voice controlled automobile systems now appear regularly in motor vehicles, even in economical, mass-produced vehicles. Home entertainment devices, e.g., disc players, televisions, radios, stereos, and the like, may respond to speech commands. Additionally, home security systems may respond to speech commands. In an office setting, a worker's computer may respond to speech from that worker, allowing faster, more efficient work flows. Such systems and machines may be trained to operate with particular users, either through explicit training or through repeated interactions. Nevertheless, when that system is upgraded or replaced, e.g., a new TV is bought, that training may be lost with the device.

Thus, adaptation data for speech recognition systems may be separated from the device which recognizes the speech, and may be more closely associated with a user, e.g., through a device carried by the user, or through a network location associated with the user. In accordance with various embodiments, computationally implemented methods, systems, circuitry, articles of manufacture, and computer program products are designed to, among other things, provide an interface for managing adaptation data, wherein the adaptation data is at least partly based on at least one speech interaction of a particular party, an interface for facilitating transmission of the adaptation data to a target device when there is an indication of a speech-facilitated transaction between the target device and the particular party, wherein the adaptation data is configured to be applied to the target device to assist in execution of the speech-facilitated transaction, and an interface for facilitating acquisition of adaptation result data that is based on at least one aspect of the speech-facilitated transaction and configured to be used in determining whether to modify the adaptation data.

The foregoing summary is illustrative only and is not intended to be in any way limiting. In addition to the illustrative aspects, embodiments, and features described above, further aspects, embodiments, and features will become apparent by reference to the drawings and the following detailed description.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. In order to facilitate human comprehension, in many instances, high-level programming languages resemble or even share symbols with natural languages.

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental"

in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output.

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011100001111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second).

Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Referring now to FIG. 1, FIG. 1 illustrates an example environment 100 in which the methods, systems, circuitry, articles of manufacture, and computer program products and architecture, in accordance with various embodiments, may be implemented by personal device 120. The personal device 120, in various embodiments, may be endowed with logic that is designed for managing adaptation data, wherein the adaptation data is at least partly based on at least one speech interaction of a particular party, logic that is designed for facilitating transmission of the adaptation data to a target device when there is an indication of a speech-facilitated transaction between the target device and the particular party, wherein the adaptation data is configured to be applied to the target device to assist in execution of the speech-facilitated transaction, and logic that is designed for facilitating acquisition of adaptation result data that is based on at least one aspect of the speech-facilitated transaction and configured to be used in determining whether to modify the adaptation data.

Referring again to the exemplary embodiment 100 of FIG. 1, a user 5 may engage in a speech-facilitated transaction with a terminal device 130. Terminal device 130 may include a microphone 122 and a screen 123. In some embodiments, screen 123 may be a touchscreen. Although FIG. 1A depicts terminal device 130 as a terminal for simplicity of illustration, terminal device 130 could be any device that is configured to receive speech. For example, terminal device 130 may be a terminal, a computer, a navigation system, a phone, a piece of home electronics (e.g., a DVD player, Blu-Ray player, media player, game system, television, receiver, alarm clock, and the like). Terminal device 130 may, in some embodiments, be a home security system, a safe lock, a door lock, a kitchen appliance configured to receive speech, and the like. In some embodiments, terminal device 130 may be a motorized vehicle, e.g., a car, boat, airplane, motorcycle, golf cart, wheelchair, and the like. In some embodiments, terminal device 30 may be a piece of portable electronics, e.g., a laptop computer, a netbook computer, a tablet device, a smartphone, a cellular phone, a radio, a portable navigation system, or any other piece of electronics capable of receiving speech. Terminal device 130 may be a part of an enterprise solution, e.g., a common workstation in an office, a copier, a scanner, a personal workstation in a cubicle, an office directory, an interactive screen, and a telephone. These examples and lists are not meant to be exhaustive, but merely to illustrate a few examples of the terminal device.

In an embodiment, personal device 120 may facilitate the transmission of adaptation data to the terminal 130. In FIG. 1A, personal device 120 is shown as a phone-type device that fits into pocket 15A of the user. Nevertheless, in other embodiments, personal device 120 may be any size and have any specification. Personal device 120 may be a custom device of any shape or size, configured to transmit, receive, and store data. Personal device 120 may include, but is not limited to, a smartphone device, a tablet device, a personal computer device, a laptop device, a keychain device, a key, a personal digital assistant device, a modified memory stick, a universal remote control, or any other piece of electronics. In addition, personal device 120 may be a modified object that is worn, e.g., eyeglasses, a wallet, a credit card, a watch, a chain, or an article of clothing. Anything that is configured to store, transmit, and receive data may be a personal device 120, and personal device 120 is not limited in size to devices that are capable of being carried by a user. Additionally, personal device 120 may not be in direct proximity to the user, e.g., personal device 120 may be a computer sitting on a desk in a user's home or office. Moreover, although the word "personal" is used to describe "personal device" 120, this is merely for convenience's sake, and does not necessarily imply a relationship with the user or an exclusive relationship with the user.

In some embodiments, terminal device 130 receives adaptation data from the personal device 120, in a process that will be described in more detail herein. In some embodiments, personal device 120 acts as a facilitator, e.g., one that carries out one or more steps in assisting the transmission, of transmitting adaptation data to the terminal device 130. For example, as will be described in more detail herein, personal device 120 may facilitate transmission of adaptation data from server 110 to terminal device 130. In some embodiments, personal device 120 may generate adaptation data, as will be described in more detail herein. Thus, in some embodiments, the adaptation data does not come directly from the personal device 120. In some embodiments, personal device 120 merely facilitates communication of the adaptation data, e.g., by providing one or more of an address, credentials, instructions, authorization, and recommendations. For example, in some embodiments, personal device 120 provides a location at server 110 from which adaptation data may be transmitted. In some embodiments, personal device 120 retrieves adaptation data from server 110 upon a request from the terminal device 130, and then relays or facilitates in the relaying of the adaptation data to terminal device 130.

In some embodiments, personal device 120 receives adaptation result data from terminal device 130. In some embodiments, personal device 120 acts as a facilitator of receiving adaptation result data at a location. For example, as will be described in more detail herein, personal device 120 may facilitate reception of adaptation result data at server 110. In some embodiments, the adaptation result data 130 may be created by the personal device 120, as will be described in more detail herein. Thus, in some embodiments, the adaptation result data is not received directly at the personal device 120. In some embodiments, personal device 120 merely facilitates reception of the adaptation result data, e.g., by providing one or more of an address, credentials, instructions, authorization, and recommendations. For example, in some embodiments, personal device 120 provides a location at server 110 at which adaptation result data may be received. In some embodiments, personal device 120 retrieves adaptation result data from server 110 after facilitating the reception of adaptation result data from terminal device 130 at server 110.

In some embodiments, one or more of the adaptation data and the adaptation result data are transmitted over one or more communication network(s) 140. In various embodiments, the communication network 140 may include one or more of a local area network (LAN), a wide area network (WAN), a metropolitan area network (MAN), a wireless local area network (WLAN), a personal area network (PAN), a Worldwide Interoperability for Microwave Access (WiMAX), public switched telephone network (PTSN), a general packet radio service (GPRS) network, a cellular network, and so forth. The communication networks 140 may be wired, wireless, or a combination of wired and wireless networks. It is noted that "communication network" here refers to one or more communication networks, which may or may not interact with each other.

In some embodiments, personal device 120 broadcasts the adaptation data regardless of whether a terminal device 130 is listening, e.g., at predetermined, regular, or otherwise-defined intervals. In other embodiments, personal device 120 listens for a request from a terminal device 130, and transmits or broadcasts adaptation data in response to that request. In some embodiments, user 105 determines when personal device 120 broadcasts adaptation data. In still other embodiments, a third party (not shown) triggers the transmission of adaptation data to the terminal device 130, in which the transmission is facilitated by the personal device 120.

Referring again to the exemplary environment 100 depicted in FIG. 1, in various embodiments, the personal device 120 may comprise, among other elements, a processor 132, a memory 134, and a user interface 135. Processor 132 may include one or more microprocessors, Central Processing Units ("CPU"), a Graphics Processing Units ("GPU"), Physics Processing Units, Digital Signal Processors, Network Processors, Floating Point Processors, and the like. In some embodiments, processor 132 may be a server. In some embodiments, processor 132 may be a distributed-core processor. Although processor 132 is depicted as a single processor that is part of a single computing device 130, in some embodiments, processor 132 may be multiple processors distributed over one or many personal devices 120, which may or may not be configured to work together. Processor 132 is illustrated as being configured to execute computer readable instructions in order to execute one or more operations described above, and as illustrated in FIGS. 5, 6A-6H, 7A-7K, and 8A-8J. In some embodiments, processor 132 is designed to be configured to operate as processing module 150, which may include adaptation data correlated to at least one particular party speech aspect managing module 152, adaptation data configured to be applied to the target device for assistance in execution of speech-facilitated transaction transmission to target device when there is an indication of a speech-facilitated transaction between the target device and the particular party facilitating module 154, and acquisition of adaptation result data based on at least one aspect of the speech-facilitated transmission and configured to be used in determining whether to modify adaptation data facilitating module 156.

Referring again to the exemplary environment 100 of FIG. 1, personal device 120 may comprise a memory 134. In some embodiments, memory 134 may comprise of one or more of one or more mass storage devices, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In some embodiments, memory 134 may be located at a single network site. In other embodiments, memory 134 may be located at multiple network sites, including sites that are distant from each other.

As described above, and with reference to FIG. 1, personal device 120 may include a user interface 135. The user interface may be implemented in hardware or software, or both, and may include various input and output devices to allow an operator of personal device 120 to interact with personal device 120. For example, user interface 135 may include, but is not limited to, an audio display, a video display, a microphone, a camera, a keyboard, a mouse, a joystick, a game controller, a touchpad, a handset, or any other device that allows interaction between a computing device and a user. The user interface 135 also may include a speech interface 136, which is configured to receive and/or process speech as input, or to observe and/or record speech of a speech-facilitated transaction.

Referring again to FIG. 1, in some embodiments, personal device 120 may have one or more sensors 182. These sensors include, but are not limited to, a Global Positioning System (GPS) sensor, a still camera, a video camera, an altimeter, an air quality sensor, a barometer, an accelerometer, a charge-coupled device, a radio, a thermometer, a pedometer, a heart monitor, a moisture sensor, a humidity sensor, a microphone, a seismometer, and a magnetic field sensor. Sensors 182 may interface with sensor interface 180. Although FIG. 1B illustrates sensors 182 as part of personal device 120, in some embodiments, sensors 182 may be separated from personal device 120, and communicate via one or more communication networks, e.g., communication networks 140.

Figures 2, 2A:
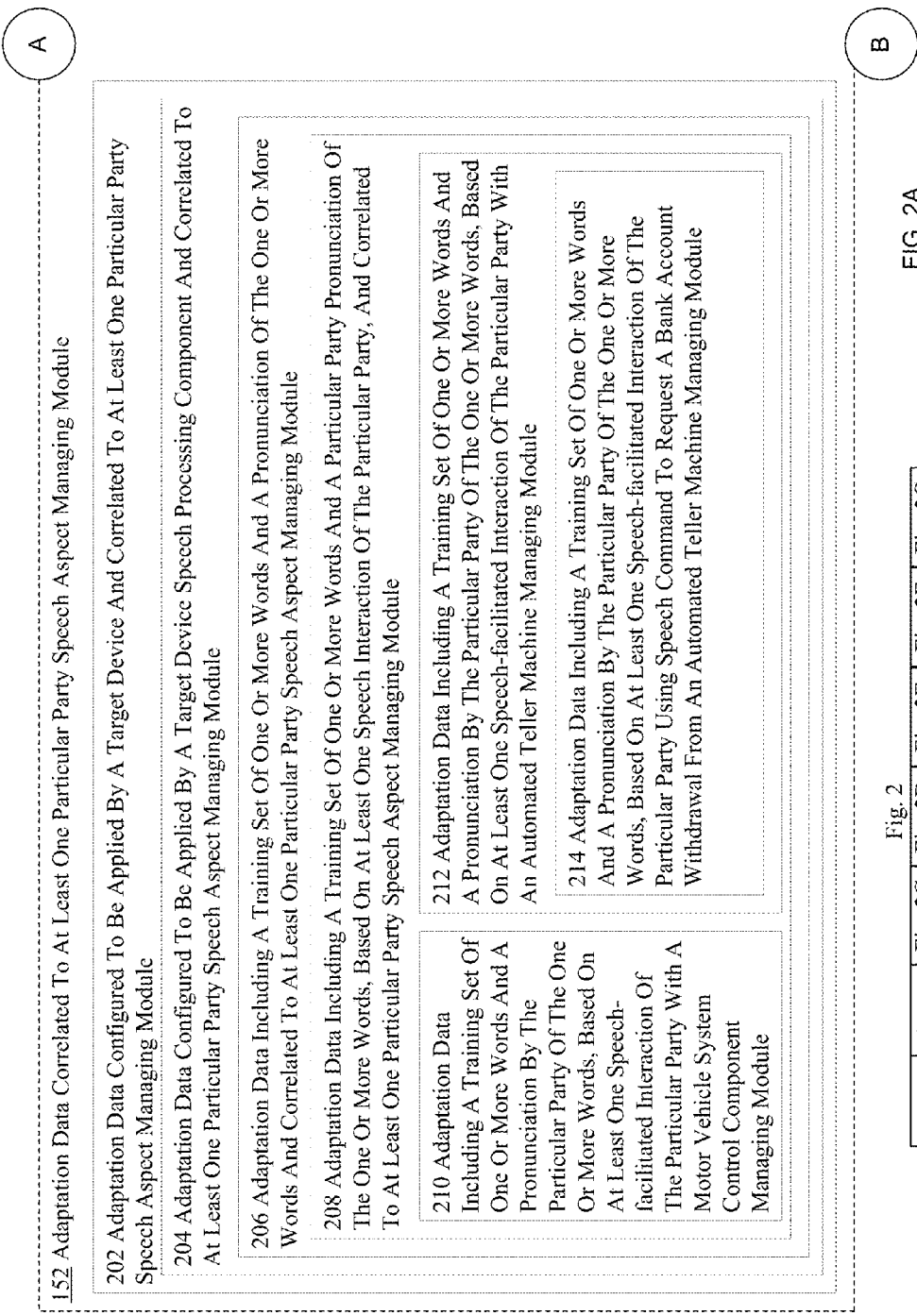

Referring now to FIG. 2, FIG. 2 illustrates an exemplary implementation of the adaptation data correlated to at least one particular party speech aspect managing module 152. As illustrated in FIG. 2, the adaptation data correlated to at least one particular party speech aspect managing module 152 may include one or more sub-logic modules in various alternative implementations and embodiments. For example, as shown in FIG. 2 (e.g., FIG. 2A), in some embodiments, module 152 may include adaptation data configured to be applied by a target device and correlated to at least one particular party speech aspect managing module 202. In some embodiments, module 202 may include adaptation data configured to be applied by a target device speech processing component and correlated to at least one particular party speech aspect managing module 204. In some embodiments, module 204 may include adaptation data including a training set of one or more words and a pronunciation of the one or more words and correlated to at least one particular party speech aspect managing module 206. In some embodiments, module 206 may include adaptation data including a training set of one or more words and a particular party pronunciation of the one or more words, based on at least one speech interaction of the particular party, and correlated to at least one particular party speech aspect managing module 208. In some embodiments, module 208 may include one or more of adaptation data including a training set of one or more words and a pronunciation by the particular party of the one or more words, based on at least one speech-facilitated interaction of the particular party with a motor vehicle system control component managing module 210 and adaptation data including a training set of one or more words and a pronunciation by the particular party of the one or more words, based on at least one speech-facilitated interaction of the particular party with an automated teller machine managing module 212 (e.g., which, in some embodiments, may include adaptation data including a training set of one or more words and a pronunciation by the particular party of the one or more words, based on at least one speech-facilitated interaction of the particular party using speech command to request a bank account withdrawal from an automated teller machine managing module 214.

Referring again to FIG. 2 (e.g., FIG. 2B), in some embodiments, module 152 may include one or more of reference to location of adaptation data storing module 216 (e.g., which, in some embodiments, may include reference to a location of adaptation data in memory of a particular device storing module 220) and adaptation availability at location specified by stored reference testing module 218 (e.g., which, in some embodiments, may include one or more of availability at location specified by stored reference testing by comparing adaptation data size with an expected value module 222 and adaptation availability at location specified by stored reference testing at particular intervals module 224). In some embodiments, module 152 may include one or more of location configurable to store adaptation data determining module 226 (e.g., which, in some embodiments, may include location configurable to store adaptation data determining based on particular party location module 230) and transmission of adaptation data to determined location facilitating module 228. In some embodiments, module 152 may include one or more of location of adaptation data reference storing module 232 and location of adaptation data providing at particular intervals module 234 (e.g., which, in some embodiments, may include location of adaptation data providing at particular intervals to device configured to monitor one or more sets of adaptation data module 236).

Referring again to FIG. 2 (e.g., FIG. 2C), in some embodiments, module 152 may include one or more of adaptation data correlated to at least one particular party speech aspect storing module 238, adaptation data correlated to at least one particular party speech aspect access controlling module 240, adaptation data correlated to at least one characteristic of particular party speech managing module 242, adaptation data comprising instructions for adapting a speech recognition component for processing a portion of the speech facilitated transaction managing module 244, adaptation data comprising instructions for updating a speech recognition component for processing a portion of the speech facilitated transaction managing module 246, and adaptation data comprising instructions for supplementing a speech recognition component for processing a portion of the speech facilitated transaction managing module 248).

Referring again to FIG. 2 (e.g., FIG. 2D), in some embodiments, module 152 may include one or more of adaptation data comprising instructions for configuring a speech recognition component for processing a portion of the speech facilitated transaction managing module 250, adaptation data comprising instructions for determining whether to modify a speech recognition component for processing a portion of the speech facilitated transaction managing module 252, adaptation data comprising instructions for processing at least a portion of the speech-facilitated transaction managing module 254, adaptation data comprising an authorization to retrieve adaptation data from a location managing module 256, adaptation data comprising instructions for retrieving adaptation data from a location managing module 258, and adaptation data comprising particular party identification data and data correlated to the particular party managing module 260.

Referring again to FIG. 2 (e.g., FIG. 2E), in some embodiments, module 152 may include adaptation data at least partly based on at least one particular party speech interaction with a particular device managing module 262. In some embodiments, module 262 may include adaptation data at least partly based on at least one particular party speech interaction with a smartphone managing module 264. In some embodiments, module 264 may include one or more of adaptation data at least partly based on at least one particular party speech interaction with a further party using a smartphone managing module 266 and adaptation data at least partly based on at least one particular party speech interaction to operate a smartphone managing module 268. In some embodiments, module 152 may include one or more of adaptation data comprising instructions for processing at least a portion of the speech-facilitated transaction managing module 270, adaptation data comprising data linking particular party pronunciation of one or more phonemes to one or more concepts managing module 272, adaptation data comprising data linking particular party pronunciation of one or more audibly distinguishable sounds to one or more concepts managing module 274, and adaptation data comprising one or more particular party speech characteristics managing module 276.

Referring again to FIG. 2 (e.g., FIG. 2F), in some embodiments, module 152 may include one or more of adaptation data comprising a pronunciation dictionary managing module 278, adaptation data comprising a phoneme database managing module 280, adaptation data comprising a training set of audio data and corresponding transcript data managing module 282, and adaptation data comprising one or more words that are assigned a statistical-prediction based weight managing module 284. In some embodiments, module 284 may include one or more of adaptation data comprising one or more words that are assigned a frequency of appearance based weight managing module 286 and adaptation data comprising one or more words that are assigned a phrase completion statistical prediction based weight managing module 288.

Referring again to FIG. 2 (e.g., FIG. 2G), in some embodiments, module 152 may include one or more of adaptation data comprising word probability information managing module 290, adaptation data comprising a particular party supervised speech model managing module 292, adaptation data comprising a particular party unsupervised speech model managing module 294, and adaptation data at least partly based on previous speech interaction with target device managing module 296.

Referring now to FIG. 3, FIG. 3 illustrates an exemplary implementation of the adaptation data configured to be applied to the target device for assistance in execution of speech-facilitated transaction transmission to target device when there is an indication of a speech-facilitated transaction between the target device and the particular party facilitating module 154. As illustrated in FIG. 3, the adaptation data configured to be applied to the target device for assistance in execution of speech-facilitated transaction transmission to target device when there is an indication of a speech-facilitated transaction between the target device and the particular party facilitating module 154 may include one or more sub-logic modules in various alternative implementations and embodiments. For example, as shown in FIG. 3 (e.g., FIG. 3A), in some embodiments, module 154 may include adaptation data configured to be applied to the automated airline ticket counter for assistance in execution of speech-facilitated transaction transmission to target device when there is an indication of a speech-facilitated transaction between the target device and the particular party facilitating module 302. Module 302 may include adaptation data configured to be applied to the automated airline ticket counter for assistance in execution of speech-facilitated transaction transmission to target device upon detection of an indication from the automated airline ticket counter of a speech-facilitated transaction between the target device and the particular party facilitating module 304. In some embodiments, module 304 may include adaptation data configured to be applied to the automated airline ticket counter for assistance in execution of speech-facilitated transaction transmission to target device upon indication from the automated airline ticket counter that the particular party has pressed a button on the automated airline ticket counter facilitating module 306. In some embodiments, module 306 may include adaptation data configured to be applied to the automated airline ticket counter for assistance in execution of speech-facilitated transaction transmission to target device upon indication from the automated airline ticket counter that the particular party has pressed a button indicating a request to carry out at least a portion of the transaction using speech facilitating module 308. In some embodiments, module 308 may include adaptation data comprising a training set of at least one word and pronunciation for assistance in execution of speech-facilitated transaction transmission to target device upon indication from the automated airline ticket counter that the particular party has pressed a button indicating a request to carry out at least a portion of the transaction using speech facilitating module 310.

Referring again to FIG. 3 (e.g., FIG. 3B), in some embodiments, module 154 may include one or more of adaptation data configured to be applied to the target device for assistance in execution of speech-facilitated transaction transmitting to target device when there is an indication of a speech-facilitated transaction between the target device and the particular party module 312, instruction for transmitting adaptation data configured to be applied to the target device for assistance in execution of speech-facilitated transaction transmission to target device when there is an indication of a speech-facilitated transaction between the target device and the particular party transmitting module 314, instruction for permitting access to adaptation data by the target device for assistance in execution of speech-facilitated transaction transmission to target device when there is an indication of a speech-facilitated transaction between the target device and the particular party transmitting module 316, and adaptation data configured to be received by the target device for assistance in execution of speech-facilitated transaction when there is an indication of a speech-facilitated transaction between the target device and the particular party broadcasting module 318. In some embodiments, module 318 may include adaptation data configured to be received by the target device when the target device is in a capable range, said adaptation data for assistance in execution of speech-facilitated transaction when there is an indication of a speech-facilitated transaction between the target device and the particular party broadcasting module 320.

Referring again to FIG. 3 (e.g., FIG. 3C), in some embodiments, module 154 may include one or more of availability data indicating adaptation data configured to be received by the target device is available to be received broadcasting module 322, adaptation data configured to be applied to the target device for assistance in execution of speech-facilitated transaction transmission to target device upon initiation of a speech-facilitated transaction by the particular party facilitating module 324 (e.g., which, in some embodiments, may include one or more of adaptation data configured to be applied to the target device for assistance in execution of speech-facilitated transaction transmission to target device upon initiation of a speech-facilitated transaction by speech of the particular party facilitating module 326 and adaptation data configured to be applied to the target device for assistance in execution of speech-facilitated transaction transmission to target device upon initiation of a speech-facilitated transaction by the particular party interacting with a target device input mechanism facilitating module 328) and adaptation data configured to be applied to the target device for assistance in execution of speech-facilitated transaction transmission to target device upon receipt from target device of indication of initiation of a speech-facilitated transaction facilitating module 330.

Referring again to FIG. 3 (e.g., FIG. 3D), in some embodiments, module 154 may include adaptation data configured to be applied to the target device for assistance in execution of speech-facilitated transaction transmission to target device when there is an indication from the target device of a status of the speech-facilitated transaction between the target device and the particular party facilitating module 332. In some embodiments, module 332 may include one or more of adaptation data configured to be applied to the target device for assistance in execution of speech-facilitated transaction transmission to target device when there is an indication from the target device of a particular number of attempts to receive speech from the particular party facilitating module 334, adaptation data configured to be applied to the target device for assistance in execution of speech-facilitated transaction transmission to target device when there is an indication from the target device of a particular number of attempts to receive a particular type of response from the particular party facilitating module 336, adaptation data configured to be applied to the target device for assistance in execution of speech-facilitated transaction transmission to target device when there is an indication from the target device of a particular number of failed attempts to receive a particular type of response from the particular party facilitating module 338, and adaptation data configured to be applied to the target device for assistance in execution of speech-facilitated transaction transmission to target device when there is an indication from the target device that a speech recognition component is processing speech of the particular party below a particular success rate facilitating module 340.

Referring again to FIG. 3 (e.g., FIG. 3E), in some embodiments, module 154 may include module 332, as described above. In some embodiments, module 332 may include one or more of adaptation data configured to be applied to the target device for assistance in execution of speech-facilitated transaction transmission to target device when there is an indication from the target device that a speech recognition component is processing speech of the particular party below a particular estimated success rate facilitating module 342, adaptation data configured to be applied to the target device for assistance in execution of speech-facilitated transaction transmission to target device when there is an indication from the target device that a speech recognition component has a particular party speech recognition rate below a particular threshold facilitating module 344, adaptation data configured to be applied to the target device for assistance in execution of speech-facilitated transaction transmission to target device when there is an indication from the target device that a speech recognition component has a particular party speech recognition error rate above a particular threshold facilitating module 346, adaptation data configured to be applied to the target device for assistance in execution of speech-facilitated transaction transmission to target device when there is an indication from the target device that a speech recognition component has a confidence rate below a particular threshold facilitating module 348, and adaptation data configured to be applied to the target device for assistance in execution of speech-facilitated transaction transmission to target device when there is an indication from the target device that a speech recognition component has a substitution error rate above a particular threshold facilitating module 350.

Referring again to FIG. 3 (e.g., FIG. 3F), in some embodiments, module 154 may include module 332, as described above. In some embodiments, module 332 may include one or more of adaptation data configured to be applied to the target device for assistance in execution of speech-facilitated transaction transmission to target device when there is an indication from the target device that the particular party performed a particular number of repeated utterances facilitating module 352 and adaptation data configured to be applied to the target device for assistance in execution of speech-facilitated transaction transmission to target device upon receipt of indication that a correction rate of correction of speech by particular party feedback is above a particular rate facilitating module 354. In some embodiments, module 154 may include one or more of adaptation data configured to be applied to the target device for assistance in execution of speech-facilitated transaction transmission to target device when the particular party is within a particular proximity to the target device facilitating module 356 and adaptation data configured to be applied to the target device for assistance in execution of speech-facilitated transaction transmission to target device when the target device receives a signal indicating that the particular party is within a particular proximity to the target device facilitating module 358.

Referring again to FIG. 3 (e.g., FIG. 3G), in some embodiments, module 154 may include adaptation data configured to be applied to the target device for assistance in execution of speech-facilitated transaction transmission to target device when a particular device is interacting with the target device facilitating module 360. In some embodiments, module 360 may include one or more of adaptation data configured to be applied to the target device for assistance in execution of speech-facilitated transaction transmission to target device when the particular device is transmitting or receiving data with the target device facilitating module 362, adaptation data configured to be applied to the target device for assistance in execution of speech-facilitated transaction transmission to target device when the particular device is coupled to the target device facilitating module 364, and adaptation data configured to be applied to the target device for assistance in execution of speech-facilitated transaction transmission to target device upon receipt of indication that the particular device is coupled to the target device facilitating module 372. In some embodiments, module 364 may include one or more of adaptation data configured to be applied to the target device for assistance in execution of speech-facilitated transaction transmission to target device when a smartphone associated with the particular party is coupled to the target device facilitating module 366 and adaptation data configured to be applied to the target device for assistance in execution of speech-facilitated transaction transmission to target device when a key associated with the particular party is inserted into the target device facilitating module 368. In some embodiments, module 368 may include adaptation data configured to be applied to the target device for assistance in execution of speech-facilitated transaction transmission to target device when a key associated with the particular party is inserted into a motor vehicle facilitating module 370.

Referring again to FIG. 3 (e.g., FIG. 3H), in some embodiments, module 154 may include one or more of adaptation data configured to be applied to a speech recognition component of the target device for assistance in execution of speech-facilitated transaction transmission to target device when there is an indication of a speech-facilitated transaction between the target device and the particular party facilitating module 374, adaptation data configured to modify a speech recognition component of the target device for assistance in execution of speech-facilitated transaction transmission to target device when there is an indication of a speech-facilitated transaction between the target device and the particular party facilitating module 376, adaptation data configured to supplement a speech recognition component of the target device for assistance in execution of speech-facilitated transaction transmission to target device when there is an indication of a speech-facilitated transaction between the target device and the particular party facilitating module 378, and adaptation data configured to replace a speech recognition component of the target device for assistance in execution of speech-facilitated transaction transmission to target device when there is an indication of a speech-facilitated transaction between the target device and the particular party facilitating module 380.

Referring again to FIG. 3 (e.g., FIG. 3I), in some embodiments, module 154 may include one or more of adaptation data configured to replace a speech recognition component of the target device for assistance in execution of speech-facilitated transaction transmission to target device when there is an indication of a speech-facilitated transaction between the target device and the particular party facilitating module 380, adaptation data configured to be applied to the target device to improve accuracy in processing speech received during execution of the speech-facilitated transaction transmission to target device when there is an indication of a speech-facilitated transaction between the target device and the particular party facilitating module 382, adaptation data configured to be applied to the target device to improve performance in processing speech received during execution of the speech-facilitated transaction transmission to target device when there is an indication of a speech-facilitated transaction between the target device and the particular party facilitating module 384 (e.g., which, in some embodiments, may include adaptation data configured to be applied to the target device to improve speed in processing speech received during execution of the speech-facilitated transaction transmission to target device when there is an indication of a speech-facilitated transaction between the target device and the particular party facilitating module 386), adaptation data configured to be applied to the target device for assistance in execution of speech-facilitated transaction transmission to target device during the speech-facilitated transaction between the target device and the particular party facilitating module 388, and adaptation data configured to be applied to the target device to perform at least one step in processing speech of the speech-facilitated transaction transmission to target device when there is an indication of a speech-facilitated transaction between the target device and the particular party facilitating module 390.

Figure 4A:
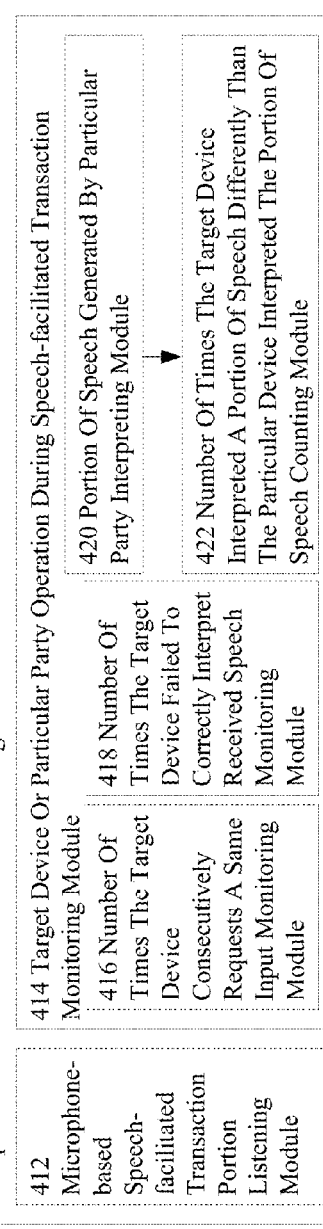
Figure 4C:
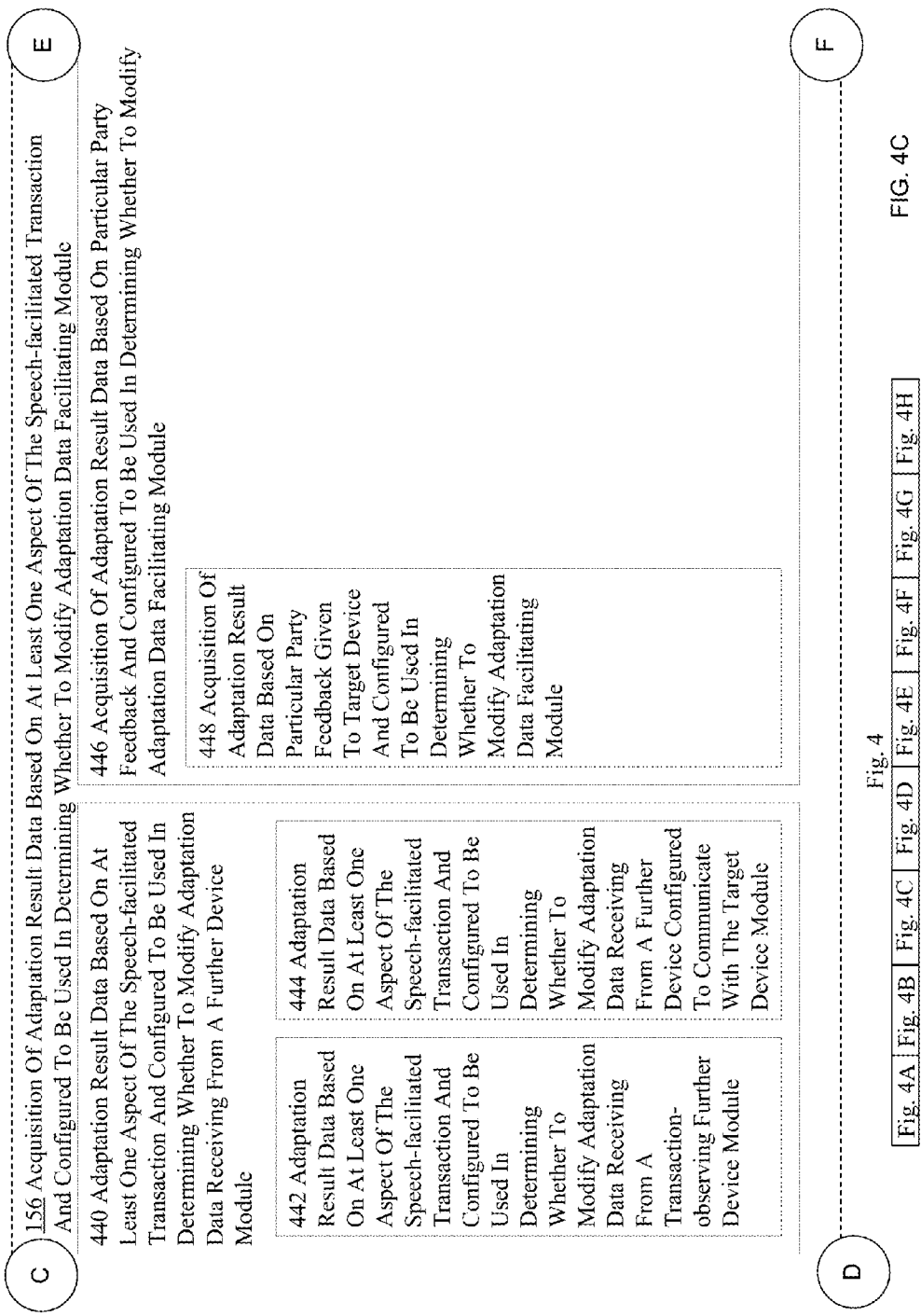
Figure 4D:
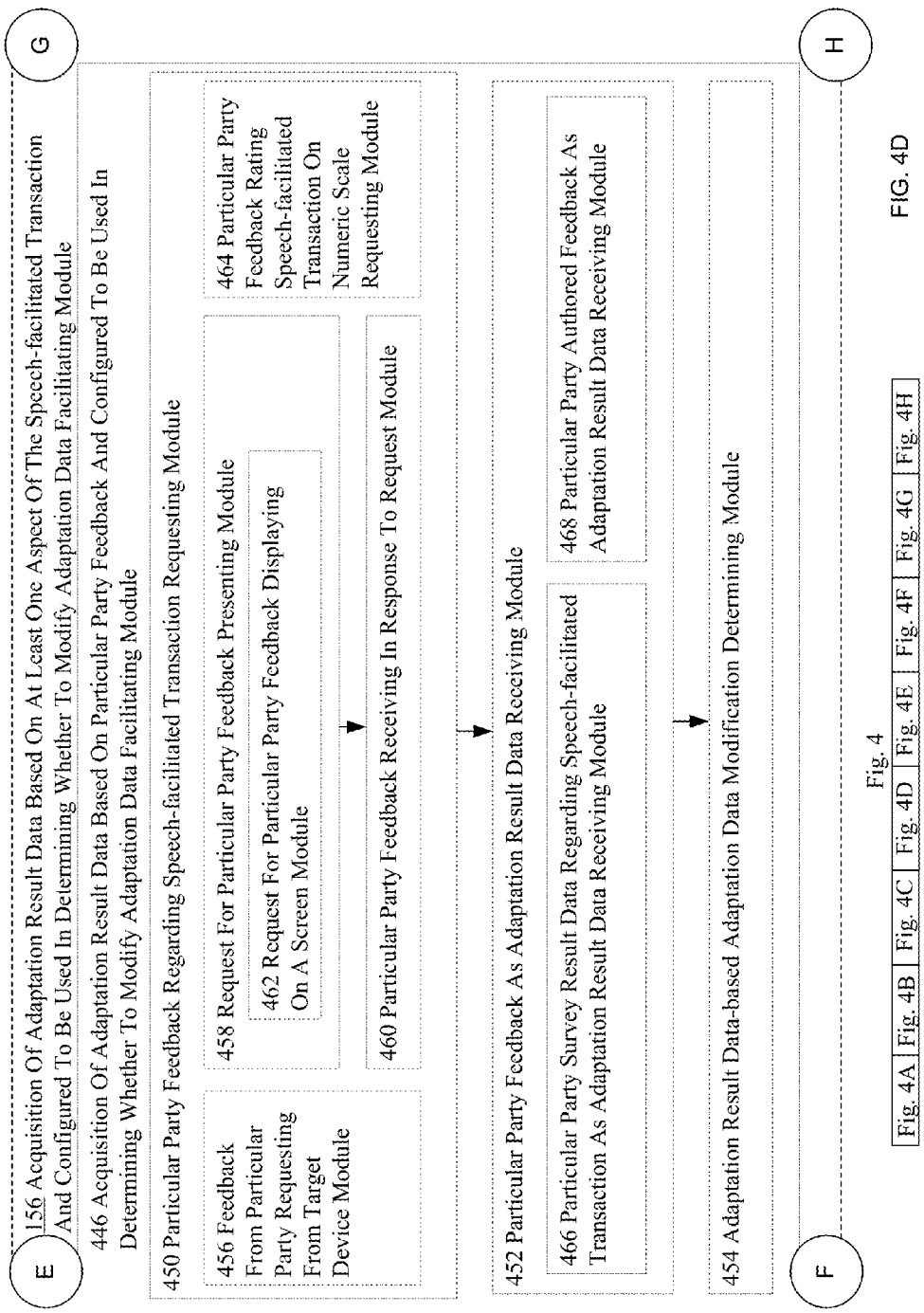
Figure 4:
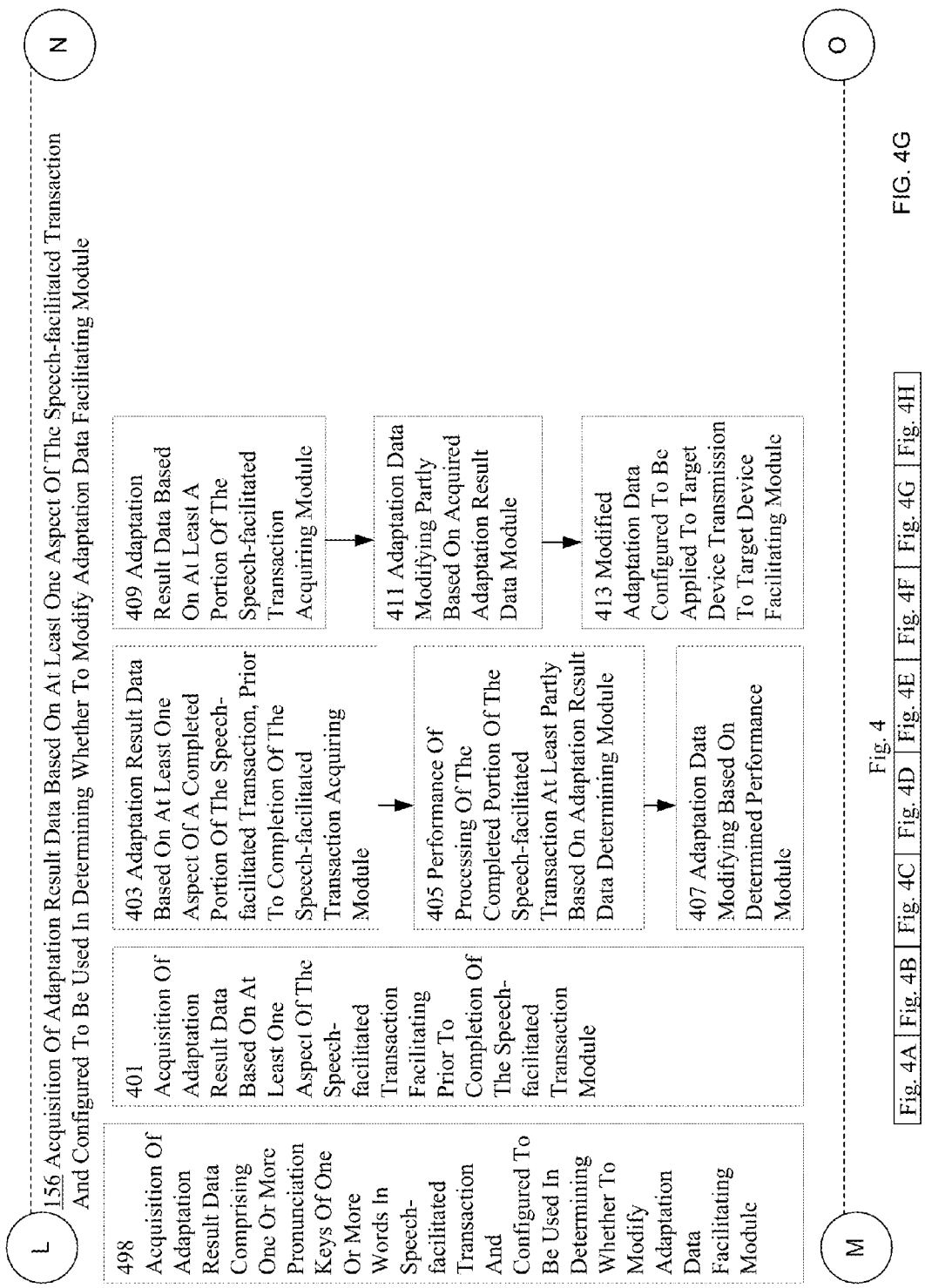
FIG. 4, including

Referring now to FIG. 4, FIG. 4 illustrates an exemplary implementation of the acquisition of adaptation result data based on at least one aspect of the speech-facilitated transaction and configured to be used in determining whether to modify adaptation data facilitating module 156. As illustrated in FIG. 4, the acquisition of adaptation result data based on at least one aspect of the speech-facilitated transaction and configured to be used in determining whether to modify adaptation data facilitating module 156 may include one or more sub-logic modules in various alternative implementations and embodiments. For example, as shown in FIG. 4 (e.g., FIG. 4A), in some embodiments, module 156 may include adaptation result data based on at least one aspect of the speech-facilitated transaction and configured to be used in determining whether to modify adaptation data generating module 402. In some embodiments, module 402 may include adaptation result data based on a result of the speech-facilitated transaction and configured to be used in determining whether to modify the adaptation data generating module 404. In some embodiments, module 404 may include one or more of speech-facilitated transaction observing module 406, observed speech-facilitated transaction result-based adaptation result data creating module 408, and created adaptation result data-based adaptation data modification determining module 410. In some embodiments, module 406 may include one or more of microphone-based speech-facilitated transaction portion listening module 412 and target device or particular party operation during speech-facilitated transaction monitoring module 414. In some embodiments, module 414 may include one or more of number of times the target device consecutively requests a same input monitoring module 416 and number of times the target device failed to correctly interpret received speech monitoring module 418. In some embodiments, module 414 may further include one or more of portion of speech generated by particular party interpreting module 420 and number of times the target device interpreted a portion of speech differently than the particular device interpreted the portion of speech counting module 422.

Referring again to FIG. 4 (e.g., FIG. 4B), module 156 may include one or more of adaptation result data based on at least one aspect of the speech-facilitated transaction and configured to be used in determining whether to modify adaptation data receiving module 428, adaptation result data based on at least one aspect of the speech-facilitated transaction and configured to be used in determining whether to modify adaptation data location at which adaptation result data is configured to be received providing module 430, data regarding speech-facilitated transaction receiving module 432 (e.g., which, in some embodiments, may include data regarding speech-facilitated transaction receiving from target device 436), received data into adaptation result data based on at least one aspect of speech-facilitated transaction processing module 434, and adaptation result data based on at least one aspect of the speech-facilitated transaction and configured to be used in determining whether to modify adaptation data receiving from target device module 438.

Referring again to FIG. 4 (e.g., FIG. 4C), module 156 may include one or more of adaptation result data based on at least one aspect of the speech-facilitated transaction and configured to be used in determining whether to modify adaptation data receiving from a further device module 440 (e.g., which, in some embodiments, may include one or more of adaptation result data based on at least one aspect of the speech-facilitated transaction and configured to be used in determining whether to modify adaptation data receiving from a transaction-observing further device module 442 and adaptation result data based on at least one aspect of the speech-facilitated transaction and configured to be used in determining whether to modify adaptation data receiving from a further device configured to communicate with the target device module 444) and acquisition of adaptation result data based on particular party feedback and configured to be used in determining whether to modify adaptation data facilitating module 446. In some embodiments, module 446 may include acquisition of adaptation result data based on particular party feedback given to target device and configured to be used in determining whether to modify adaptation data facilitating module 448.

Referring again to FIG. 4 (e.g., FIG. 4D), module 156 may include module 446, as described above. In some embodiments, module 446 may further include one or more of particular party feedback regarding speech-facilitated transaction requesting module 450, particular party feedback as adaptation result data receiving module 452, and adaptation result data-based adaptation data modification determining module 454. In some embodiments, module 450 may include one or more of feedback from particular party requesting from target device module 456, request for particular party feedback presenting module 458 (e.g., which, in some embodiments, may include request for particular party feedback displaying on a screen module 462), particular party feedback receiving in response to request module 460, and particular party feedback rating speech-facilitated transaction on numeric scale requesting module 464. In some embodiments, module 452 may include one or more of particular party survey result data regarding speech-facilitated transaction as adaptation result data receiving module 466 and particular party authored feedback as adaptation result data receiving module 468.

Referring again to FIG. 4 (e.g., FIG. 4E), module 156 may include one or more of request for particular party to complete a survey regarding the speech-facilitated transaction presenting module 470, result of survey regarding the speech-facilitated transaction collecting module 472, result of survey regarding the speech-facilitated transaction retrieving module 474, and acquisition of adaptation result data based analysis of the speech-facilitated transaction and configured to be used in determining whether to modify adaptation data facilitating module 476. In some embodiments, module 476 may include one or more of acquisition of adaptation result data based target device-performed analysis of the speech-facilitated transaction and configured to be used in determining whether to modify adaptation data facilitating module 478, acquisition of adaptation result data based analysis of a recognition rate of one or more words of the speech-facilitated transaction and configured to be used in determining whether to modify adaptation data facilitating module 480, acquisition of adaptation result data based analysis of an error rate of at least a portion of the speech-facilitated transaction and configured to be used in determining whether to modify adaptation data facilitating module 482, and acquisition of adaptation result data based analysis of a repeated word rate in the speech-facilitated transaction and configured to be used in determining whether to modify adaptation data facilitating module 484.

Referring again to FIG. 4 (e.g., FIG. 4F), module 156 may include module 476, as described above. In some embodiments, module 476 may further include one or more of acquisition of adaptation result data based analysis of a confidence rate of at least a portion of the speech-facilitated transaction and configured to be used in determining whether to modify adaptation data facilitating module 486 and acquisition of adaptation result data based on detected proximate utterances during the speech-facilitated transaction and configured to be used in determining whether to modify adaptation data facilitating module 488. In some embodiments, module 156 may include acquisition of adaptation result data comprising pronunciation information based on one or more words in speech-facilitated transaction and configured to be used in determining whether to modify adaptation data facilitating module 490, acquisition of adaptation result data comprising frequency information of one or more words in speech-facilitated transaction and configured to be used in determining whether to modify adaptation data facilitating module 492, and acquisition of adaptation result data comprising a phonemic transcription of one or more words in speech-facilitated transaction and configured to be used in determining whether to modify adaptation data facilitating module 494 (e.g., which, in some embodiments, may include acquisition of adaptation result data comprising a user-specific phonemic transcription of one or more words in speech-facilitated transaction and configured to be used in determining whether to modify adaptation data facilitating module 496.

Referring again to FIG. 4 (e.g., FIG. 4G), module 156 may include one or more of acquisition of adaptation result data comprising one or more pronunciation keys of one or more words in speech-facilitated transaction and configured to be used in determining whether to modify adaptation data facilitating module 498, acquisition of adaptation result data based on at least one aspect of the speech-facilitated transaction facilitating prior to completion of the speech-facilitated transaction module 401, adaptation result data based on at least one aspect of a completed portion of the speech-facilitated transaction, prior to completion of the speech-facilitated transaction acquiring module 403, performance of processing of the completed portion of the speech-facilitated transaction at least partly based on adaptation result data determining module 405, adaptation data modifying based on determined performance module 407, adaptation result data based on at least a portion of the speech-facilitated transaction acquiring module 409, adaptation data modifying partly based on acquired adaptation result data module 411, and modified adaptation data configured to be applied to target device transmission to target device facilitating module 413.

Referring again to FIG. 4 (e.g., FIG. 4H), module 156 may include one or more of adaptation result data based on at least one aspect of speech-facilitated transaction receiving module 415, adaptation data modification determination based on received adaptation result data module 417 (e.g., which, in some embodiments, may include one or more of performance of speech-facilitated transaction evaluating based on adaptation result data module 421 and speech recognition component performance improvement by adaptation data determining module 423), adaptation data modifying based on adaptation result data module 419, acquisition of adaptation result data based on analysis of at least one aspect of speech-facilitated transaction and configured to be used in modifying adaptation data facilitating module 425, and instructions for modifying adaptation data that are at least partly based on adaptation result data transmitting module 427.

Figure 5:
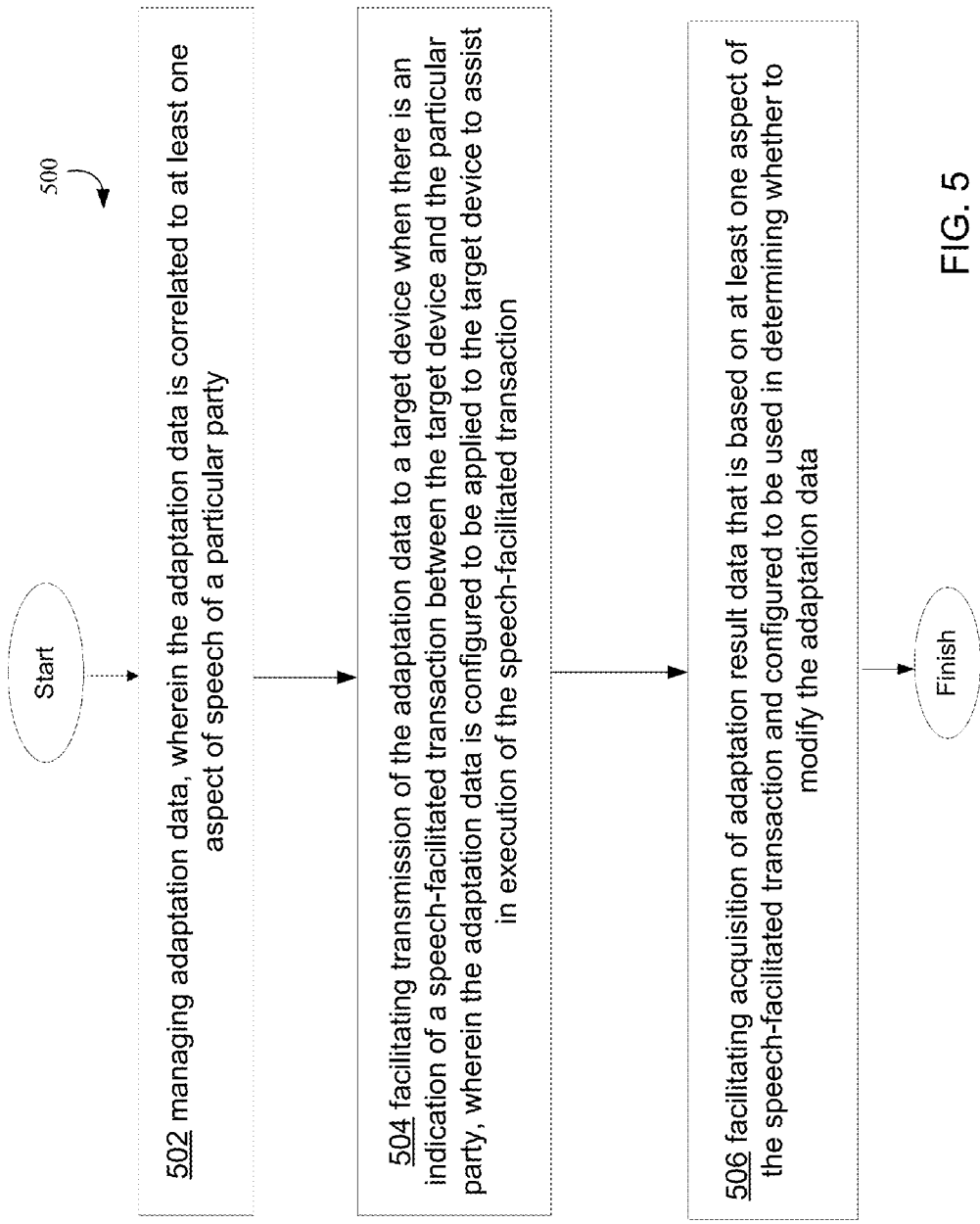
FIG. 5 is a high-level logic flowchart of a process, e.g., operational flow 500, according to an embodiment.

A more detailed discussion related to personal device 120 of FIG. 1 now will be provided with respect to the processes and operations to be described herein. Referring now to FIG. 5, FIG. 5 illustrates an operational flow 500 representing example operations for, among other methods, managing adaptation data, wherein the adaptation data is at least partly based on at least one speech interaction of a particular party, facilitating transmission of the adaptation data to a target device when there is an indication of a speech-facilitated transaction between the target device and the particular party, wherein the adaptation data is configured to be applied to the target device to assist in execution of the speech-facilitated transaction, and facilitating acquisition of adaptation result data that is based on at least one aspect of the speech-facilitated transaction and configured to be used in determining whether to modify the adaptation data.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Further, in FIG. 6 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 6 as well as the other operations to be described herein may be performed by at least one of a machine, an article of manufacture, or a composition of matter.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

Portions of this application may reference trademarked companies and products merely for exemplary purposes. All trademarks remain the sole property of the trademark owner, and in each case where a trademarked product or company is used, a similar product or company may be replaced.

In FIG. 5 and in the following FIGS. 6-8 that include various examples of operational flows, discussions and explanations will be provided with respect to the exemplary environment 100 as described above and as illustrated in FIG. 1, and with respect to other examples (e.g., as provided in FIGS. 2-4) and contexts. It should be understood that the operational flows may be executed in a number of other environments and contexts, and/or in modified versions of the systems shown in FIGS. 2-4. Although the various operational flows are presented in the sequence(s) illustrated, it should be understood that the various operations may be performed in other orders other than those which are illustrated, or may be performed concurrently.

The following examples are meant to be non-exhaustive illustrations of a few of the many embodiments disclosed in the invention. Descriptive statements or other statements that define, limit, or further elaborate upon the function, operation, execution, or implementation of the following examples are intended to apply in the context of the described exemplary embodiment, and are intended to show that said examples could be applied to any other embodiment when not inconsistent with other explicit descriptions, but should not be interpreted as limiting any other embodiment, whether explicitly listed or implicitly encompassed by the scope of the invention set forth in the foregoing claims.

Referring again to FIG. 5, FIG. 5 shows operation 500 that includes operation 502 depicting managing adaptation data, wherein the adaptation data is at least partly based on at least one speech interaction of a particular party. For example, FIG. 1 shows adaptation data correlated to at least one particular party speech aspect managing module 152 managing adaptation data (e.g., storing, tracking, monitoring, authorizing, changing the permissions of, providing access, allocating storage for, retrieving, receiving, processing, altering, comparing, or otherwise performing one or more operations on adaptation data), wherein the adaptation data (e.g., a phrase completion algorithm used to assist in interpreting spoken words based on context) is at least partly based on at least one speech interaction of a particular party (e.g., the user previously conducted a speech-facilitated transaction with a different automated teller machine device terminal, and the groupings of words spoken by the user assisted in forming the contextual rules used by at least a portion of the phrase completion algorithm).

Referring again to FIG. 5, operation 500 may include operation 504 depicting facilitating transmission of the adaptation data to a target device when there is an indication of a speech-facilitated transaction between the target device and the particular party, wherein the adaptation data is configured to be applied to the target device to assist in execution of the speech-facilitated transaction. For example, FIG. 1 shows adaptation data configured to be applied to the target device for assistance in execution of speech-facilitated transaction transmission to target device when there is an indication of a speech-facilitated transaction between the target device and the particular party facilitating module 154 facilitating transmission (e.g., transmitting, or taking one or more steps that will assist in the transmission of, regardless of the starting or ending point) of the adaptation data (e.g., a phrase completion algorithm used to assist in interpreting spoken words based on context) when there is an indication (e.g., a user either stands in front of an automated teller machine device terminal, or inserts her card, or pushes a button, or speaks a start phrase that is displayed on the screen of the automated teller machine device terminal) of a speech-facilitated transaction (e.g., withdrawing two hundred dollars from the automated teller machine device terminal by commanding the automated teller machine device using speech commands for at least part of the transaction) between the target device (e.g., the automated teller machine device terminal) and the particular party (e.g., the user), wherein the adaptation data (e.g., the phrase completion algorithm used to assist in interpreting spoken words based on context) is configured to be applied (e.g., the phrase completion algorithm will be used in conjunction with one or more other operations carried out by a speech processing component of the automated teller machine device terminal) to assist in execution (e.g., to be used in at least one operation that will or could be carried out) of a speech-facilitated transaction (e.g., withdrawing two hundred dollars from the automated teller machine device terminal by commanding the automated teller machine device using speech commands for at least part of the transaction).

Referring again to FIG. 5, operation 500 may include operation 506 depicting facilitating acquisition of adaptation result data that is based on at least one aspect of the speech-facilitated transaction and configured to be used in determining whether to modify the adaptation data. For example, FIG. 1 shows acquisition of adaptation result data based on at least one aspect of the speech-facilitated transmission and configured to be used in determining whether to modify adaptation data facilitating module 156 facilitating acquisition (e.g., creating, generating, modifying, receiving, retrieving, or otherwise obtaining) of adaptation result data (e.g., a rolling confidence rate that is based on a confidence level that the automated teller machine device has interpreted a word of the received speech of the user correctly) that is based on at least one aspect (e.g., confidence of proper interpretation) of the speech-facilitated transaction (e.g., withdrawing two hundred dollars from the automated teller machine device terminal by commanding the automated teller machine device using speech commands for at least part of the transaction) and configured to be used (e.g., is capable of being used for at least a part of at least one operation of) in determining whether to modify (e.g., determining whether to change or update, e.g., change a parameter of the phrase completion algorithm, or change a context path) the adaptation data (e.g., the phrase completion algorithm used to assist in interpreting spoken words based on context).

Figure 6A:
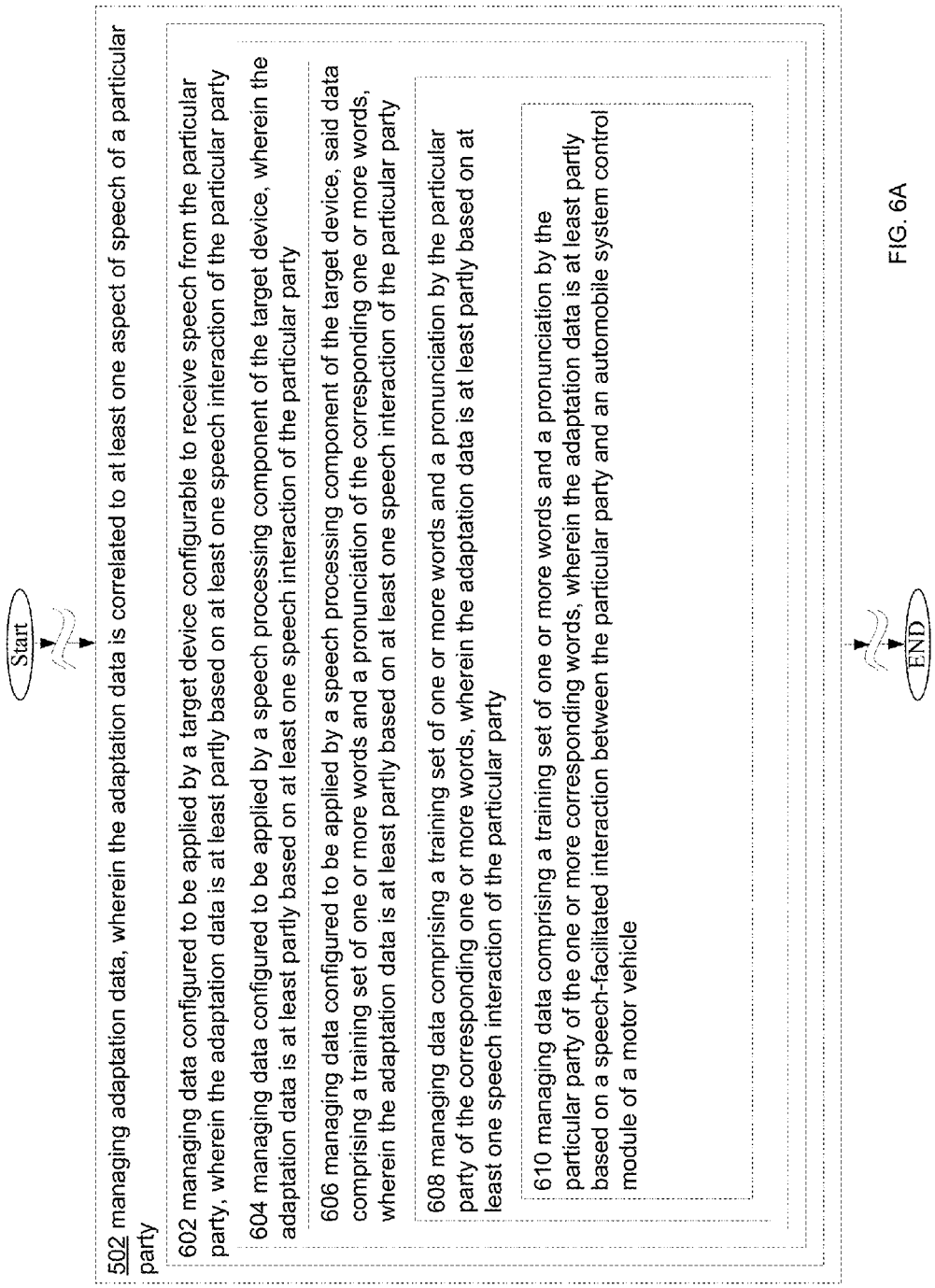
FIG. 6A is a high-level logic flowchart of a process depicting alternate implementations of a managing adaptation data operation 502 of FIG. 5.

FIGS. 6A-6H depict various implementations of operation 502, according to embodiments. Referring now to FIG. 6A, operation 502 may include operation 602 depicting managing data configured to be applied by a target device configured to receive speech from the particular party, wherein the adaptation data is at least partly based on at least one speech interaction of the particular party. For example, FIG. 2, e.g., FIG. 2A, shows adaptation data configured to be applied by a target device and correlated to at least one particular party speech aspect managing module 202 managing (e.g., storing, tracking, monitoring, authorizing, changing the permissions of, providing access, allocating storage for, retrieving, receiving, processing, altering, comparing, or otherwise performing one or more operations on) data (e.g., a pronunciation dictionary) configured to be applied by a target device (e.g., a speech-command enabled DVD player) configured to receive speech from the particular party (e.g., the user of the speech-enabled DVD player), wherein the adaptation data (e.g., the pronunciation dictionary) is at least partly based on at least one speech interaction of the particular party (e.g., when the user has a speech interaction that includes the word "play," the pronunciation of that word is added to the pronunciation dictionary).

Referring again to FIG. 6A, operation 602 may include operation 604 depicting managing data configured to be applied by a speech processing component of the target device, wherein the adaptation data is at least partly based on at least one speech interaction of the particular party. For example, FIG. 2, e.g., FIG. 2A, shows adaptation data configured to be applied by a target device speech processing component and correlated to at least one particular party speech aspect managing module 204 managing data configured to be applied by a speech processing component (e.g., a software module loaded onto a network computer) of the target device (e.g., a networked computer in an enterprise office setting), wherein the adaptation data (e.g., a phoneme database) is at least partly based on at least one speech interaction (e.g., an out-of-place pronunciation of a phoneme that is detected is added to the phoneme database as a possible pronunciation of that phoneme) of the particular party (e.g., the user).

Referring again to FIG. 6A, operation 604 may include operation 606 depicting managing data configured to be applied by a speech processing component of the target device, said data comprising a training set of one or more words and a pronunciation of the corresponding one or more words, wherein the adaptation data is at least partly based on at least one speech interaction of the particular party. For example, FIG. 2, e.g., FIG. 2A, shows adaptation data comprising a training set of one or more words and a pronunciation of the one or more words and correlated to at least one particular party speech aspect managing module 206 managing data configured to be applied by a speech processing component (e.g., hardware on an automated teller machine including the microphone and logic circuits on a chip that receive and process speech) of the target device (e.g., the automated teller machine device), said data comprising a training set of one or more words (e.g., "withdraw" and "checking account") and a pronunciation of the corresponding one or more words, wherein the adaptation data (e.g., the training set of the words "withdraw" and "checking account" and their pronunciations) is at least partly based on at least one speech interaction of the particular party (e.g., a user trains the adaptation data by repeating the words "withdraw" and "checking account" in a closed environment).

Referring again to FIG. 6A, operation 606 may include operation 608 depicting managing data comprising a training set of one or more words and a pronunciation by the particular party of the corresponding one or more words, wherein the adaptation data is at least partly based on at least one speech interaction of the particular party. For example, FIG. 2, e.g., FIG. 2A, shows adaptation data including a training set of one or more words and a particular party pronunciation of the one or more words, based on at least one speech interaction of the particular party, and correlated to at least one particular party speech aspect managing module 208 managing data comprising a training set of one or more words (e.g., "go home" and "Dulles Airport") and a pronunciation by the particular party (e.g., the owner of a navigational device) of the corresponding one or more words (e.g., "go home" and "Dulles Airport"), wherein the adaptation data is at least partly based on at least one speech interaction of the particular party (e.g., the user previously spoke those words while attempting to use the navigational device).

Referring again to FIG. 6A, operation 608 may include operation 610 depicting managing data comprising a training set of one or more words and a pronunciation by the particular party of the corresponding one or more words, wherein the adaptation data is at least partly based on a speech-facilitated interaction between the particular party and an automobile system control module of a motor vehicle. For example, FIG. 2, e.g., FIG. 2A, shows adaptation data including a training set of one or more words and a pronunciation by the particular party of the one or more words, based on at least one speech-facilitated interaction of the particular party with a motor vehicle system control component managing module 210 managing data comprising a training set of one or more words (e.g., "left window" and "play Norah Jones") and a pronunciation by the particular party of the corresponding one or more words (e.g., "left window" and "play Norah Jones"), wherein the adaptation data is at least partly based on a speech-facilitated interaction (e.g., a previous usage) between the particular party (e.g., the driver of an automobile) and an automobile system control module of a motor vehicle.

Figure 6B:
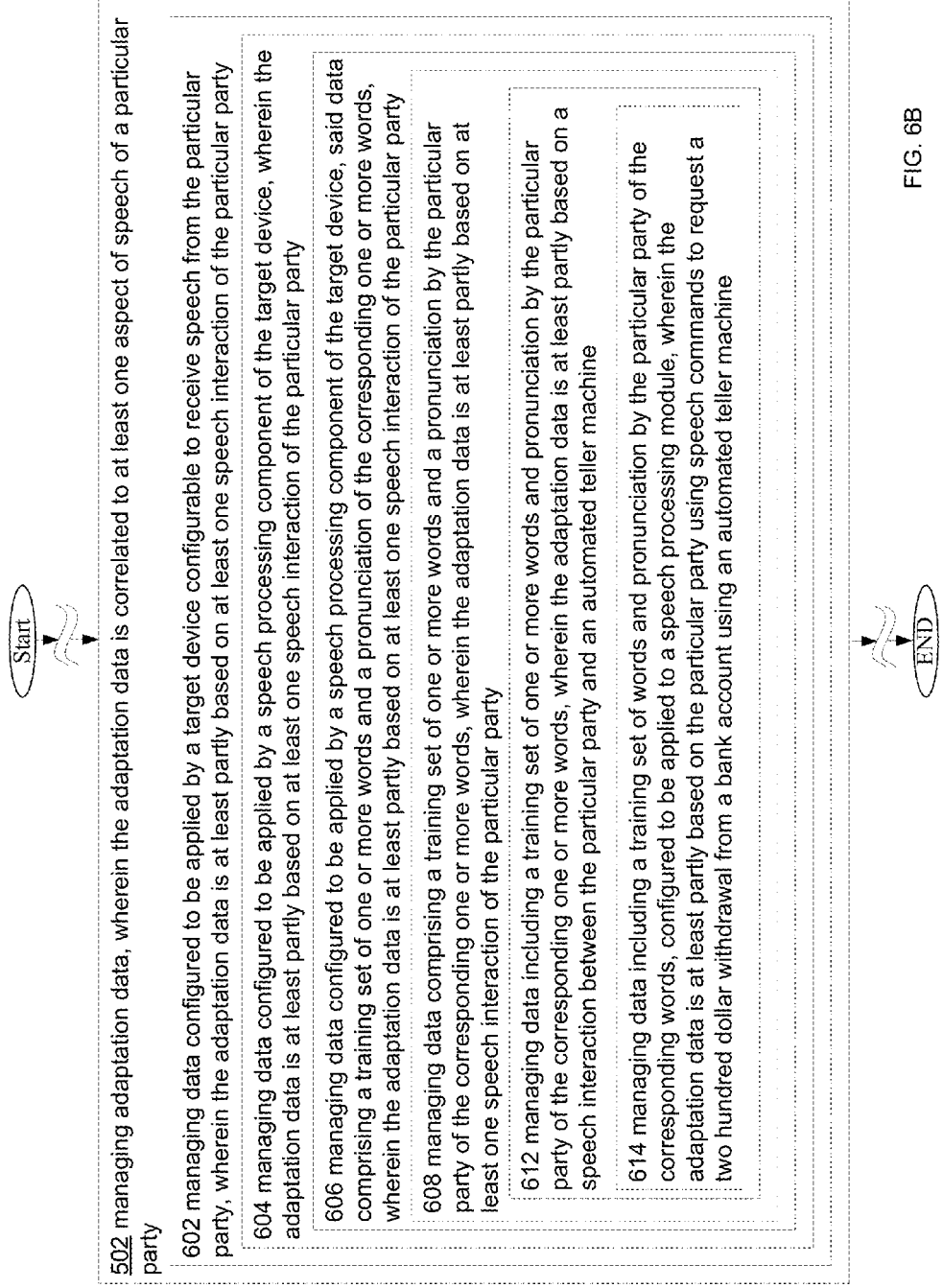
FIG. 6B is a high-level logic flowchart of a process depicting alternate implementations of a managing adaptation data operation 502 of FIG. 5.

Referring now to FIG. 6B, operation 608 may include operation 612 depicting managing data including a training set of one or more words and pronunciation by the particular party of the corresponding one or more words, wherein the adaptation data is at least partly based on a speech interaction between the particular party and an automated teller machine. For example, FIG. 2, e.g., FIG. 2A, shows adaptation data including a training set of one or more words and a pronunciation by the particular party of the one or more words, based on at least one speech-facilitated interaction of the particular party with an automated teller machine managing module 212 managing data including a training set of one or more words (e.g., the numbers 0 to 300, in increments of ten) and pronunciation by the particular party (e.g., the user of the automated teller machine device) of the corresponding one or more words (e.g., the numbers 0 to 300, in increments of ten), wherein the adaptation data is at least partly based on a speech interaction between the particular party and an automated teller machine (e.g., the training set is based on the user's previous five interactions with different automated teller machines).

Referring again to FIG. 6B, operation 612 may include operation 614 depicting managing data including a training set of words and pronunciation by the particular party of the corresponding words, configured to be applied to a speech processing module, wherein the adaptation data is at least partly based on the particular party using speech commands to request a two hundred dollar withdrawal from a bank account using an automated teller machine. For example, FIG. 2, e.g., FIG. 2A, shows adaptation data including a training set of one or more words and a pronunciation by the particular party of the one or more words, based on at least one speech-facilitated interaction of the particular party using speech command to request a bank account withdrawal from an automated teller machine managing module 214 managing data including a training set of words (e.g., "two hundred dollars" and "withdrawal") and a pronunciation by the particular party of the corresponding words, configured to be applied to a speech processing module, wherein the adaptation data is at least partly based on the particular party using speech commands (e.g., previous one or more times the user withdraw his or her favorite amount of money, e.g., two hundred dollars) to request a two hundred dollar withdrawal from a bank account using an automated teller machine.

Figure 2B:
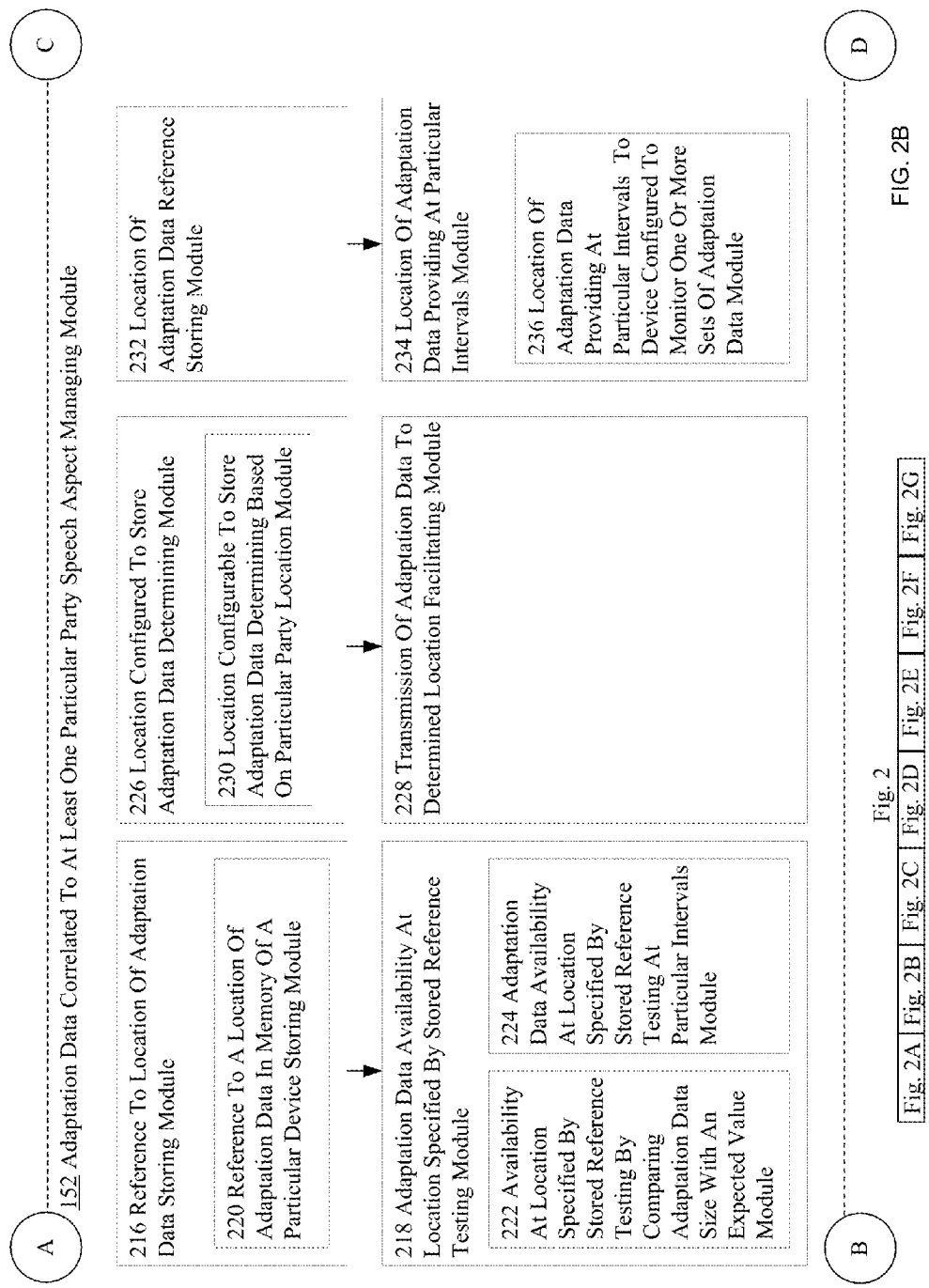
Figure 6C:
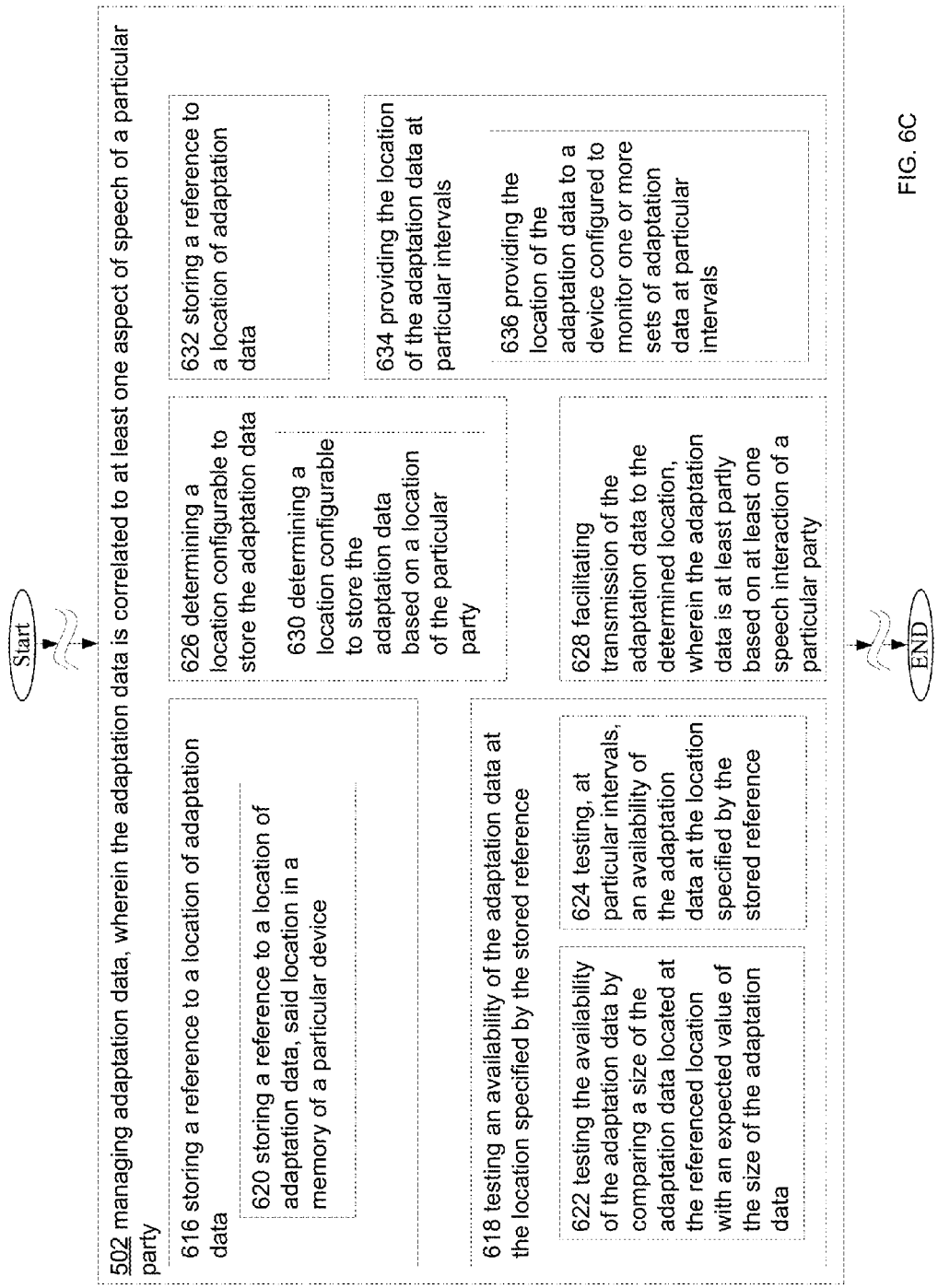
FIG. 6C is a high-level logic flowchart of a process depicting alternate implementations of a managing adaptation data operation 502 of FIG. 5.

Referring now to FIG. 6C, operation 502 may include operation 616 depicting storing a reference to a location of adaptation data. For example, FIG. 2, e.g., FIG. 2B, shows reference to location of adaptation data storing module 216 storing a reference to a location (e.g., a network address inside an intranet, an IP address of a computer, a MAC address of a physical device, an account inside a cloud storage service, or a world wide web address) of adaptation data (e.g., an utterance ignoring algorithm).

Referring again to FIG. 6C, operation 502 may include operation 618 depicting testing an availability of the adaptation data at the location specified by the stored reference. For example, FIG. 2, e.g., FIG. 2B, shows adaptation availability at location specified by stored reference testing module 218 testing an availability of the adaptation data (e.g., checking the size of the adaptation data against a known size, or resolving a hash corresponding to the saved adaptation data) at the location specified by the stored reference (e.g., the particular page of memory inside the solid state memory).

Referring again to FIG. 6C, operation 616 may include operation 620 depicting storing a reference to a location of adaptation data, said location in a memory of a particular device. For example, FIG. 2, e.g., FIG. 2B, shows reference to a location of adaptation data in memory of a particular device storing module 220 (e.g., saving or facilitating a saving at a particular location) a reference to a location (e.g., a particular page of memory inside a solid state memory) of adaptation data (e.g., a path completion algorithm), said location in a memory (e.g., a solid state memory, which may or may not be removable) of a particular device (e.g., a smartphone)

Referring again to FIG. 6C, operation 618 may include operation 622 depicting testing the availability of the adaptation data by comparing a size of the adaptation data located at the referenced location with an expected value of the size of the adaptation data. For example, FIG. 2, e.g., FIG. 2B, shows availability at location specified by stored reference testing by comparing adaptation data size with an expected value module 222 testing the availability (e.g., whether the adaptation data has been altered, e.g., corrupted, or otherwise modified, or if it still exists at the referenced location, or testing if the connection to the referenced location if the referenced location is a remote location) with an expected value of the size of the adaptation data (e.g., the expected value of the size of the adaptation data is stored separately, and compared to the measured size, to quickly determine if changes to the adaptation data have been made).

Referring again to FIG. 6C, operation 618 may include operation 224 depicting testing, at particular intervals, an availability of the adaptation data at the location specified by the stored reference. For example, FIG. 2, e.g., FIG. 2B, shows adaptation availability at location specified by stored reference testing at particular intervals module 224 testing, at particular intervals (e.g., once a day, or once an hour, or once a month, for example), an availability of the adaptation data (e.g., whether the adaptation data is located at the location specified, and whether it is currently accessible, whether due to connectivity, permissions, or other factors) at the location specified by the stored reference (e.g., a location on Amazon's cloud drive service).

Referring again to FIG. 6C, operation 502 may include operation 626 depicting determining a location configured to store the adaptation data. For example, FIG. 2, e.g., FIG. 2B, shows location configured to store adaptation data determining module 226 determining a location (e.g., a network location accessible over the internet) configured to store (e.g., capable of storing, e.g., has the space and capability to receive) the adaptation data (e.g., a regional dialect speech modification algorithm).

Referring again to FIG. 6C, operation 502 may include operation 628 depicting facilitating transmission of the adaptation data to the determined location. For example, FIG. 2, e.g., FIG. 2B, shows transmission of adaptation data to determined location facilitating module 228 facilitating (e.g., performing at least one operation which assists, whether directly or indirectly, in the transmission of) transmission of the adaptation data (e.g., a foreign language accent modifier algorithm) to the determined location (e.g., the network location accessible over the internet).

Referring again to FIG. 6C, operation 626 may include operation 630 depicting determining a location configured to store the adaptation data based on a location of the particular party. For example, FIG. 2, e.g., FIG. 2B, shows location configured to store adaptation data determining based on particular party location module 230 determining a location (e.g., selecting a server from many servers scattered across the world) configured to store (e.g., capable of receiving, storing, and transmitting an amount of data greater than or equal to the size of the adaptation data) the adaptation data (e.g., a deletable utterance recognition algorithm) based on a location of the particular party (e.g., a server is picked based on the server's proximity to the location of the user, e.g., if the user is in Washington D.C., an eastern United States server may be chosen, and if the user is in Buenos Aires, then a server in Argentina or in the Southern Hemisphere may be selected).

Referring again to FIG. 6C, operation 502 may include operation 632 depicting storing a reference to a location of adaptation data. For example, FIG. 2, e.g., FIG. 2B shows location of adaptation data reference storing module 232 storing a reference to a location (e.g., an IP address) of adaptation data (e.g., a pronunciation dictionary of neighborhoods in the user's home city).

Referring again to FIG. 6C, operation 502 may include operation 634 depicting providing the location of the adaptation data at particular intervals. For example, FIG. 2, e.g., FIG. 2B, shows location of adaptation data providing to further party at particular intervals module 234 providing the location (e.g., the username and password to access a particular location in remote, e.g., "cloud" storage, to, e.g., a requesting device) of the adaptation data (e.g., a phoneme database of proper names in a user's smartphone phone book) at particular intervals (e.g., every hour, every minute, every day, or every quarter).

Referring again to FIG. 6C, operation 634 may include operation 636 depicting providing the location of the adaptation data to a device configured to monitor one or more sets of adaptation data at particular intervals. For example, FIG. 2, e.g., FIG. 2B, shows location of adaptation data providing at particular intervals to device configured to monitor one or more sets of adaptation data module 236 providing the location of the adaptation data (e.g., repeated utterance ignoring algorithm) to a device (e.g., a supervisor computer or a monitor computer as part of an enterprise solution) configured to monitor one or more sets of adaptation data (e.g., a company that keeps track of the adaptation data to its employees, or a computer of a company that provides adaptation data to users and wants to track how the adaptation data evolves or changes) at particular intervals (e.g., the program to monitor the one or more sets of adaptation data could run on a set schedule, e.g., at 2 am every night, or once a week, or, in some embodiments, once a minute).

Figure 6D:
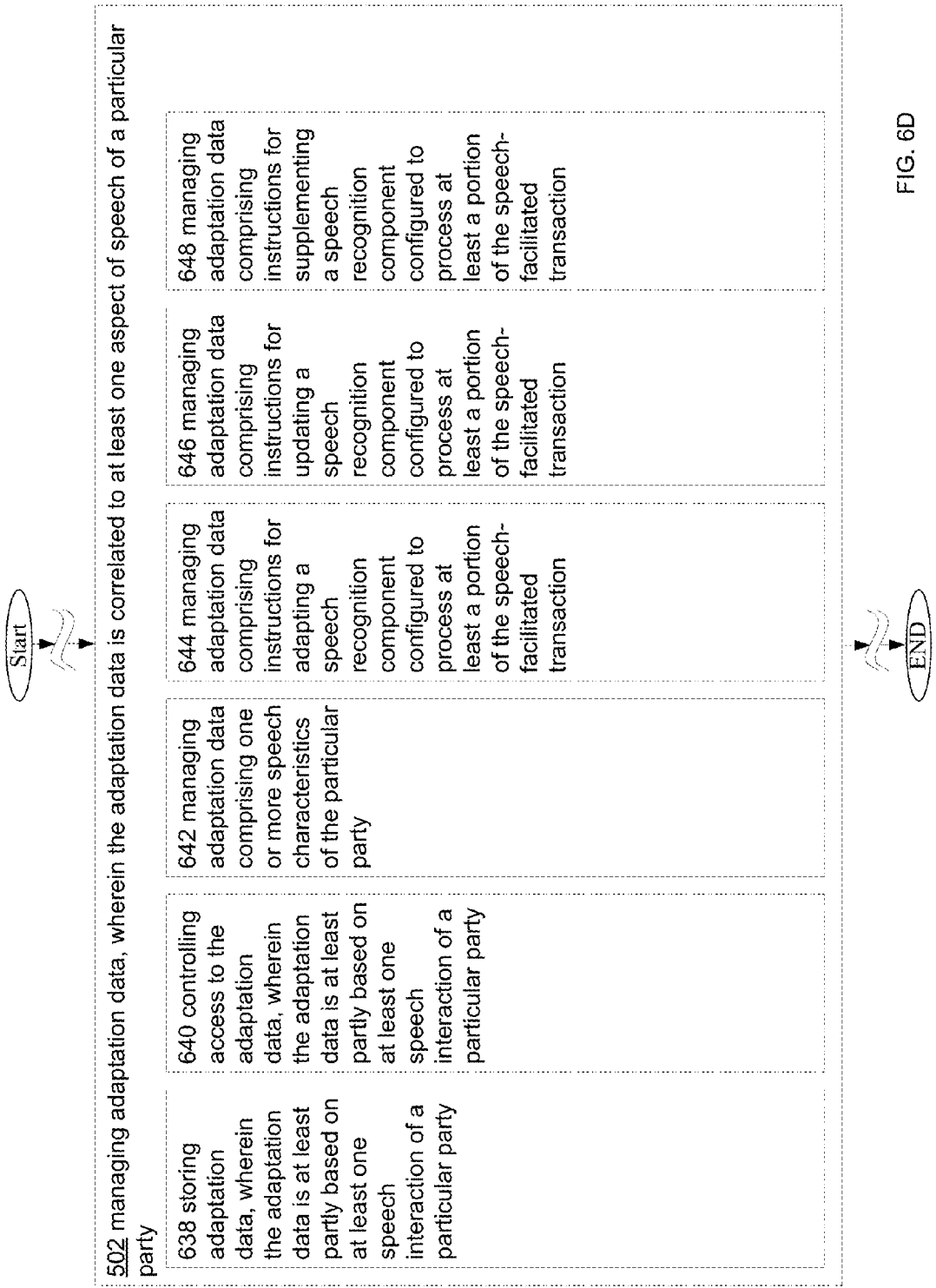
FIG. 6D is a high-level logic flowchart of a process depicting alternate implementations of a managing adaptation data operation 502 of FIG. 5.

Referring now to FIG. 6D, operation 502 may include operation 638 depicting storing adaptation data, wherein the adaptation data is at least partly based on at least one speech interaction of a particular party. For example, FIG. 2, e.g., FIG. 2C, shows adaptation data correlated to at least one particular party speech aspect storing module 238 storing adaptation data (e.g., a speech impediment modification algorithm tailored to the user), wherein the adaptation data is at least partly based on at least one speech interaction of a particular party (e.g., through a prior speech interaction with a user, it is determined that the user has a speech impediment, and parameters of at least one algorithm that is part of the adaptation data may be changed in response to that determination).

Referring again to FIG. 6D, operation 502 may include operation 640 depicting controlling access to the adaptation data, wherein the adaptation data is at least partly based on at least one speech interaction of a particular party. For example, FIG. 2, e.g., FIG. 2C, shows adaptation data correlated to at least one particular party speech aspect access controlling module 240 controlling access (e.g., selectively allowing one or more systems or users to read, write, copy, retrieve, or otherwise perform one or more operations on) to the adaptation data (e.g., a syllable pronunciation dictionary), wherein the adaptation data is at least partly based on at least one speech interaction of a particular party (e.g., a user's responses to an automated credit card payment by phone system are recorded and compared with expected answers, and from that data, the syllable pronunciation dictionary may be created or modified).

Referring again to FIG. 6D, operation 502 may include operation 642 depicting managing adaptation data comprising one or more speech characteristics of the particular party. For example, FIG. 2, e.g., FIG. 2C, shows adaptation data correlated to at least one characteristic of particular party speech managing module 242 managing adaptation data (e.g., a commonly mispronounced words recognition adjustment algorithm that picks out words that appear frequently in the particular party's vocabulary) comprising one or more speech characteristics of the particular party (e.g., one or more words that the particular party mispronounces regularly).

Referring again to FIG. 6D, operation 502 may include operation 644 depicting managing adaptation data comprising instructions for adapting a speech recognition component configured to process at least a portion of the speech-facilitated transaction. For example, FIG. 2, e.g., FIG. 2C, shows adaptation data comprising instructions for adapting a speech recognition component for processing a portion of the speech facilitated transaction managing module 244 managing adaptation data (e.g., a recognition algorithm parameter adjuster) comprising instructions for adapting a speech recognition component (e.g., modifying at least one parameter of at least one algorithm or operation performed by the hardware and/or software that performs at least one step in recognizing, e.g., processing the received speech) configured to process at least a portion of the speech-facilitated transaction (e.g., using a motor vehicle command system to adjust the passenger side rear view mirror).

Referring again to FIG. 6D, operation 502 may include operation 646 depicting managing adaptation data comprising instructions for updating a speech recognition component configured to process at least a portion of the speech-facilitated transaction. For example, FIG. 2, e.g., FIG. 2C, shows adaptation data comprising instructions for updating a speech recognition component for processing a portion of the speech facilitated transaction managing module 246 managing adaptation data (e.g., a list of one or more words in a pronunciation dictionary whose pronunciations deviate a predetermined amount from their general pronunciations, and the corresponding one or more pronunciations) comprising instructions for updating (e.g., the adaptation data also contains instructions to update the pronunciation dictionary with the user's pronunciations of those words) a speech recognition component (e.g., a recognition algorithm that assists in processing the received speech) configured to process at least a portion of the speech-facilitated transaction).

Referring again to FIG. 6D, operation 502 may include operation 648 depicting managing adaptation data comprising instructions for supplementing a speech recognition component configured to process at least a portion of the speech-facilitated transaction. For example, FIG. 2, e.g., FIG. 2C, shows adaptation data comprising instructions for supplementing a speech recognition component for processing a portion of the speech facilitated transaction managing module 248 managing adaptation data (e.g., a list of pronunciations of neighborhoods in a user's location) comprising instructions for supplementing a speech recognition component (e.g., a memory that a GPS navigation system draws upon to recognize words, that memory is supplemented by the neighborhood pronunciation data, so that when the GPS navigation system is used in Washington, D.C., the names of the Adams Morgan, Clarendon, Ballston, Alexandria, and Foggy Bottom, etc., are added to the memory) configured to process at least a portion of the speech-facilitated transaction (e.g., the memory is used to process at least a portion of the speech-facilitated transaction).

Figure 6E:
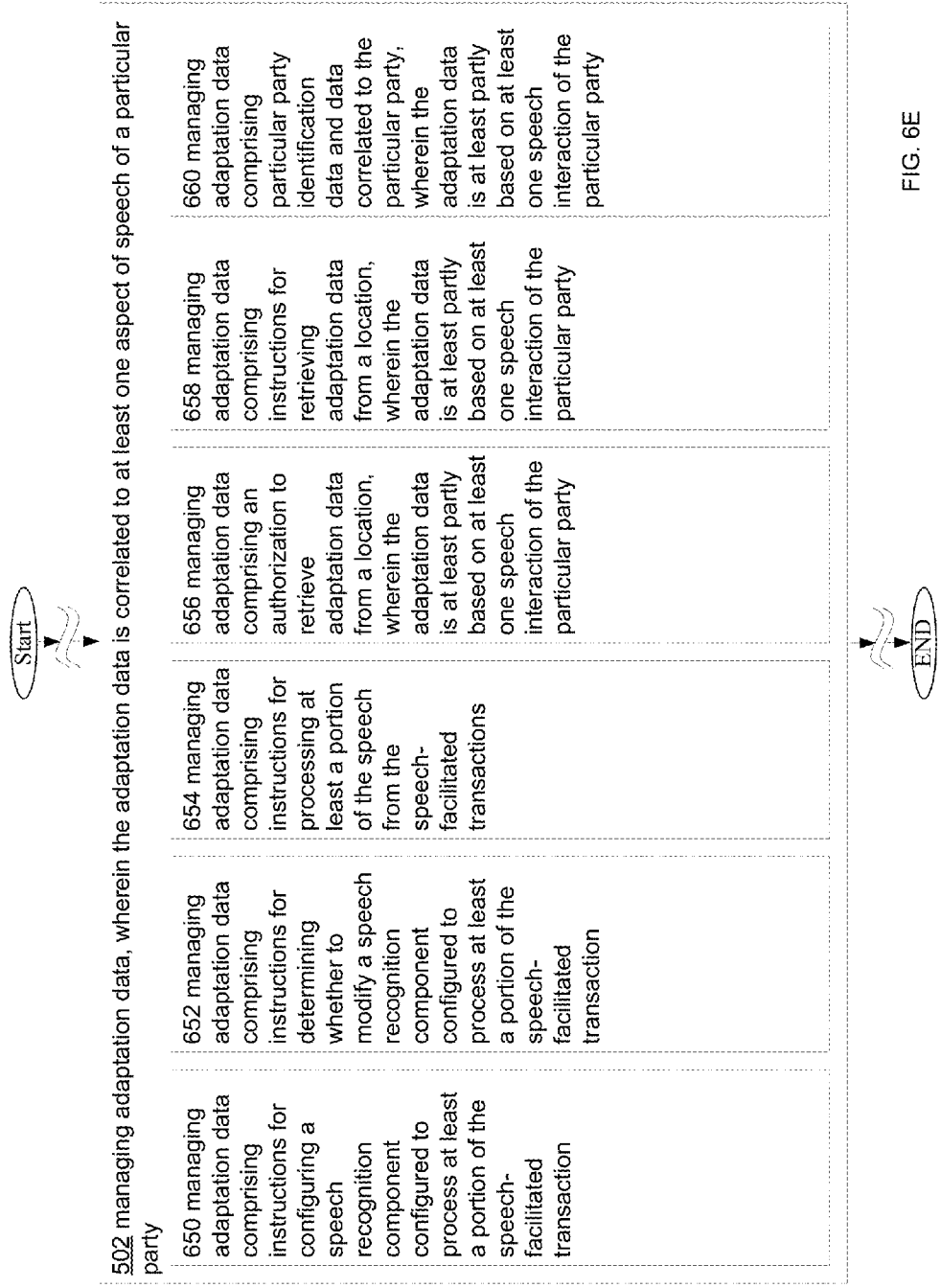
FIG. 6E is a high-level logic flowchart of a process depicting alternate implementations of a managing adaptation data operation 502 of FIG. 5.

Referring now to FIG. 6E, operation 502 may include operation 650 depicting managing adaptation data comprising instructions for configuring a speech recognition component configured to process at least a portion of the speech-facilitated transaction. For example, FIG. 2, e.g., FIG. 2D, shows adaptation data comprising instructions for configuring a speech recognition component for processing a portion of the speech facilitated transaction managing module 250 managing adaptation data (e.g., an algorithm selection process instruction list) comprising instructions for configuring a speech recognition component (e.g., determining which portions of the existing speech recognition components, e.g., the hardware and software that apply one or more algorithms, will be activated and used, and in which order) configured to process at least a portion of the speech-facilitated transaction (e.g., ordering at an automated drive-thru window).

Referring again to FIG. 6E, operation 502 may include operation 652 depicting managing adaptation data comprising instructions for determining whether to modify a speech recognition component configured to process at least a portion of the speech-facilitated transaction. For example, FIG. 2, e.g., FIG. 2D, shows adaptation data comprising instructions for determining whether to modify a speech recognition component for processing a portion of the speech facilitated transaction managing module 252 managing adaptation data (e.g., confidence rate parameter modification instructions) comprising instructions for determining whether to modify a speech recognition component (e.g., whether to modify the parameters required to achieve a particular confidence rate in interpreting the speech) configured to process at least a portion of the speech-facilitated transaction (e.g., giving voice commands to an automated cleaning robot, e.g., a Roomba).

Referring again to FIG. 6E, operation 502 may include operation 654 depicting managing adaptation data comprising instructions for processing at least a portion of the speech from the speech-facilitated transaction. For example, FIG. 2, e.g., FIG. 2D, shows adaptation data comprising instructions for processing at least a portion of the speech-facilitated transaction managing module 254 managing adaptation data (e.g., an entire software module that is self-contained and capable of processing at least a portion of speech) comprising instructions for processing at least a portion of the speech from the speech-facilitated transaction (e.g., in an embodiment in which the target device does not have a speech processing software component installed, the adaptation data may provide the software component, and/or operations for using the software component).

Referring again to FIG. 6E, operation 502 may include operation 656 depicting managing data comprising an authorization to retrieve adaptation data from a location, wherein the adaptation data is at least partly based on at least one speech interaction of the particular party. For example, FIG. 2, e.g., FIG. 2D, shows adaptation data comprising an authorization to retrieve adaptation data from a location managing module 256 managing data (e.g., the adaptation data includes a password for logging into a cloud service at which adaptation data is stored) comprising an authorization (e.g., a username and/or password) to retrieve adaptation data from a location, wherein the adaptation data is at least partly based on at least one speech interaction of the particular party (e.g., the adaptation data is based on one or more speech interactions of the user with a same type of hardware, e.g., a voice-controlled microwave).

Referring again to FIG. 6E, operation 502 may include operation 658 depicting managing adaptation data comprising instructions for retrieving adaptation data from a location, wherein the adaptation data is at least partly based on at least one speech interaction of the particular party. For example, FIG. 2, e.g., FIG. 2D, shows adaptation data comprising instructions for retrieving adaptation data from a location managing module 258 managing adaptation data (e.g., a set of instructions, including location, authorizations, passwords, and/or permitted domains) comprising instructions for retrieving adaptation data (e.g., a various speech-based interpretation algorithm picker) from a location (e.g., from a specific computer on an enterprise network), wherein the adaptation data is at least partly based on at least one speech interaction of the particular party (e.g., one or more of the algorithms that the algorithm picker may pick are updated based on previous speech interactions carried out by the user, e.g., printing an airline ticket using speech at an automated airline ticket counter).

Referring again to FIG. 6E, operation 502 may include operation 660 depicting managing adaptation data comprising particular party identification data and data correlated to the particular party, wherein the adaptation data is at least partly based on at least one speech interaction of the particular party. For example, FIG. 2, e.g., FIG. 2D shows adaptation data comprising particular party identification data and data correlated to the particular party managing module 260 managing adaptation data comprising particular party identification data (e.g., data about the particular party, e.g., region of the country, native language, age, etc.) and data correlated to the particular party (e.g., whether the user drops his or her g's, or adds "r" sounds to words), wherein the adaptation data is at least partly based on at least one speech interaction of the particular party (e.g., a recording of the user's voice was analyzed in a lab, and then adaptation data including the user's speech characteristics was generated, e.g., manually inputted, or generated by algorithm).

Figure 6F:
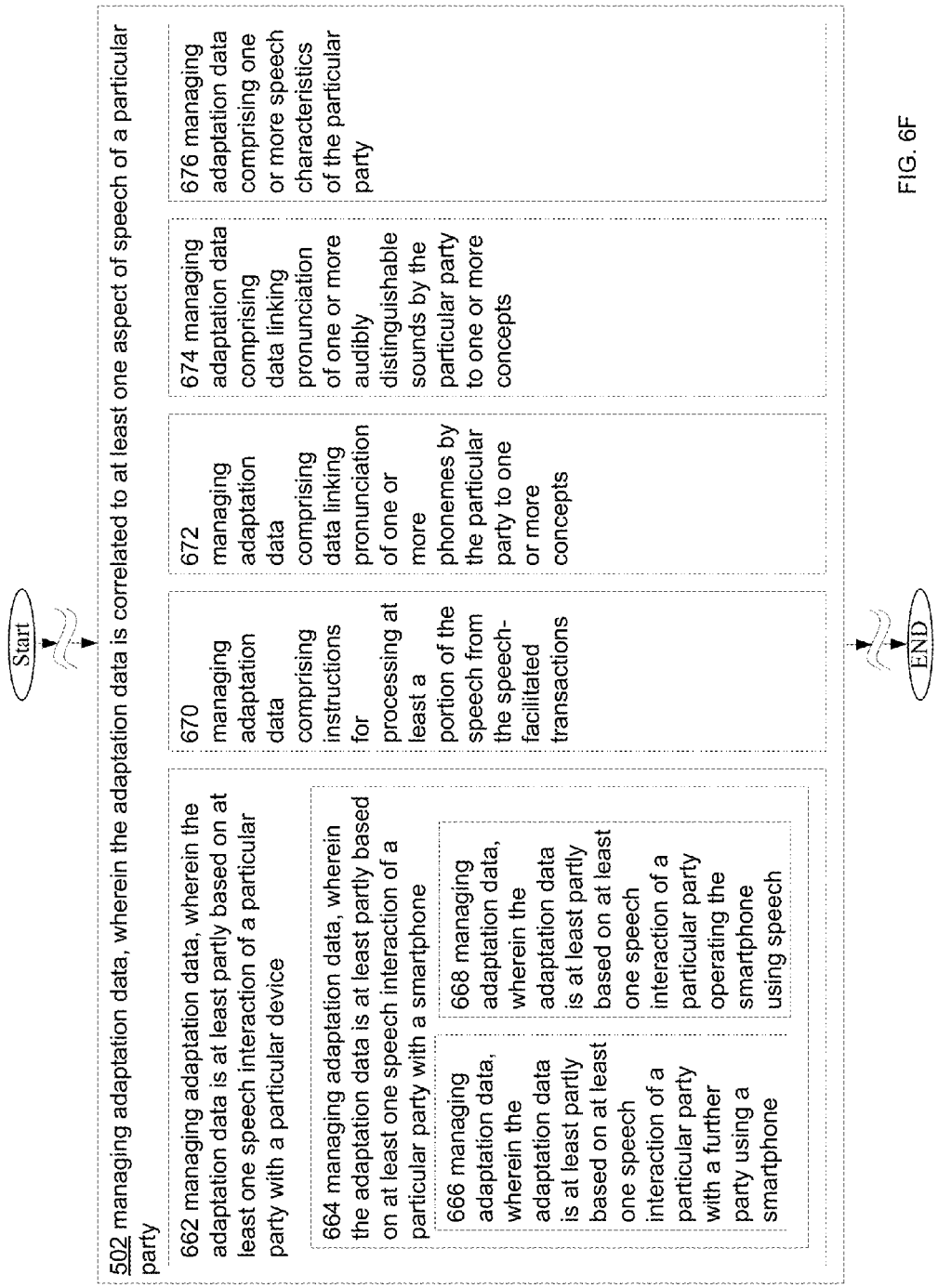
FIG. 6F is a high-level logic flowchart of a process depicting alternate implementations of a managing adaptation data operation 502 of FIG. 5.

Referring now to FIG. 6F, operation 502 may include operation 662 depicting managing adaptation data, wherein the adaptation data is at least partly based on at least one speech interaction of a particular party with a particular device. For example, FIG. 2, e.g., FIG. 2E, shows adaptation data at least partly based on at least one particular party speech interaction with a particular device managing module 262 managing adaptation data (e.g., a syllable pronunciation database), wherein the adaptation data is at least partly based on at least one speech interaction of a particular party (e.g., a user talking into his video game headset) with a particular device (e.g., a user's video game headset (e.g., earphones and microphone).

Referring again to FIG. 6F, operation 662 may include operation 664 depicting managing adaptation data, wherein the adaptation data is at least partly based on at least one speech interaction of a particular party with a smartphone. For example, FIG. 2, e.g., FIG. 2E, shows adaptation data at least partly based on at least one particular party speech interaction with a smartphone managing module 264 managing adaptation data (e.g., a path completion algorithm), wherein the adaptation data is at least partly based on at least one speech interaction of a particular party with a smartphone (e.g., a user utters a voice command to the smartphone to find a sushi restaurant in Old Town Alexandria).

Referring again to FIG. 6F, operation 664 may include operation 666 depicting managing adaptation data, wherein the adaptation data is at least partly based on at least one speech interaction of a particular party with a further party using a smartphone. For example, FIG. 2, e.g., FIG. 2E, shows adaptation data at least partly based on at least one particular party speech interaction with a further party using a smartphone managing module 266 managing adaptation data (e.g., an excited utterance interpretation algorithm), wherein the adaptation data is at least partly based on at least one speech interaction of a particular party with a further party using a smartphone (e.g., a user dials another person and has a phone conversation with that person, while talking through the smartphone, and the smartphone records the conversation, which may then be sent to a central location for further processing to derive adaptation data, either manually, through the use of algorithms, or through the use of adaptive software, e.g., neural net software).

Referring again to FIG. 6F, operation 664 may include operation 668 depicting managing adaptation data, wherein the adaptation data is at least partly based on at least one speech interaction of a particular party operating the smartphone using speech. For example, FIG. 2, e.g., FIG. 2E, shows adaptation data at least partly based on at least one particular party speech interaction to operate a smartphone managing module 268 managing adaptation data (e.g., a pronunciation dictionary), wherein the adaptation data is at least partly based on at least one speech interaction (e.g., using voice commands to order the smartphone to make a phone call, though a Bluetooth headset) of a particular party operating the smartphone (e.g., instructing the smartphone to make a call) using speech.

Referring again to FIG. 6F, operation 502 may include operation 670 depicting managing adaptation data comprising instructions for processing at least a portion of the speech from the speech-facilitated transaction. For example, FIG. 2, e.g., FIG. 2E, shows adaptation data comprising instructions for processing at least a portion of the speech-facilitated transaction managing module 270 managing adaptation data (e.g., a speech processing algorithm tailored to the user based on accent, tone, and/or other factors) comprising instructions for processing (e.g., an algorithm, or a set of instructions) at least a portion of the speech from the speech-facilitated transaction (e.g., ordering toppings on a cheeseburger at an automated drive-thru window).

Referring again to FIG. 6F, operation 502 may include operation 672 depicting managing adaptation data comprising data linking pronunciation of one or more phonemes by the particular party to one or more concepts. For example, FIG. 2, e.g., FIG. 2E, shows adaptation data comprising data linking particular party pronunciation of one or more phonemes to one or more concepts managing module 272 managing adaptation data comprising data linking pronunciation of one or more phonemes (e.g., the phonemes in the word "money") by the particular party (e.g., the user) to one or more concepts (e.g., "this word may appear in transactions involving automated teller machine devices).

Referring again to FIG. 6F, operation 502 may include operation 674 depicting managing adaptation data comprising data linking pronunciation of one or more audibly distinguishable sounds by the particular party to one or more concepts. For example, FIG. 2, e.g., FIG. 2E, shows adaptation data comprising data linking particular party pronunciation of one or more audibly distinguishable sounds to one or more concepts managing module 274 managing adaptation data comprising data linking pronunciations of one or more audibly distinguishable sounds (e.g., a particular sound that is not part of the English language, but may be part of other dialects) by the particular party (e.g., that the user speaks) to one or more concepts (e.g., a particular combination of sounds excluded from the English language may correspond to "broil," which adaptation data may be used to facilitate giving commands to a dual-use convection oven that is commanded by speech.

Referring again to FIG. 6F, operation 502 may include operation 676 depicting managing adaptation data comprising one or more speech characteristics of the particular party. For example, FIG. 2, e.g., FIG. 2E, shows adaptation data comprising one or more particular party speech characteristics managing module 276 managing adaptation data comprising one or more speech characteristics (e.g., instructions regarding how to modify particular recognition algorithms based on the accent of the user) of the particular party (e.g., a user with a thick Boston accent).

Figure 2F:
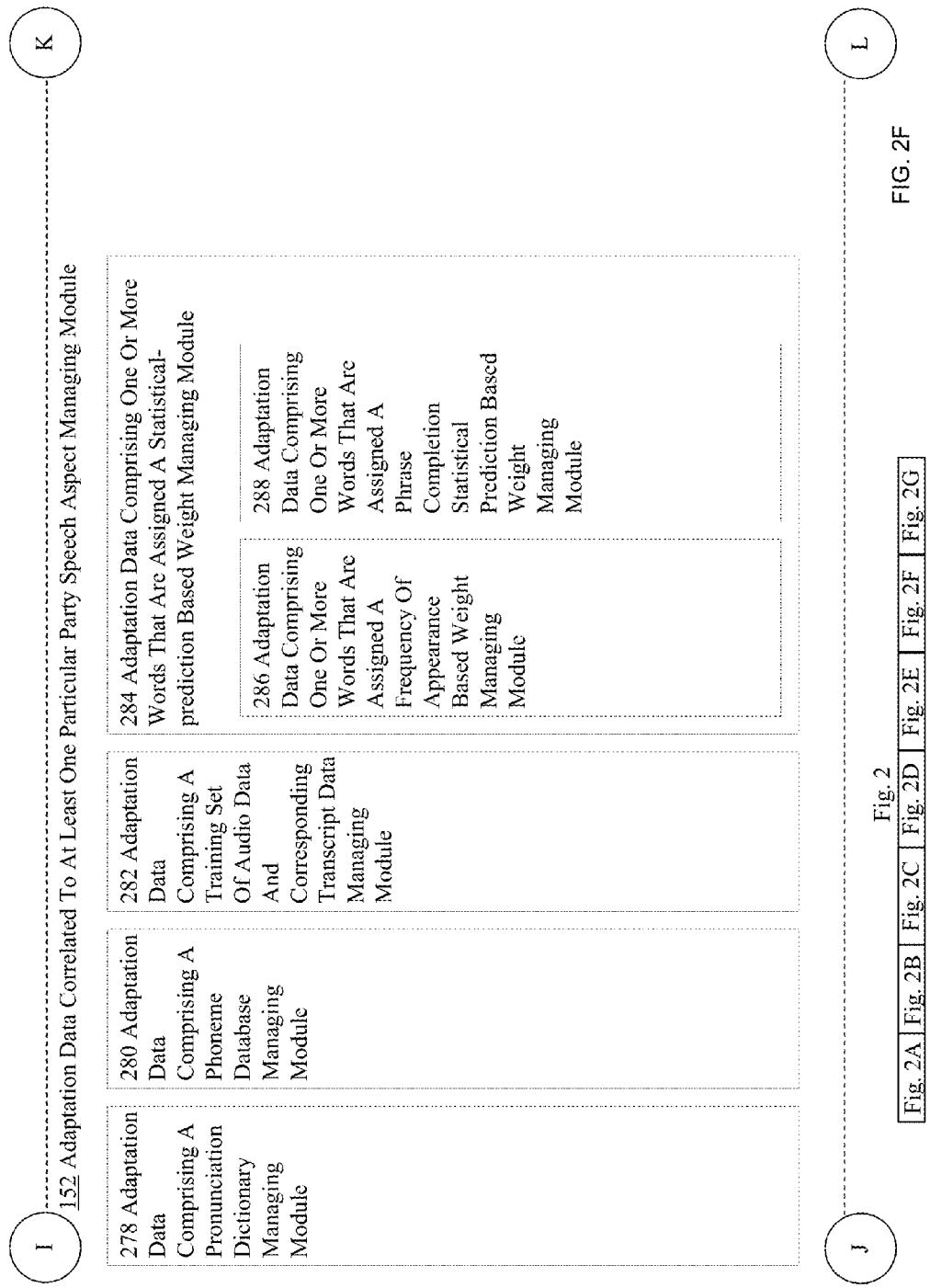
Figure 6G:
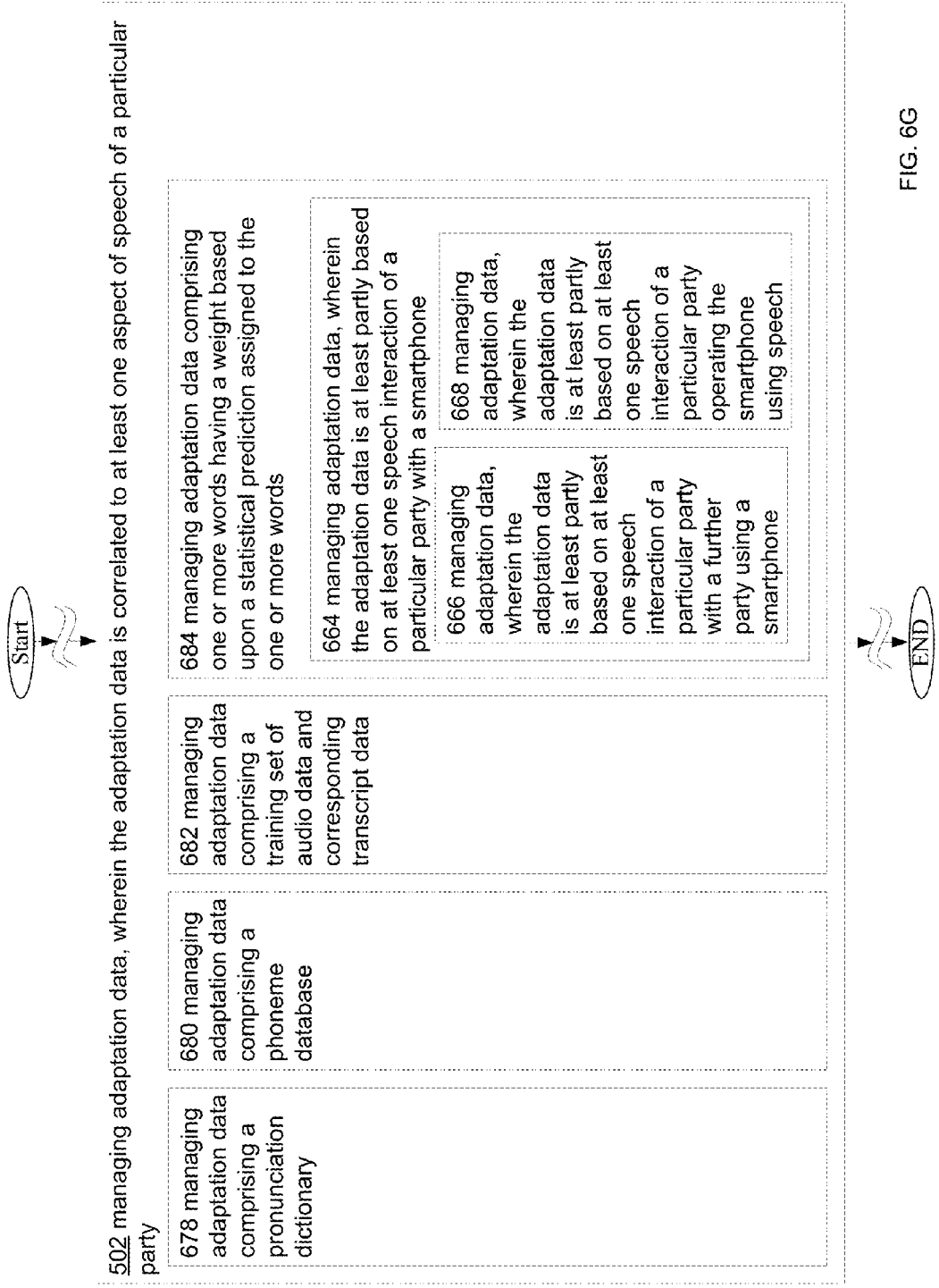
FIG. 6G is a high-level logic flowchart of a process depicting alternate implementations of a managing adaptation data operation 502 of FIG. 5.

Referring now to FIG. 6G, operation 502 may include operation 678 depicting managing adaptation data comprising a pronunciation dictionary. For example, FIG. 2, e.g., FIG. 2F, shows adaptation data comprising a pronunciation dictionary managing module 678 managing adaptation data comprising a pronunciation dictionary (e.g., a data structure linking one or more words and/or concepts to their corresponding pronunciations, that may be based on the user's actual pronunciation of the one or more words, or words that are similar to the one or more words).

Referring again to FIG. 6G, operation 502 may include operation 680 depicting managing adaptation data comprising a phoneme database. For example, FIG. 2, e.g., FIG. 2F, shows adaptation data comprising a phoneme database managing module 680 managing adaptation data comprising a phoneme database (e.g., a data structure expressed as a database, e.g., stored in a SQL database) that includes one or more phonemes, and corresponding pronunciations of the one or more phonemes.

Referring again to FIG. 6G, operation 502 may include operation 682 depicting managing adaptation data comprising a training set of audio data and corresponding transcript data. For example, FIG. 2, e.g., FIG. 2F, shows adaptation data comprising a training set of audio data and corresponding transcript data managing module 282 managing adaptation data comprising a training set of audio data (e.g., a recording of the user talking) and corresponding transcript data (e.g., a text document including the transcript of the words spoken by the user in the audio data).

Referring again to FIG. 6G, operation 502 may include operation 684 depicting managing adaptation data comprising one or more words having a weight based upon a statistical prediction assigned to the one or more words. For example, FIG. 2, e.g., FIG. 2F, shows adaptation data comprising one or more words that are assigned a statistical-prediction based weight managing module 284 managing adaptation data comprising one or more words having a weight (e.g., a real number between zero and one) based upon a statistical prediction assigned to the one or more words (e.g., the higher the number, the more that word has appeared in the user's speech interactions, and the more likely the word is theoretically likely to appear again).

Figures 2, 2G:
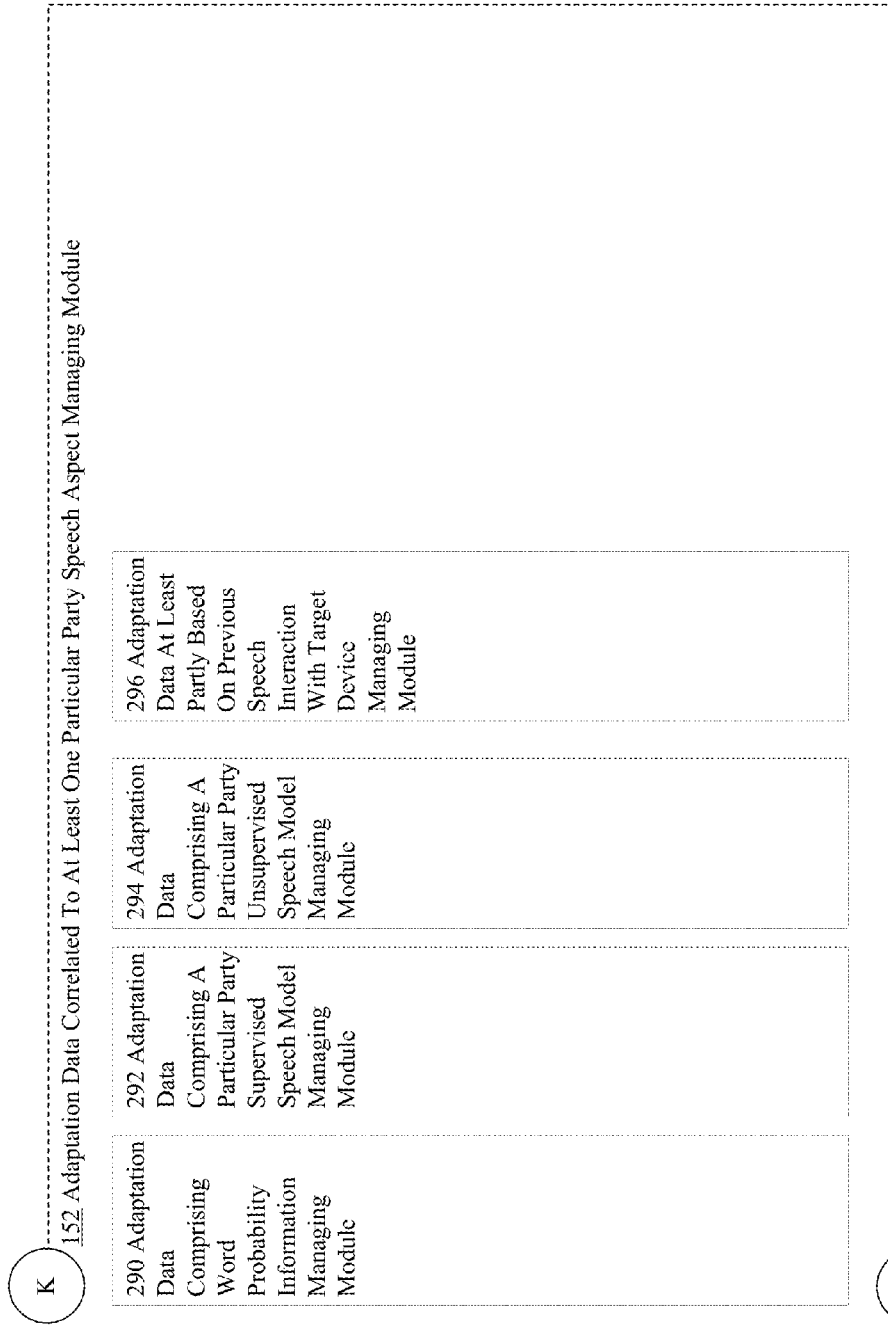

Referring again to FIG. 6G, operation 684 may include operation 686 depicting managing adaptation data comprising one or more words having a weight based upon a frequency of appearance of the one or more words. For example, FIG. 2, e.g., FIG. 2G, shows adaptation data comprising one or more words that are assigned a frequency of appearance based weight managing module 286 managing adaptation data comprising one or more words having a weight (e.g., a real number between zero and one hundred) based upon a frequency of appearance of the one or more words (e.g., if the user carries out a lot of transactions with automated teller machine devices, the word "four" may have a higher weight than the similarly-pronounced word "ford").

Referring again to FIG. 6G, operation 684 may include operation 688 depicting managing adaptation data comprising one or more words having a weight based upon a phrase completion statistical prediction assigned to the one or more words. For example, FIG. 2, e.g., FIG. 2F, shows adaptation data comprising one or more words that are assigned a phrase completion statistical prediction based weight managing module 288 managing adaptation data comprising one or more words having a weight (e.g., an integer between −100 and 100) based upon a phrase completion statistical prediction assigned to the one or more words (e.g., if a phrase is "four hundred," and the algorithm correctly interprets "hundred," it is more likely to select "four" as the previous word to "hundred" than the word "ford," because "ford hundred" is a much less common expression.

Figure 6H:
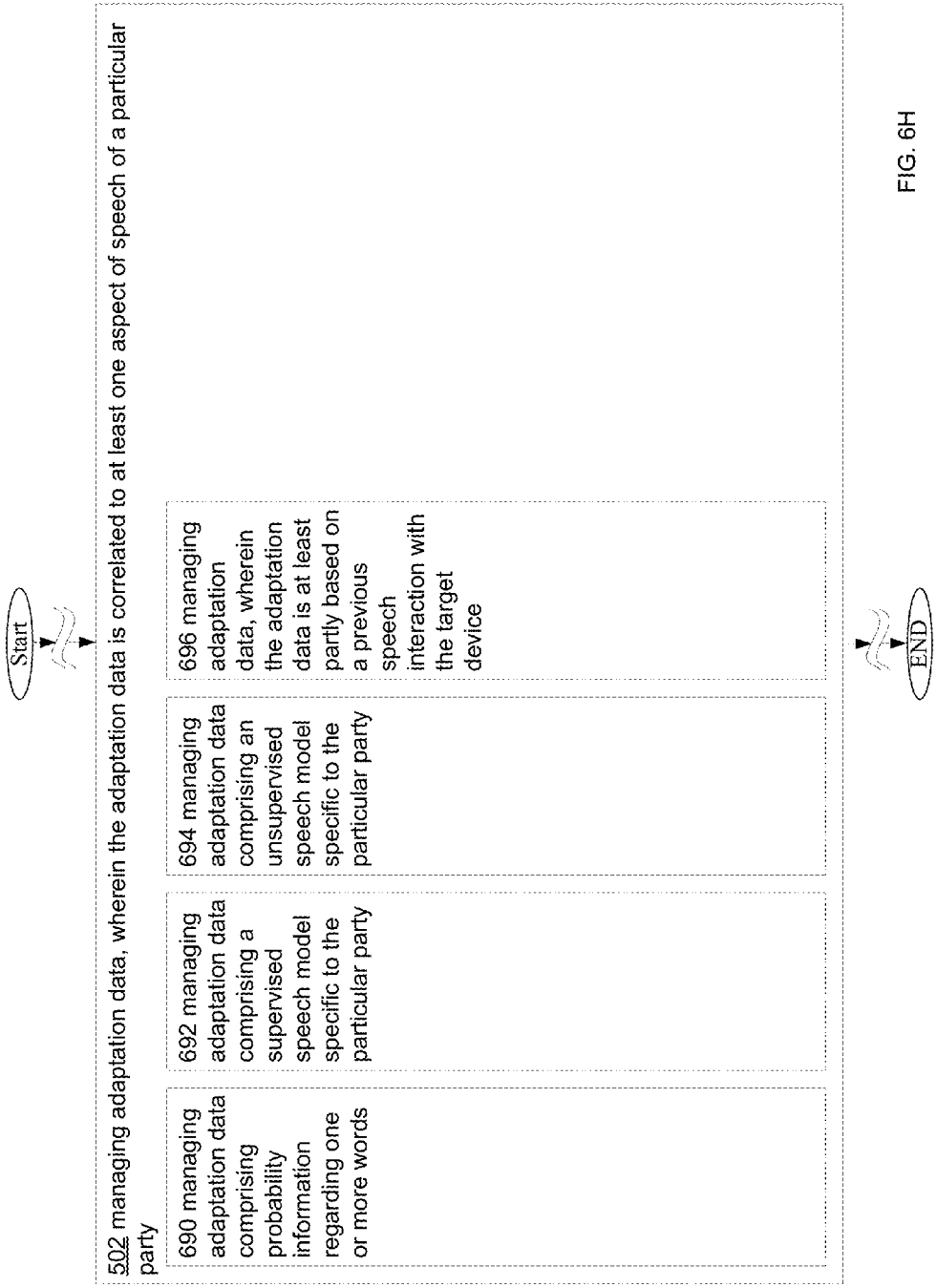
FIG. 6H is a high-level logic flowchart of a process depicting alternate implementations of a managing adaptation data operation 502 of FIG. 5.

Referring now to FIG. 6H, operation 502 may include operation 690 depicting managing adaptation data comprising probability information regarding one or more words. For example, FIG. 2, e.g., FIG. 2G, shows adaptation data comprising word probability information managing module 290 managing adaptation data comprising probability information (e.g., a likelihood that the word will appear in the user's speech, based on the user's twitter feed and the words used therein) regarding one or more words.

Referring again to FIG. 6H, operation 502 may include operation 692 depicting managing adaptation data comprising a supervised speech model specific to the particular party. For example, FIG. 2, e.g., FIG. 2G, shows adaptation data comprising a particular party supervised speech model managing module 292 managing adaptation data comprising a supervised speech model specific to the particular party.

Referring again to FIG. 6H, operation 502 may include operation 694 depicting managing adaptation data comprising an unsupervised speech model specific to the particular party. For example, FIG. 2, e.g., FIG. 2G, shows adaptation data comprising a particular party unsupervised speech model managing module 294 managing adaptation data comprising an unsupervised speech model specific to the particular party.

Referring again to FIG. 6H, operation 502 may include operation 696 depicting managing adaptation data, wherein the adaptation data is at least partly based on a previous speech interaction with the target device. For example, FIG. 2, e.g., FIG. 2G, shows adaptation data at least partly based on previous speech interaction with target device managing module 296 managing adaptation data (e.g., a set of proper nouns associated with the user's favorite orders), wherein the adaptation data is at least partly based on a previous speech interaction with the target device (e.g., if the target device is an automated drive-thru window, and the user's favorite meal is a Western Bacon Chee with half Coca-Cola and half Dr. Pepper to drink, then the adaptation data may include the user's pronunciation of the words "Western Bacon Chee," "Coca-Cola," and "Dr. Pepper").

Figure 7B:
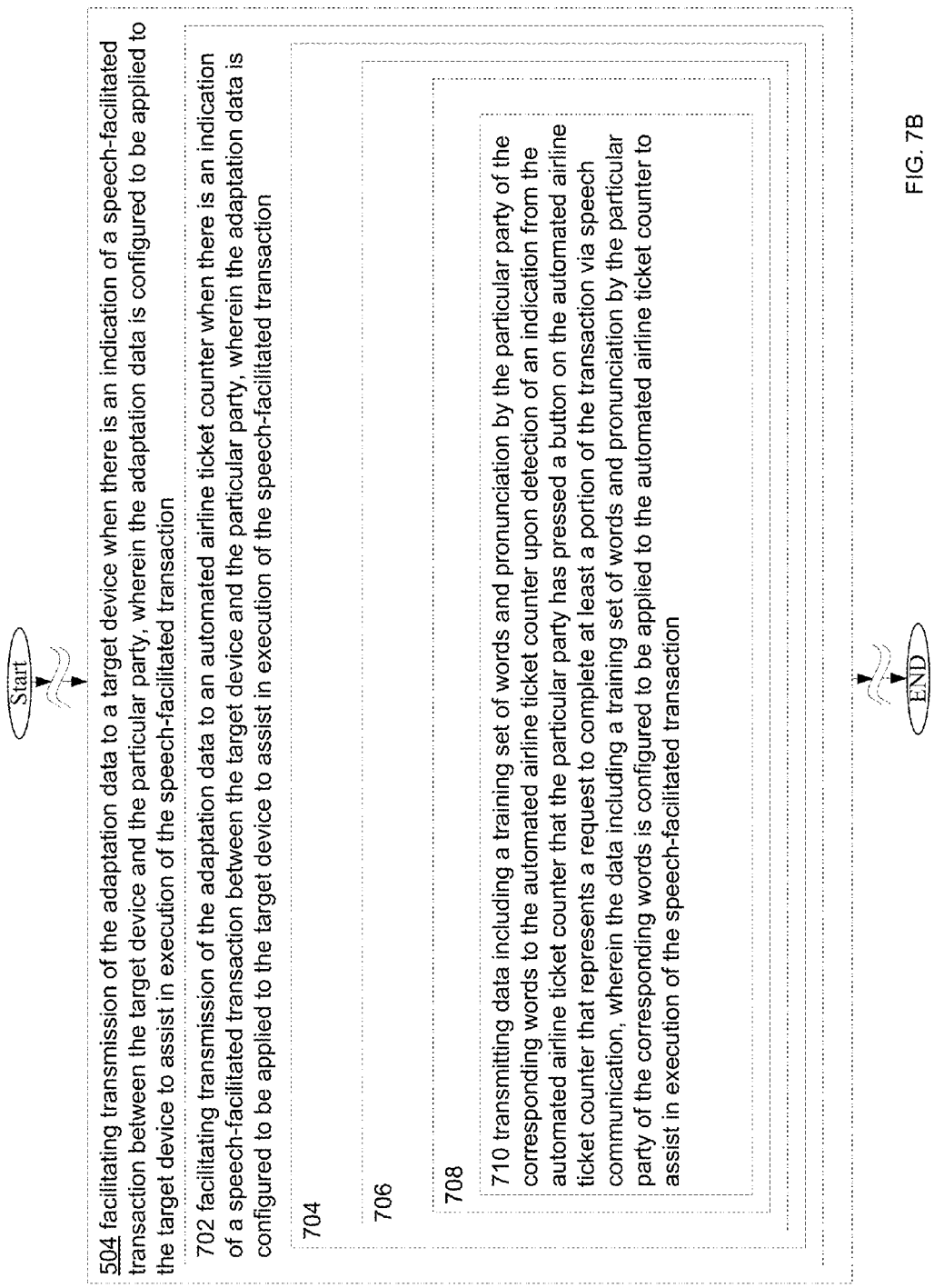
FIG. 7B is a high-level logic flowchart of a process depicting alternate implementations of the adaptation data transmission facilitating operation 504 of FIG. 5.

FIGS. 7A-7K depict various implementations of operation 504, according to embodiments. Referring now to FIG. 7A, operation 504 may include operation 702 depicting facilitating transmission of the adaptation data to an automated airline ticket counter when there is an indication of a speech-facilitated transaction between the automated airline ticket counter and the particular party, wherein the adaptation data is configured to be applied to the automated airline ticket counter to assist in execution of the speech-facilitated transaction. For example, FIG. 3, e.g., FIG. 3A, shows adaptation data configured to be applied to the automated airline ticket counter for assistance in execution of speech-facilitated transaction transmission to target device when there is an indication of a speech-facilitated transaction between the target device and the particular party facilitating module 302 facilitating transmission (e.g., carrying out one or more operations that assist, whether directly or indirectly, with a portion of the operation of transmitting) of the adaptation data (e.g., a phrase completion algorithm) to an automated airline ticket counter when there is an indication of a speech-facilitated transaction (e.g., the user walks up to the screen of the automated airline ticket counter and is detected by its camera and inferred based upon the distance from the screen that the user is initiating a transaction) between the automated airline ticket counter and the particular party (e.g., the user that has been detected by the automated airline ticket counter), wherein the adaptation data (e.g., the phrase completion algorithm) is configured to be applied to the automated airline ticket counter (e.g., the phrase completion algorithm will be run in addition to the default phrase completion algorithm stored in the memory of the automated airline ticket counter) to assist in execution (e.g., interpretation of speech by the automated airline ticket counter) of the speech-facilitated transaction.

Referring again to FIG. 7A, operation 702 may include operation 704 depicting facilitating transmission of the adaptation data to the automated airline ticket counter upon detection of an indication from the automated airline ticket counter of a speech-facilitated transaction with the particular party, wherein the adaptation data is configured to be applied to the automated airline ticket counter to assist in execution of the speech-facilitated transaction. For example, FIG. 3, e.g., FIG. 3A, shows adaptation data configured to be applied to the automated airline ticket counter for assistance in execution of speech-facilitated transaction transmission to target device upon detection of an indication from the automated airline ticket counter of a speech-facilitated transaction between the target device and the particular party facilitating module 304 facilitating transmission of the adaptation data (e.g., a phrase completion algorithm) to the automated airline ticket counter upon detection of an indication from the automated airline ticket counter (e.g., the microphone of the automated airline ticket counter detects a particular spoken word, e.g., "start," when the screen is displaying the message "say the word 'start' to begin") of a speech-facilitated transaction with the particular party (e.g., the user that spoke the word "start"), wherein the adaptation data is configured to be applied to the automated airline ticket counter (e.g., the phrase completion algorithm that is part of the adaptation data will be run in place of the phrase completion algorithm that is retrieved from a server by default by the automated airline ticket counter) to assist in execution of the speech-facilitated transaction (e.g., upgrading an airline ticket to a first class ticket).

Referring again to FIG. 7A, operation 704 may include operation 706 depicting transmitting the adaptation data to the automated airline ticket counter upon detection of an indication from the automated airline ticket counter that the particular party has pressed a button on the automated airline ticket counter, wherein the adaptation data is configured to be applied to the automated airline ticket counter to assist in execution of the speech-facilitated transaction. For example, FIG. 2, e.g., FIG. 2A, shows adaptation data configured to be applied to the automated airline ticket counter for assistance in execution of speech-facilitated transaction transmission to target device upon indication from the automated airline ticket counter that the particular party has pressed a button indicating a request to carry out at least a portion of the transaction using speech facilitating module 306 transmitting the adaptation data (e.g., a sentence completion algorithm) to the automated airline ticket counter upon detection of an indication from the automated airline ticket counter that the particular party has pressed a button (e.g., the start transaction button) on the automated airline ticket counter, wherein the adaptation data is configured to be applied to the automated airline ticket counter (e.g., the sentence completion algorithm in the adaptation data and the sentence completion algorithm stored in the automated airline ticket counter are merged, and e.g., in an embodiment of the invention, the adaptation data includes instructions regarding merging the sentence completion algorithm with one or more various other sentence completion algorithms), wherein the adaptation data is configured to be applied to the automated airline ticket counter to assist in execution of the speech-facilitated transaction (e.g., checking a bag).

Referring again to FIG. 7A, operation 706 may include operation 708 depicting transmitting the adaptation data to the automated airline ticket counter upon detection of an indication from the automated airline ticket counter that the particular party has pressed a button on the automated airline ticket counter indicating a request to complete at least a portion of the transaction via speech communication, wherein the adaptation data is configured to be applied to the automated airline ticket counter to assist in execution of the speech-facilitated transaction. For example, FIG. 2, e.g., FIG. 2A, shows adaptation data configured to be applied to the automated airline ticket counter for assistance in execution of speech-facilitated transaction transmission to target device upon indication from the automated airline ticket counter that the particular party has pressed a button indicating a request to carry out at least a portion of the transaction using speech facilitating module 308 transmitting the adaptation data (e.g., an ambient noise level adjustment algorithm) to the automated airline ticket counter upon detection of an indication from the automated airline ticket counter that the particular party has pressed a button (e.g., a soft button on a screen or a hard button on the device) on the automated airline ticket counter indicating a request to complete at least a portion of the transaction via speech communication (e.g., entering the name of the destination city), wherein the adaptation data (e.g., the ambient noise level adjustment algorithm) is configured to be applied to the automated airline ticket counter to assist in execution of the speech-facilitated transaction.

Referring now to FIG. 7B, operation 708 may include operation 710 depicting transmitting adaptation data comprising a training set of one or more words and corresponding pronunciations by the particular party to the automated airline ticket counter upon detection of an indication from the automated airline ticket counter that the particular party has pressed a button on the automated airline ticket counter that represents a request to complete at least a portion of the transaction via speech communication, wherein the data including the training set of one or more words and corresponding pronunciations by the particular party is configured to be applied to the automated airline ticket counter to assist in execution of the speech-facilitated transaction. For example, FIG. 2, e.g., FIG. 2A, shows adaptation data comprising a training set of at least one word and pronunciation for assistance in execution of speech-facilitated transaction transmission to target device upon indication from the automated airline ticket counter that the particular party has pressed a button indicating a request to carry out at least a portion of the transaction using speech facilitating module 310 transmitting adaptation data comprising a training set of one or more words and corresponding pronunciations by the particular party (e.g., the user) to the automated airline ticket counter upon detection of an indication from the automated airline ticket counter that the particular party has pressed a button on the automated airline ticket counter that represents a request to complete at least a portion of the transaction via speech communication, wherein the data including the training set of one or more words and corresponding pronunciations by the particular party is configured to be applied to the automated airline ticket counter to assist in execution of the speech-facilitated transaction.

Figure 7C:
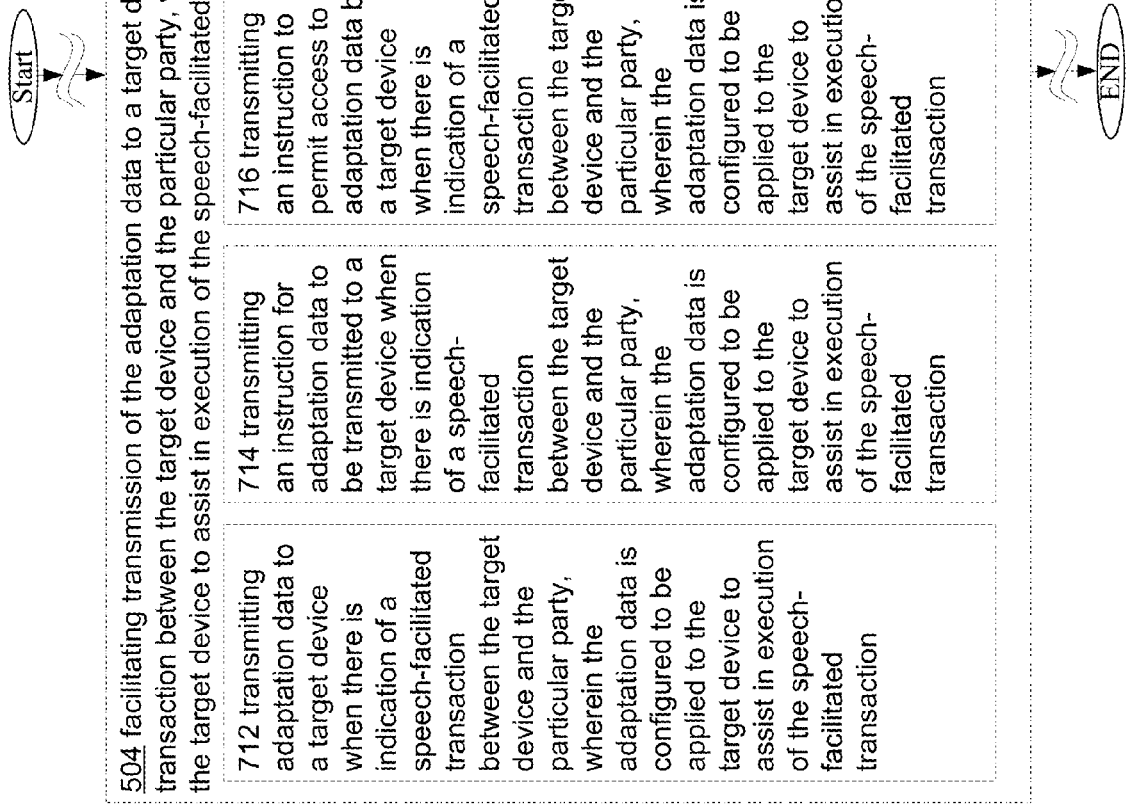
FIG. 7C is a high-level logic flowchart of a process depicting alternate implementations of the adaptation data transmission facilitating operation 504 of FIG. 5.

Referring now to FIG. 7C, operation 504 may include operation 712 depicting transmitting adaptation data to a target device when there is indication of a speech-facilitated transaction between the target device and the particular party, wherein the adaptation data is configured to be applied to the target device to assist in execution of the speech-facilitated transaction. For example, FIG. 3, e.g., FIG. 3B, shows adaptation data configured to be applied to the target device for assistance in execution of speech-facilitated transaction transmitting to target device when there is an indication of a speech-facilitated transaction between the target device and the particular party module 312 transmitting adaptation data (e.g., a basic pronunciation adjustment algorithm) to a target device (e.g., a video game system) when there is an indication of a speech-facilitated transaction (e.g., using an automated marketplace to buy a downloadable game onto a video game system), wherein the adaptation data (e.g., the basic pronunciation adjustment algorithm) is configured to be applied to the target device (e.g., the video game system) to assist in execution of the speech-facilitated transaction.

Referring again to FIG. 7C, operation 504 may include operation 714 depicting transmitting an instruction for adaptation data to be transmitted to a target device when there is indication of a speech-facilitated transaction between the target device and the particular party, wherein the adaptation data is configured to be applied to the target device to assist in execution of the speech-facilitated transaction. For example, FIG. 3, e.g., FIG. 3B, shows instruction for transmitting adaptation data configured to be applied to the target device for assistance in execution of speech-facilitated transaction transmission to target device when there is an indication of a speech-facilitated transaction between the target device and the particular party transmitting module 314 transmitting an instruction (e.g., sending a signal to a server that stores adaptation data) for adaptation data (e.g., an emotion-based pronunciation adjustment algorithm) to be transmitted to a target device (e.g., an office copier in an enterprise network in a place of business) when there is indication (e.g., a particular device carried by the office worker, e.g., a USB key, or a security badge, detects that the worker is in proximity to the device, or has activated the device) of a speech-facilitated transaction (e.g., the user needs to make copies, but may be unable or prefer not to operate the buttons) between the target device (e.g., the office copier) and the particular party (e.g., the user), wherein the adaptation data (e.g., the emotion-based pronunciation adjustment algorithm) is configured to be applied to the target device to assist in execution of the speech-facilitated transaction.

Referring again to FIG. 7C, operation 504 may include operation 716 depicting transmitting an instruction to permit access to adaptation data by the target device when there is indication of a speech-facilitated transaction between the target device and the particular party, wherein the adaptation data is configured to be applied to the target device to assist in execution of the speech-facilitated transaction. For example, FIG. 3, e.g., FIG. 3B, shows instruction for permitting access to adaptation data by the target device for assistance in execution of speech-facilitated transaction transmission to target device when there is an indication of a speech-facilitated transaction between the target device and the particular party transmitting module 316 transmitting an instruction to permit access (e.g., an authorization code) to adaptation data (e.g., a sentence diagramming path selection algorithm) by the target device (e.g., an automated teller machine device) when there is indication of a speech-facilitated transaction between the target device and the particular party (e.g., a particular device detects words commonly associated with a speech-facilitated transaction, and facilitates the transmission of the instruction to permit access), wherein the adaptation data is configured to be applied to the target device to assist in execution of the speech-facilitated transaction.

Referring again to FIG. 7C, operation 504 may include operation 718 depicting broadcasting adaptation data that is configured to be received by the target device when there is in an indication of a speech-facilitated transaction between the target device and the particular party, wherein the adaptation data is configured to be applied to the target device to assist in execution of the speech-facilitated transaction. For example, FIG. 3, e.g., FIG. 3B, shows adaptation data configured to be received by the target device for assistance in execution of speech-facilitated transaction when there is an indication of a speech-facilitated transaction between the target device and the particular party broadcasting module 318 broadcasting adaptation data (e.g., an uncommon word pronunciation guide) that is configured to be received by the target device (e.g., an automated drive thru window) when there is an indication of a speech-facilitated transaction between the target device and the particular party (e.g., when the automated drive-thru window detects a car driving up to it, a receiver is activated to receive the broadcasted adaptation data), wherein the adaptation data is configured to be applied to the target device to assist in execution of the speech-facilitated transaction.

Referring again to FIG. 7C, operation 718 may include operation 720 depicting broadcasting adaptation data that is configured to be received by the target device when the target device is within a range capable of receiving the broadcasted adaptation data, wherein the adaptation data is configured to be applied to the target device to assist in execution of the speech-facilitated transaction. For example, FIG. 3, e.g., FIG. 3B, shows adaptation data configured to be received by the target device when the target device is in a capable range, said adaptation data for assistance in execution of speech-facilitated transaction when there is an indication of a speech-facilitated transaction between the target device and the particular party broadcasting module 320 broadcasting adaptation data (e.g., a regional dialect application algorithm) that is configured to be received by the target device (e.g., an automated airline ticket counter) when the target device is within a range capable of receiving the broadcasted adaptation data (e.g., the target device is within 1 m of the device that is broadcasting the adaptation data), wherein the adaptation data is configured to be applied to the target device to assist in execution of the speech-facilitated transaction.

Figure 7D:
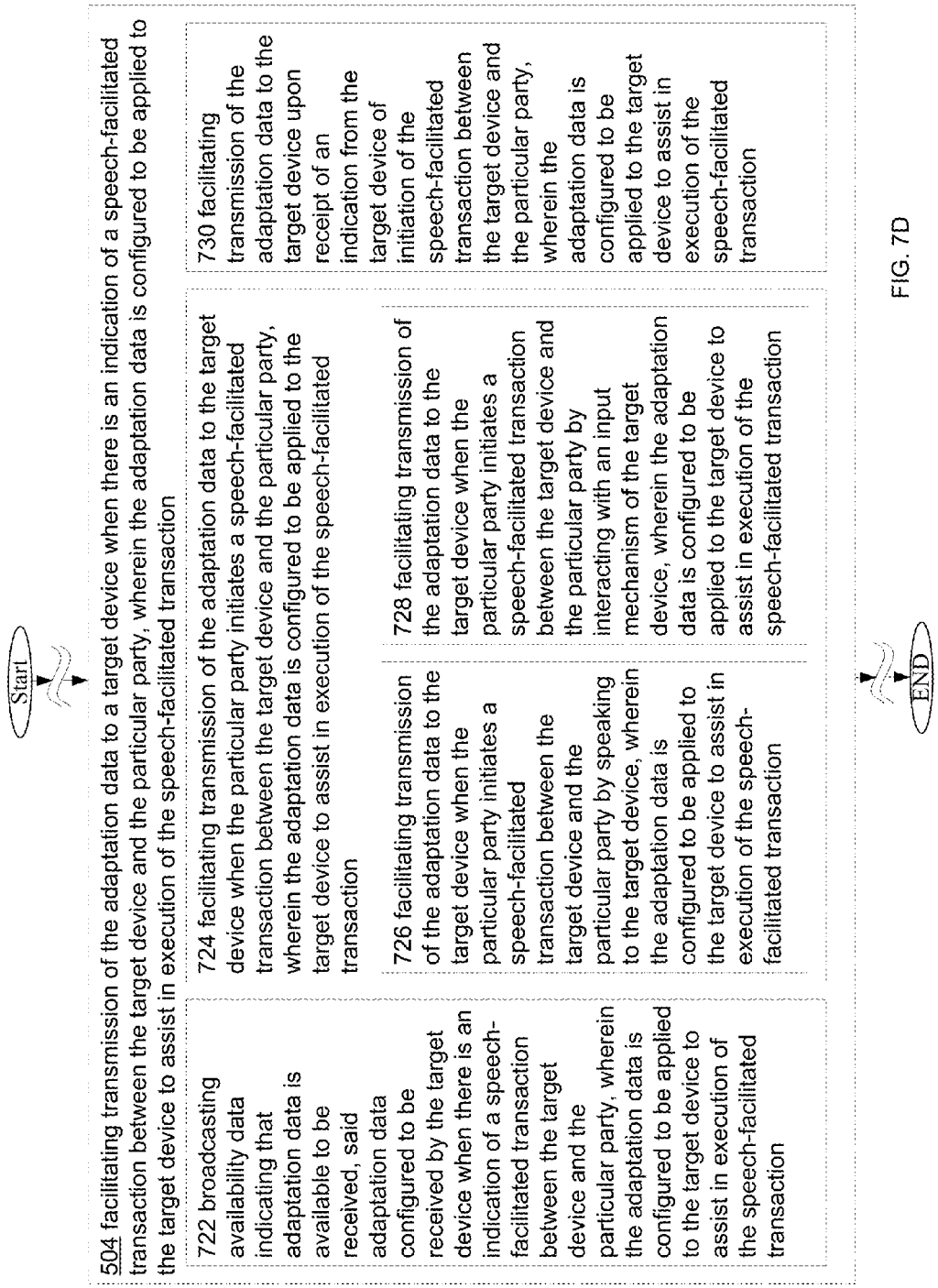
FIG. 7D is a high-level logic flowchart of a process depicting alternate implementations of the adaptation data transmission facilitating operation 504 of FIG. 5.

Referring now to FIG. 7D, operation 504 may include operation 722 depicting broadcasting availability data indicating that adaptation data is available to be received, said adaptation data configured to be received by the target device when there is an indication of a speech-facilitated transaction between the target device and the particular party, wherein the adaptation data is configured to be applied to the target device to assist in execution of the speech-facilitated transaction. For example, FIG. 3, e.g., FIG. 3C, shows availability data indicating adaptation data configured to be received by the target device is available to be received broadcasting module 322 broadcasting availability data indicating that adaptation data is available to be received (e.g., broadcasting a message stating "there is availability data available to be downloaded if your system has the connectivity and/or bandwidth), said adaptation data configured to be received by the target device (e.g., an in-vehicle command system) when there is an indication of a speech-facilitated transaction (e.g., a motor vehicle is started) between the target device (e.g., a motor vehicle with an in-vehicle voice command system) and the particular party (e.g., the driver), wherein the adaptation data (e.g., phrase completion algorithm) is configured to be applied to the target device (e.g., the in-vehicle command system) to assist in execution of the speech-facilitated transaction.

Referring again to FIG. 7D, operation 504 may include operation 724 depicting facilitating transmission of the adaptation data to the target device when the particular party initiates a speech-facilitated transaction between the target device and the particular party, wherein the adaptation data is configured to be applied to the target device to assist in execution of the speech-facilitated transaction. For example, FIG. 3, e.g., FIG. 3C, shows adaptation data configured to be applied to the target device for assistance in execution of speech-facilitated transaction transmission to target device upon initiation of a speech-facilitated transaction by the particular party facilitating module 324 facilitating transmission of the adaptation data (e.g., instructions for replacing a word frequency table with a modified word frequency table that reflects the particular party's word usage) to the target device (e.g., a speech-enabled microwave oven) when the particular party initiates a speech-facilitated transaction between the target device and the particular party (e.g., the user gives a particular command to the speech-enabled microwave oven that is pre-programmed into the microwave oven, e.g., "prepare to receive commands"), wherein the adaptation data is configured to be applied to the target device to assist in execution (e.g., by replacing the word frequency table with a word frequency table more tailored to the user's speech) of the speech-facilitated transaction.

Referring again to FIG. 7D, operation 724 may include operation 726 depicting facilitating transmission of the adaptation data to the target device when the particular party initiates a speech-facilitated transaction between the target device and the particular party by speaking to the target device, wherein the adaptation data is configured to be applied to the target device to assist in execution of the speech-facilitated transaction. For example, FIG. 3, e.g., FIG. 3C, shows adaptation data configured to be applied to the target device for assistance in execution of speech-facilitated transaction transmission to target device upon initiation of a speech-facilitated transaction by speech of the particular party facilitating module 326 facilitating transmission of the adaptation data (e.g., a list of the way that the particular party pronounces ten words, e.g., the numbers zero through nine) to the target device (e.g., an automated teller machine device) when the particular party initiates a speech-facilitated transaction (e.g., the deposit of a paper check into a checking account) between the target device and the particular party by speaking to the target device (e.g., the automated teller machine device), wherein the adaptation data is configured to be applied to the target device to assist in execution of the speech-facilitated transaction.

Referring again to FIG. 7D, operation 724 may include operation 728 depicting facilitating transmission of the adaptation data to the target device when the particular party initiates a speech-facilitated transaction between the target device and the particular party by interacting with an input mechanism of the target device, wherein the adaptation data is configured to be applied to the target device to assist in execution of the speech-facilitated transaction. For example, FIG. 3, e.g., FIG. 3C, shows adaptation data configured to be applied to the target device for assistance in execution of speech-facilitated transaction transmission to target device upon initiation of a speech-facilitated transaction by the particular party interacting with a target device input mechanism facilitating module 328 facilitating transmission of the adaptation data (e.g., a phoneme pronunciation database) to the target device (e.g., a speech-commanded vending machine) when the particular party initiates a speech-facilitated transaction between the target device and the particular party by interacting with an input mechanism of the target device (e.g., pushing a button on the vending machine, or, in an embodiment, unsuccessfully operating one or more buttons of the vending machine), wherein the adaptation data (e.g., the phoneme pronunciation database) is configured to be applied to the target device (e.g., the speech-commanded vending machine) to assist in execution of the speech-facilitated transaction.

Referring again to FIG. 7D, operation 504 may include operation 730 depicting facilitating transmission of the adaptation data to the target device upon receipt of an indication from the target device of initiation of the speech-facilitated transaction between the target device and the particular party, wherein the adaptation data is configured to be applied to the target device to assist in execution of the speech-facilitated transaction. For example, FIG. 3, e.g., FIG. 3C, shows adaptation data configured to be applied to the target device for assistance in execution of speech-facilitated transaction transmission to target device upon receipt from target device of indication of initiation of a speech-facilitated transaction facilitating module 330 facilitating transmission of the adaptation data (e.g., a basic pronunciation adjustment algorithm) to the target device (e.g., a speech-controlled television) upon receipt of an indication from the target device of initiation of the speech-facilitated transaction (e.g., the speech-controlled television sends an indication when the user speaks a particular control phrase that unlocks adult entertainment when in range of the television's sensors) between the target device (e.g., the speech-controlled television) and the particular party (e.g., the user), wherein the adaptation data is configured to be applied to the target device to assist in execution of the speech facilitated transaction (e.g., even if the adaptation data is not transmitted in time to assist with interpreting the particular control phrase, the adaptation data can assist with further speech interaction with the television, of which the control phrase is just the initiation of the speech-facilitated transaction).

Referring now to FIG. 7E, operation 504 may include operation 732 depicting facilitating transmission of the adaptation data to the target device upon receipt of an indication from the target device of a status of the speech-facilitated transaction between the target device and the particular party, wherein the adaptation data is configured to be applied to the target device to assist in execution of the speech-facilitated transaction. For example, FIG. 3, e.g., FIG. 3D, shows adaptation data configured to be applied to the target device for assistance in execution of speech-facilitated transaction transmission to target device when there is an indication from the target device of a status of the speech-facilitated transaction between the target device and the particular party facilitating module 332 facilitating transmission of the adaptation data (e.g., a Chinese language substitution algorithm) to the target device (e.g., an automated drive-thru window) upon receipt of an indication from the target device of a status of the speech-facilitated transaction (e.g., an indication that the transaction is going poorly, e.g., the device is required to repeat itself or is unable to process the received speech into an accepted data input) between the target device (e.g., the automated drive-thru window) and the particular party (e.g., the user), wherein the adaptation data is configured to be applied to the target device (e.g., to the automated drive-thru window, prior to completion of the speech-facilitated transaction) to assist in execution of the speech-facilitated transaction (e.g., placing a hamburger order).

Referring again to FIG. 7E, operation 732 may include operation 734 depicting facilitating transmission of the adaptation data to the target device upon receipt of an indication from the target device of a particular number of attempts to receive speech from the particular party, wherein the adaptation data is configured to be applied to the target device to assist in execution of the speech-facilitated transaction. For example, FIG. 3, e.g., FIG. 3D, shows adaptation data configured to be applied to the target device for assistance in execution of speech-facilitated transaction transmission to target device when there is an indication from the target device of a particular number of attempts to receive speech from the particular party facilitating module 334 facilitating transmission of the adaptation data (e.g., an utterance ignoring algorithm) to the target device (e.g., a speech-enabled Blu-ray player) upon receipt of an indication from the target device of a particular number of attempts to receive speech from the particular party (e.g., the Blu-ray player sends an indication when the user says a command, and the Blu-ray player cannot parse the command into a recognizable command that can be processed, more than three times in a particular speech-facilitated transaction), wherein the adaptation data is configured to be applied to the target device to assist in execution of the speech-facilitated transaction.

Referring again to FIG. 7E, operation 732 may include operation 736 depicting facilitating transmission of the adaptation data to the target device upon receipt of an indication from the target device of a particular number of attempts to receive a particular type of response from the particular party, wherein the adaptation data is configured to be applied to the target device to assist in execution of the speech-facilitated transaction. For example, FIG. 3, e.g., FIG. 3D, shows adaptation data configured to be applied to the target device for assistance in execution of speech-facilitated transaction transmission to target device when there is an indication from the target device of a particular number of attempts to receive a particular type of response from the particular party facilitating module 336 facilitating transmission of the adaptation data (e.g., a noise level dependent filtration algorithm) to the target device (e.g., an automated teller machine device located in the 9:30 club music venue in Washington D.C.) upon receipt of an indication from the target device (e.g., a signal transmitted out) of a particular number of attempts (e.g., five) to receive a particular type of response (e.g., a number, in response to the question displayed on the screen of "how much money do you want to withdraw") from the particular party (e.g., the user withdrawing money from the automated teller device machine), wherein the adaptation data is configured to be applied to the target device (e.g., the automated teller machine device), wherein the adaptation data is configured to be applied to the target device to assist in execution of the speech-facilitated transaction).

Referring again to FIG. 7E, operation 732 may include operation 738 depicting facilitating transmission of the adaptation data to the target device upon receipt of an indication from the target device of a particular number of failed attempts to receive a particular type of response from the particular party, wherein the adaptation data is configured to be applied to the target device to assist in execution of the speech-facilitated transaction. For example, FIG. 3, e.g., FIG. 3D, shows adaptation data configured to be applied to the target device for assistance in execution of speech-facilitated transaction transmission to target device when there is an indication from the target device of a particular number of failed attempts to receive a particular type of response from the particular party facilitating module 338 facilitating transmission of the adaptation data (e.g., an emotion-based pronunciation adjustment algorithm) to the target device (e.g., a speech-enabled GPS navigation system) upon receipt of an indication (e.g., receiving a signal) from the target device of a particular number of failed attempts (e.g., 4) to receive a particular type of response (e.g., the name of a city) from the particular party (e.g., a user trying to speak a location), wherein the adaptation data is configured to be applied to the target device to assist in execution of the speech-facilitated transaction.

Referring again to FIG. 7E, operation 732 may include operation 740 depicting facilitating transmission of the adaptation data to the target device upon receipt of an indication from the target device that a speech recognition component of the target device is processing speech of the particular party below a particular success rate. For example, FIG. 3, e.g., FIG. 3D, shows adaptation data configured to be applied to the target device for assistance in execution of speech-facilitated transaction transmission to target device when there is an indication from the target device that a speech recognition component is processing speech of the particular party below a particular success rate facilitating module 340 facilitating transmission of the adaptation data (e.g., a syllable pronunciation database) to the target device (e.g., a video game system) upon receipt of an indication from the target device (e.g., the video game system) that a speech recognition component of the target device (e.g., a software module of a game being played by the device) is processing speech of the particular party (e.g., in-game commands to a player character) below a particular success rate (e.g., less than 50% of the user's commands are properly interpreted into game commands).

Figure 7F:
FIG. 7F is a high-level logic flowchart of a process depicting alternate implementations of the adaptation data transmission facilitating operation 504 of FIG. 5.

Referring now to FIG. 7F, operation 732 may include operation 742 depicting facilitating transmission of the adaptation data to the target device upon receipt of an indication that a speech recognition component of the target device is processing speech of the particular party below a particular estimated success rate. For example, FIG. 3, e.g., FIG. 3E, shows adaptation data configured to be applied to the target device for assistance in execution of speech-facilitated transaction transmission to target device when there is an indication from the target device that a speech recognition component is processing speech of the particular party below a particular estimated success rate facilitating module 342 facilitating transmission of the adaptation data (e.g., an accent-based pronunciation modification algorithm) to the target device (e.g., a voice-activated home security system) upon receipt of an indication that a speech recognition component of the target device (e.g., a hardware module of the target device built into a wall next to a door of the home) is processing speech of the particular party below a particular estimated success rate (e.g., the rate of correct interpretation of one or more voice commands estimated by one or more components is below 32%).

Referring again to FIG. 7F, operation 732 may include operation 744 depicting facilitating transmission of the adaptation data to the target device upon receipt of an indication from the target device that the target device has a particular party speech recognition rate below a particular threshold. For example, FIG. 3, e.g., FIG. 3E, shows adaptation data configured to be applied to the target device for assistance in execution of speech-facilitated transaction transmission to target device when there is an indication from the target device that a speech recognition component has a particular party speech recognition rate below a particular threshold facilitating module 344 facilitating transmission of the adaptation data (e.g., a sentence diagramming path selection algorithm) to the target device (e.g., an automated train ticket dispensing machine) upon receipt of an indication from the target device (e.g., the automated train ticket dispensing machine) that the target device has a particular party speech recognition rate (e.g., a rate at which the target device successfully converts the user's speech into commands formatted to be processed by the ticket dispensing machine into operations) below a particular threshold (e.g., 60% recognition rate).

Referring again to FIG. 7F, operation 732 may include operation 746 depicting facilitating transmission of the adaptation data to the target device upon receipt of an indication from the target device that the target device has a particular party speech recognition error rate above a particular threshold. For example, FIG. 3, e.g., FIG. 3E, shows adaptation data configured to be applied to the target device for assistance in execution of speech-facilitated transaction transmission to target device when there is an indication from the target device that a speech recognition component has a particular party speech recognition error rate above a particular threshold facilitating module 346 facilitating transmission of the adaptation data (e.g., an uncommon word pronunciation guide) to the target device (e.g., an automated soda fountain) upon receipt of an indication from the target device that the target device has a particular party speech recognition error rate (e.g., a rate at which the target device cannot convert speech of the particular party into a recognized command) above a particular threshold (e.g., 20%).

Referring again to FIG. 7F, operation 732 may include operation 748 depicting facilitating transmission of the adaptation data to the target device upon receipt of an indication from the target device that a speech recognition component of the target device has a confidence rate below a particular threshold. For example, FIG. 3, e.g., FIG. 3E, shows adaptation data configured to be applied to the target device for assistance in execution of speech-facilitated transaction transmission to target device when there is an indication from the target device that a speech recognition component has a confidence rate below a particular threshold facilitating module 348 facilitating transmission of adaptation data (e.g., set of proper noun pronunciations, e.g., city names) to the target device (e.g., an in-vehicle navigation system) upon receipt of an indication from the target device that a speech recognition component of the target device (e.g., a server that the vehicle is in communication with) has a confidence rate (e.g., an estimation of whether the speech from the driver is being correctly interpreted) below a particular threshold (e.g., 55%).

Referring again to FIG. 7F, operation 732 may include operation 750 depicting facilitating transmission of the adaptation data to the target device upon receipt of an indication from the target device that that a speech recognition component of the target device has a substitution error rate above a particular threshold. For example, FIG. 3, e.g., FIG. 3E, shows adaptation data configured to be applied to the target device for assistance in execution of speech-facilitated transaction transmission to target device when there is an indication from the target device that a speech recognition component has a substitution error rate above a particular threshold facilitating module 350 facilitating transmission of the adaptation data (e.g., a list of the way that the user pronounces ten words, e.g., the numbers zero through nine) to the target device (e.g., an automated teller machine device) upon receipt of an indication from the target device that a speech recognition component of the target device has a substitution error rate (e.g., the rate at which the automated teller device displays the words it has interpreted the speech as on the device, and the user speaks "no" in response to the question "is this what you said") above a particular threshold (e.g., 5%).

Referring now to FIG. 7G, operation 732 may include operation 752 depicting facilitating transmission of the adaptation data to the target device upon receipt of an indication from the target device that the particular party has performed a particular number of repeated utterances. For example, FIG. 3, e.g., FIG. 3F, shows adaptation data configured to be applied to the target device for assistance in execution of speech-facilitated transaction transmission to target device when there is an indication from the target device that the particular party performed a particular number of repeated utterances facilitating module 352 facilitating transmission of the adaptation data (e.g., instructions for replacing a word frequency table with a modified word frequency table that reflects the particular party's word usage) to the target device (e.g., an automated building directory service located in the lobby of a large office building) upon receipt of an indication from the target device that the particular party has performed a particular number of repeated utterances (e.g., the user has said the same question five times in a row, indicating that the user is not getting the expected response, e.g., is not getting a useful response).

Referring again to FIG. 7G, operation 732 may include operation 754 depicting facilitating transmission of the adaptation data to the target device upon receipt of an indication from the target device that a correction rate of correction of speech by particular party feedback is above a particular rate. For example, FIG. 3, e.g., FIG. 3F, shows adaptation data configured to be applied to the target device for assistance in execution of speech-facilitated transaction transmission to target device upon receipt of indication that a correction rate of correction of speech by particular party feedback is above a particular rate facilitating module 354 facilitating transmission of the adaptation data (e.g., a regional dialect application algorithm) to the target device (e.g., an airline seat entertainment platform) upon receipt of an indication from the target device that a correction rate of correction of speech by particular party feedback is above a particular rate (e.g., the user is correcting the platform's determination of what the user said at a rate above ten percent).

Referring again to FIG. 7G, operation 504 may include operation 756 facilitating transmission of the adaptation data to a target device when the target device is within a particular proximity to the particular party, wherein the adaptation data is configured to be applied to the target device to assist in execution of the speech-facilitated transaction. For example, FIG. 3, e.g., FIG. 3F, shows adaptation data configured to be applied to the target device for assistance in execution of speech-facilitated transaction transmission to target device when the particular party is within a particular proximity to the target device facilitating module 356 facilitating transmission of the adaptation data (e.g., a phoneme pronunciation database) when the target device (e.g., an in-vehicle command system) is within a particular proximity to the particular party (e.g., when the driver sits in the drivers' seat of the vehicle), wherein the adaptation data is configured to be applied to the target device (e.g., the in-vehicle command system) to assist in execution of the speech-facilitated transaction.

Referring again to FIG. 7G, operation 504 may include operation 758 depicting facilitating transmission of the adaptation data to a target device upon receipt of a signal indicating that the target device is within a particular proximity to the particular party, wherein the adaptation data is configured to be applied to the target device to assist in execution of the speech-facilitated transaction. For example, FIG. 3, e.g., FIG. 3F, shows adaptation data configured to be applied to the target device for assistance in execution of speech-facilitated transaction transmission to target device when the target device receives a signal indicating that the particular party is within a particular proximity to the target device facilitating module 358 facilitating transmission of the adaptation data (e.g., a context-dependent acoustic processing model) to a target device (e.g., an interactive exhibit at an outdoor museum that responds to speech) upon receipt of a signal (e.g., from a satellite watching the outdoor museum) indicating that the target device is within a particular proximity (e.g., 1 meter) to the particular party (e.g., the museum patron), wherein the adaptation data is configured to be applied to the target device to assist in execution of the speech-facilitated transaction.

Referring now to FIG. 7H, operation 504 may include operation 760 depicting facilitating transmission of the adaptation data to the target device when a particular device associated with the particular party is interacting with the target device, wherein the adaptation data is configured to be applied to the target device to assist in execution of the speech-facilitated transaction. For example, FIG. 3, e.g., FIG. 3G, shows adaptation data configured to be applied to the target device for assistance in execution of speech-facilitated transaction transmission to target device when a particular device is interacting with the target device facilitating module 360 facilitating transmission of the adaptation data (e.g., a partial pattern tree model) to the target device when a particular device (e.g., a smartphone with a particular adaptation data application loaded in its software) associated with the particular party (e.g., owned or carried by the user) is interacting with the target device (e.g., an automated drive-thru window), wherein the adaptation data is configured to be applied to the target device to assist in execution of the speech-facilitated transaction.

Referring again to FIG. 7H, operation 760 may include operation 762 depicting facilitating transmission of the adaptation data to the target device when the particular device associated with the particular party is transmitting data to or receiving data from the target device, wherein the adaptation data is configured to be applied to the target device to assist in execution of the speech facilitated transaction. For example, FIG. 3, e.g., FIG. 3G, shows adaptation data configured to be applied to the target device for assistance in execution of speech-facilitated transaction transmission to target device when the particular device is transmitting or receiving data with the target device facilitating module 362 facilitating transmission of the adaptation data (e.g., a latent dialogue act matrix) to the target device (e.g., an automated grocery checkout machine) when the particular device (e.g., a bit of circuitry carried by the user in a credit card shaped device that stores the adaptation data) associated with the particular party (e.g., owned by the user) is transmitting data to or receiving data from (e.g., establishes handshake communication) the target device (e.g., an automated grocery checkout machine), wherein the adaptation data is configured to be applied to the target device (e.g., an automated grocery checkout machine) to assist in execution of the speech-facilitated transaction.

Referring again to FIG. 7H, operation 760 may include operation 764 depicting facilitating transmission of the adaptation data to the target device when the particular device associated with the particular party is coupled to the target device, wherein the adaptation data is configured to be applied to the target device to assist in execution of the speech-facilitated transaction. For example, FIG. 3, e.g., FIG. 3G, shows adaptation data configured to be applied to the target device for assistance in execution of speech-facilitated transaction transmission to target device when the particular device is coupled to the target device facilitating module 364 facilitating transmission of the adaptation data (e.g., a word and/or syllable dependency parser) to the target device (e.g., a brand new speech-enabled media player) when the particular device (e.g., a universal remote control) associated with the particular party is coupled to the target device (e.g., the universal remote control, having detected or been informed of the presence of the new media player, establishes two-way communication with the media player), wherein the adaptation data is configured to be applied to the target device to assist in execution of the speech-facilitated transaction.

Referring again to FIG. 7H, operation 764 may include operation 766 depicting facilitating transmission of the adaptation data to the target device when a smartphone associated with the particular party is coupled to the target device, wherein the adaptation data is configured to be applied to the target device to assist in execution of the speech-facilitated transaction. For example, FIG. 3, e.g., FIG. 3G, shows adaptation data configured to be applied to the target device for assistance in execution of speech-facilitated transaction transmission to target device when a smartphone associated with the particular party is coupled to the target device facilitating module 366 facilitating transmission of the adaptation data (e.g., an ungrammatical utterance deletion algorithm) to the target device when a smartphone (e.g., an Apple iPhone) associated with the particular party (e.g., the person to whom the iPhone is registered) is coupled to (e.g., in at least one-way communication with) the target device (e.g., a new dual-use convection oven), wherein the adaptation data is configured to be applied to the target device to assist in execution of the speech-facilitated transaction.

Referring again to FIG. 7H, operation 764 may include operation 768 depicting facilitating transmission of the adaptation data to the target device when a key associated with the particular party is inserted into the target device, wherein the adaptation data is configured to be applied to the target device to assist in execution of the speech-facilitated transaction. For example, FIG. 3, e.g., FIG. 3G, shows adaptation data configured to be applied to the target device for assistance in execution of speech-facilitated transaction transmission to target device when a key associated with the particular party is inserted into the target device facilitating module 368 facilitating transmission of the adaptation data (e.g., accent-based pronunciation modification algorithm) to the target device (e.g., an in-vehicle entertainment system located in the back seat of a Lincoln Town Car) when a key associated with the particular party (e.g., carried by the driver) is inserted into the target device (e.g., the Lincoln Town Car), wherein the adaptation data is configured to be applied to the target device to assist in execution of the speech-facilitated transaction.

Referring again to FIG. 7H, operation 768 may include operation 770 depicting facilitating transmission of the adaptation data to the target device when a key associated with the particular party is inserted into a motor vehicle, wherein the adaptation data is configured to be applied to the target device to assist in execution of the speech-facilitated transaction. For example, FIG. 3, e.g., FIG. 3G, shows adaptation data configured to be applied to the target device for assistance in execution of speech-facilitated transaction transmission to target device when a key associated with the particular party is inserted into a motor vehicle facilitating module 370 facilitating transmission of the adaptation data (e.g., instructions for replacing a word frequency table with a modified word frequency table that reflects the particular party's word usage) to the target device (e.g., a Ferrari F1 that is partially voice-controlled) when a key associated with the particular party is inserted into a motor vehicle, wherein the adaptation data is configured to be applied to the target device to assist in execution of the speech-facilitated transaction.

Referring now to FIG. 7I, operation 760 may include operation 772 depicting facilitating transmission of the adaptation data to the target device upon indication that the particular device associated with the particular party is coupled to the target device, wherein the adaptation data is configured to be applied to the target device to assist in execution of the speech-facilitated transaction. For example, FIG. 3, e.g., FIG. 3G, shows adaptation data configured to be applied to the target device for assistance in execution of speech-facilitated transaction transmission to target device upon receipt of indication that the particular device is coupled to the target device facilitating module 372 facilitating transmission of the adaptation data (e.g., a regional dialect application algorithm) to the target device (e.g., speech-recognition software loaded on a tablet device, e.g., a Samsung Galaxy Tab) upon indication that the particular device (e.g., a USB stick containing the adaptation data) is coupled to the target device, wherein the adaptation data is configured to be applied to the target device to assist in execution of the speech-facilitated transaction.

Referring again to FIG. 7I, operation 504 may include operation 774 depicting facilitating transmission of the adaptation data to a target device when there is an indication of a speech-facilitated transaction between the target device and the particular party, wherein the adaptation data is configured to be applied to a speech recognition component of the target device to assist in execution of the speech-facilitated transaction. For example, FIG. 3, e.g., FIG. 3H shows adaptation data configured to be applied to a speech recognition component of the target device for assistance in execution of speech-facilitated transaction transmission to target device when there is an indication of a speech-facilitated transaction between the target device and the particular party facilitating module 374 facilitating transmission of the adaptation data (e.g., a pronunciation dictionary) to a target device (e.g., an automated ordering station inside a popular lunch restaurant) when there is an indication of a speech-facilitated transaction (e.g., ordering a double bacon cheeseburger with extra bacon) between the target device (e.g., the automated ordering station) and the particular party (e.g., a customer of the restaurant in line), wherein the adaptation data (e.g., the pronunciation dictionary) is configured to be applied to a speech recognition component (e.g., loaded into memory and referred to when interpreting the received speech) of the target device to assist in execution of the speech-facilitated transaction (e.g., to be used or accessed for at least one operation or instruction when receiving and processing the speech of the user).

Referring again to FIG. 7I, operation 504 may include operation 776 depicting facilitating transmission of the adaptation data to a target device when there is an indication of a speech-facilitated transaction between the target device and the particular party, wherein the adaptation data is configured to modify a speech recognition component of the target device to assist in execution of the speech-facilitated transaction. For example, FIG. 3, e.g., FIG. 3H, shows adaptation data configured to modify a speech recognition component of the target device for assistance in execution of speech-facilitated transaction transmission to target device when there is an indication of a speech-facilitated transaction between the target device and the particular party facilitating module 376 facilitating transmission of the adaptation data (e.g., a basic pronunciation adjustment algorithm) to a target device when there is an indication of a speech-facilitated transaction between the target device (e.g., an automated baggage checking station) and the particular party (e.g., the user), wherein the adaptation data (e.g., the basic pronunciation adjustment algorithm) is configured to modify a speech recognition component (e.g., the algorithm is inserted into the overall processing steps of the speech recognition component) of the target device to assist in execution of the speech-facilitated transaction (e.g., in order to make the speech processing more accurate).

Referring again to FIG. 7I, operation 504 may include operation 778 depicting facilitating transmission of the adaptation data to a target device when there is an indication of a speech-facilitated transaction between the target device and the particular party, wherein the adaptation data is configured to supplement a speech recognition component of the target device to assist in execution of the speech-facilitated transaction. For example, FIG. 3, e.g., FIG. 3H, shows adaptation data configured to supplement a speech recognition component of the target device for assistance in execution of speech-facilitated transaction transmission to target device when there is an indication of a speech-facilitated transaction between the target device and the particular party facilitating module 378 facilitating transmission of the adaptation data (e.g., a noise level dependent filtration algorithm) to a target device (e.g., an automated teller machine located at Wrigley Field) when there is an indication of a speech-facilitated transaction (e.g., withdrawing money) between the target device and the particular party (e.g., the user), wherein the adaptation data is configured to supplement a speech recognition component of the target device (e.g., the noise level dependent filtration algorithm is designed to run alongside the other steps in processing speech, and the result of the noise level dependent filtration algorithm may be selectively used, e.g., when a confidence rate dips) to assist in execution of the speech-facilitated transaction (e.g., to improve performance of the device in processing speech).

Referring now to FIG. 7J, operation 504 may include operation 780 depicting facilitating transmission of the adaptation data to a target device when there is an indication of a speech-facilitated transaction between the target device and the particular party, wherein the adaptation data is configured to replace a speech recognition component of the target device to assist in execution of the speech-facilitated transaction. For example, FIG. 3, e.g., FIG. 3I, shows adaptation data configured to replace a speech recognition component of the target device for assistance in execution of speech-facilitated transaction transmission to target device when there is an indication of a speech-facilitated transaction between the target device and the particular party facilitating module 380 facilitating transmission of the adaptation data (e.g., an algorithm for processing speech based on training performed by the user at a previous time) to a target device (e.g., an automated teller machine device that has a low-level speech processing algorithm) when there is an indication of a speech-facilitated transaction (e.g., withdrawing money) between the target device and the particular party (e.g., the user), wherein the adaptation data is configured to replace a speech recognition component (e.g., the automated teller machine device uses the algorithm and associated data received as adaptation data in place of the low-level speech processing algorithm stored in its memory banks) of the target device (e.g., the speech-enabled automated teller machine device) to assist in execution of the speech-facilitated transaction.

Referring again to FIG. 7J, operation 504 may include operation 782 depicting facilitating transmission of the adaptation data to a target device when there is an indication of a speech-facilitated transaction between the target device and the particular party, wherein the adaptation data is configured to be applied to the target device to improve accuracy in processing speech received during execution of the speech-facilitated transaction. For example, FIG. 3, e.g., FIG. 3I, shows adaptation data configured to be applied to the target device to improve accuracy in processing speech received during execution of the speech-facilitated transaction transmission to target device when there is an indication of a speech-facilitated transaction between the target device and the particular party facilitating module 382 facilitating transmission of the adaptation data (e.g., a list of parameters to apply to one or more algorithms) to a target device (e.g., a video game speech processing system) when there is an indication of a speech-facilitated transaction (e.g., giving in-game commands to soldiers in a war game) between the target device (e.g., the video game speech processing system) and the particular party (e.g., the game player), wherein the adaptation data is configured to be applied to the target device to improve accuracy in processing speech received during execution of the speech-facilitated transaction (e.g., receiving one or more in-game commands).

Referring again to FIG. 7J, operation 504 may include operation 784 depicting facilitating transmission of the adaptation data to a target device when there is an indication of a speech-facilitated transaction between the target device and the particular party, wherein the adaptation data is configured to be applied to the target device to improve performance in processing speech received during execution of the speech-facilitated transaction. For example, FIG. 3, e.g., FIG. 3I, shows adaptation data configured to be applied to the target device to improve performance in processing speech received during execution of the speech-facilitated transaction transmission to target device when there is an indication of a speech-facilitated transaction between the target device and the particular party facilitating module 384 facilitating transmission of the adaptation data (e.g., an uncommon word pronunciation guide) to a target device (e.g., a home computer with speech recognition software loaded on it) when there is an indication of a speech-facilitated transaction (e.g., the user is talking into a microphone connected to the computer) between the target device and the particular party, wherein the adaptation data (e.g., the uncommon word pronunciation guide, e.g., for a lawyer, would include words like "estoppel," "chattel," and "res ipsa loquitor") is configured to be applied to the target device (e.g., used in conjunction with) to improve performance in processing speech (e.g., recognizing words and adding them to a text document inside word processing software) received during execution of the speech-facilitated transaction (e.g., dictating a memorandum).

Referring again to FIG. 7J, operation 784 may include operation 786 depicting facilitating transmission of the adaptation data to a target device when there is an indication of a speech-facilitated transaction between the target device and the particular party, wherein the adaptation data is configured to be applied to the target device to improve speed in processing speech received during execution of the speech-facilitated transaction. For example, FIG. 3, e.g., FIG. 3I, shows adaptation data configured to be applied to the target device to improve speed in processing speech received during execution of the speech-facilitated transaction transmission to target device when there is an indication of a speech-facilitated transaction between the target device and the particular party facilitating module 386 facilitating transmission of the adaptation data (e.g., a phrase completion algorithm) to a target device (e.g., a speech-enabled audio/visual receiver) when there is an indication of a speech-facilitated transaction (e.g., the user is holding down a button on a remote control device that controls the audio/visual receiver) between the target device and the particular party, wherein the adaptation data is configured to be applied to the target device to improve speed in processing speech received during execution of the speech-facilitated transaction.

Referring again to FIG. 7J, operation 504 may include operation 788 depicting facilitating transmission of the adaptation data to a target device when there is an indication of a speech-facilitated transaction between the target device and the particular party, wherein the adaptation data is configured to be applied to the target device to process speech received during execution of the speech-facilitated transaction. For example, FIG. 3, e.g., FIG. 3I, shows adaptation data configured to be applied to the target device for assistance in execution of speech-facilitated transaction transmission to target device during the speech-facilitated transaction between the target device and the particular party facilitating module 388 facilitating transmission of the adaptation data (e.g., a syllable pronunciation database) to a target device (e.g., a voice-controlled DVD player) when there is an indication of a speech-facilitated transaction (e.g., trying to play a specific chapter of a movie) between the target device and the particular party, wherein the adaptation data is configured to be applied to the target device (e.g., the syllable pronunciation database is analyzed and at least a portion of it is available for lookup during processing) to process speech received during execution of the speech-facilitated transaction.

Figure 7K:
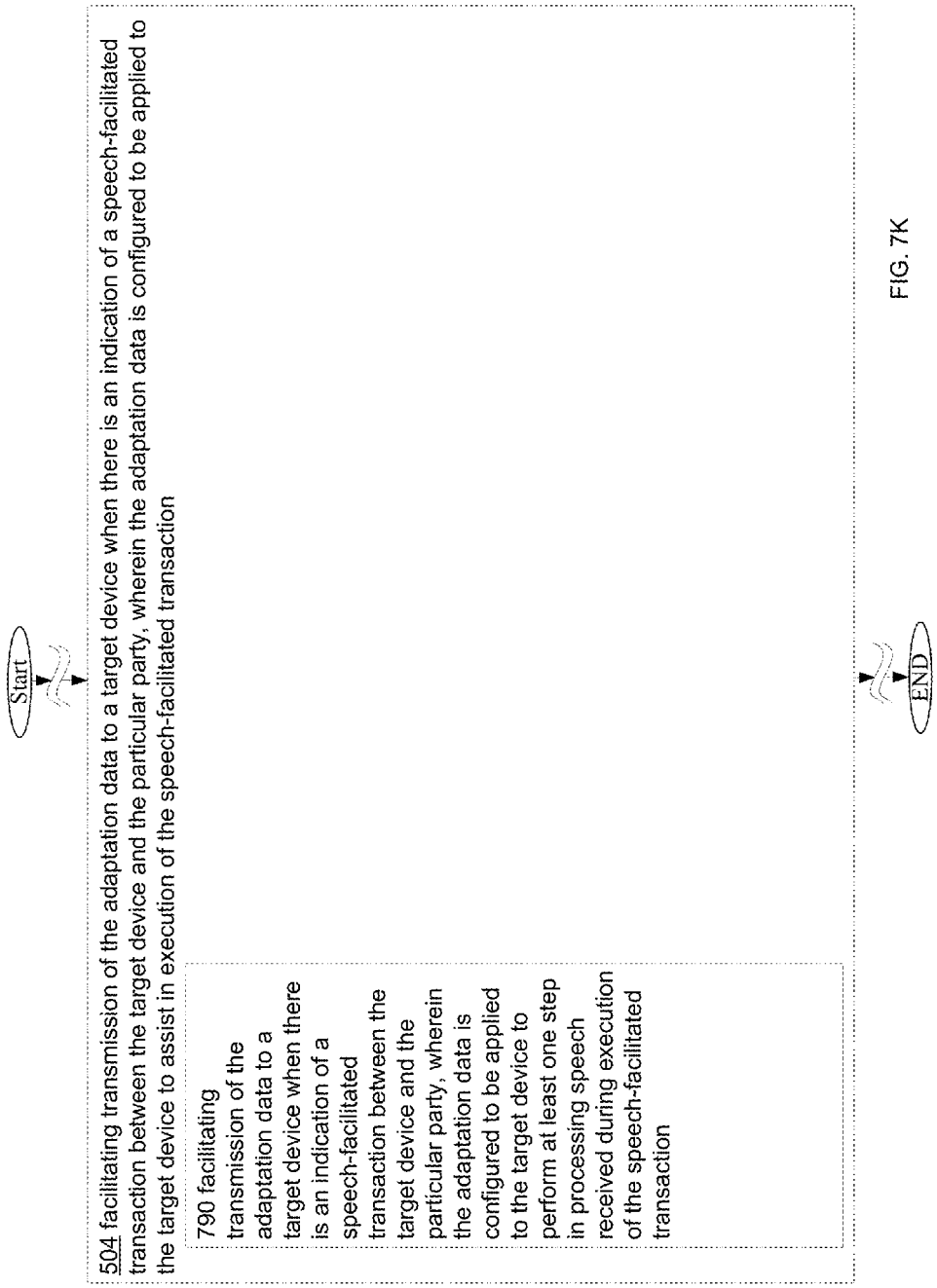
FIG. 7K is a high-level logic flowchart of a process depicting alternate implementations of the adaptation data transmission facilitating operation 504 of FIG. 5.

Referring now to FIG. 7K, operation 504 may include operation 790 depicting facilitating transmission of the adaptation data to a target device when there is an indication of a speech-facilitated transaction between the target device and the particular party, wherein the adaptation data is configured to be applied to the target device to perform at least one step in processing speech received during execution of the speech-facilitated transaction. For example, FIG. 3, e.g., FIG. 3I, shows adaptation data configured to be applied to the target device to perform at least one step in processing speech of the speech-facilitated transaction transmission to target device when there is an indication of a speech-facilitated transaction between the target device and the particular party facilitating module 790 facilitating transmission of the adaptation data (e.g., an accent-based pronunciation modification algorithm) to a target device (e.g., a speech-enabled radio control car) when there is an indication of a speech-facilitated transaction between the target device and the particular party, wherein the adaptation data is configured to be applied to the target device to perform at least one step in processing speech (e.g., adjusting for the accent of the user) received during execution of the speech-facilitated transaction.

Figure 8A:
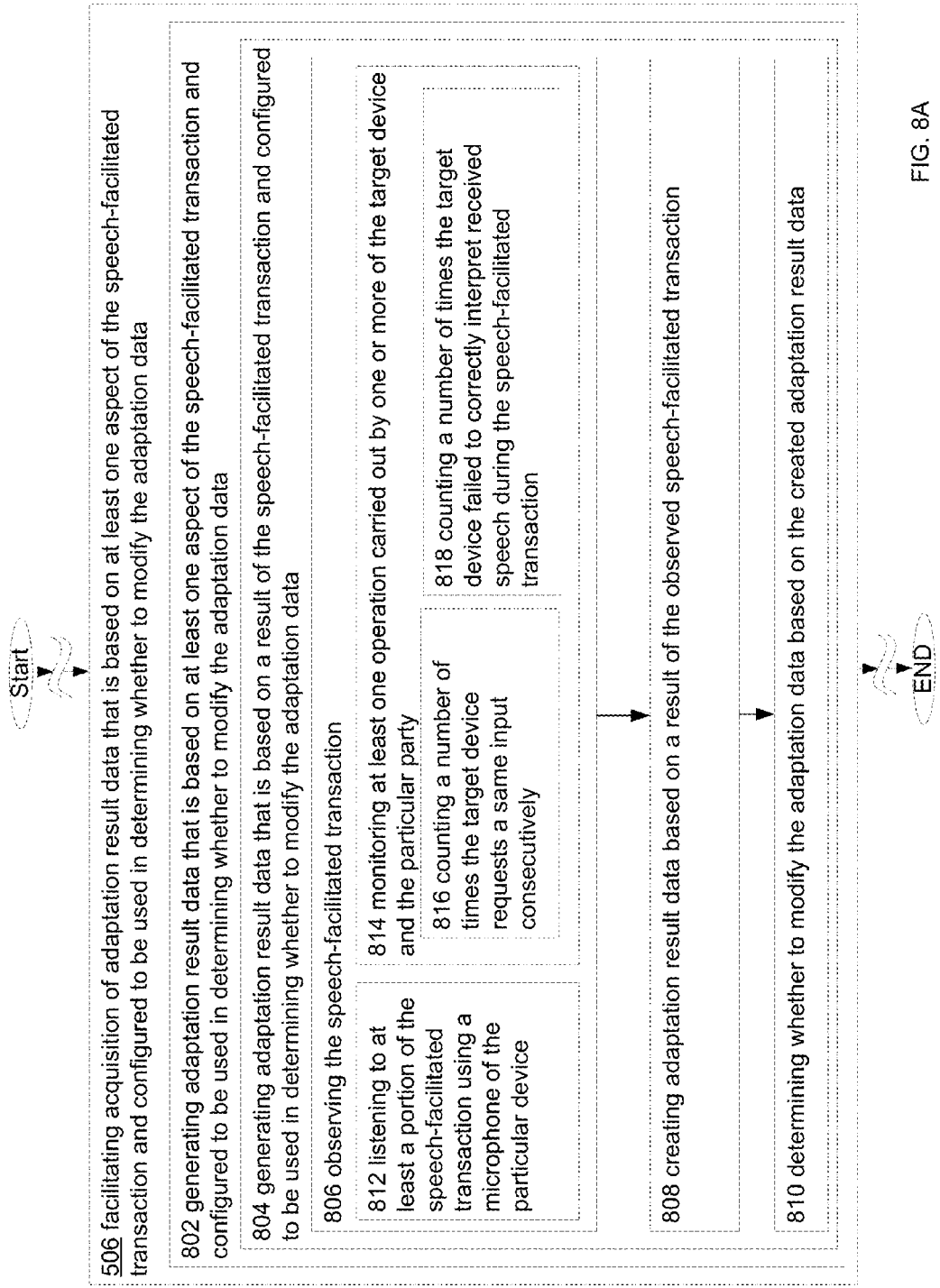
FIG. 8A is a high-level logic flowchart of a process depicting alternate implementations of the adaptation result data acquisition facilitating operation 506 of FIG. 5.

FIGS. 8A-8J depict various implementations of operation 506, according to embodiments. Referring now to FIG. 8A, operation 506 may include operation 802 depicting generating adaptation result data that is based on at least one aspect of the speech-facilitated transaction and configured to be used in determining whether to modify the adaptation data. For example, FIG. 4, e.g., FIG. 4A, shows adaptation result data based on at least one aspect of the speech-facilitated transaction and configured to be used in determining whether to modify adaptation data generating module 402 generating adaptation result data (e.g., a numeric score representing a computer-generated estimate of the success, e.g., the ease of use for the user, of the transaction) that is based on at least one aspect (e.g., a perceived error rate in speech interpretation) of the speech-facilitated transaction and configured to be used in determining whether to modify the adaptation data (e.g., a better score may result in a determination not to modify the adaptation data).

Referring again to FIG. 8A, operation 802 may include operation 804 depicting generating adaptation result data that is based on a result of the speech-facilitated transaction and configured to be used in determining whether to modify the adaptation data. For example, FIG. 4, e.g., FIG. 4A, shows adaptation result data based on a result of the speech-facilitated transaction and configured to be used in determining whether to modify the adaptation data generating module 404 generating adaptation result data that is based on a result (e.g., unsuccessful operation) of the speech-facilitated transaction (e.g., ordering a double bacon cheeseburger from an automated drive-thru station) and configured to be used in determining whether to modify the adaptation data (e.g., when the result of "unsuccessful operation," in whichever form is expressed, then the possibility that the adaptation data may be modified is available, and more data may be used to determine how much to modify the adaptation data, if at all).

Referring again to FIG. 8A, operation 804 may include operation 806 depicting observing the speech-facilitated transaction. For example, FIG. 4, e.g., FIG. 4A, shows speech-facilitated transaction observing module 406 observing (e.g., having a sensor that detects at least one component of, e.g., recording or listening to) the speech-facilitated transaction (e.g., commanding an in-vehicle command system to lower the rear passenger side window).

Referring again to FIG. 8A, operation 804 may include operation 808 depicting creating adaptation result data based on a result of the observed speech-facilitated transaction. For example, FIG. 4, e.g., FIG. 4A, shows observed speech-facilitated transaction result-based adaptation result data creating module 408 creating adaptation result data (e.g., generating a numeric score from 0 to 100) based on a result of the observed speech-facilitated transaction (e.g., determining whether the in-vehicle command system actually lowered the rear passenger side window, and if so, if the user had to repeat the command, or if the command took more than a particular number of cycles to process).

Referring again to FIG. 8A, operation 804 may include operation 810 depicting determining whether to modify the adaptation data based on the created adaptation result data. For example, FIG. 4, e.g., FIG. 4A, shows created adaptation result data-based adaptation data modification determining module 410 determining whether to modify the adaptation data (e.g., the phrase completion algorithm will be modified if the numeric score is less than 25) based on the created adaptation result data (e.g., the numeric score from 0 to 100).

Referring again to FIG. 8A, operation 806 may include operation 812 depicting listening to at least a portion of the speech-facilitated transaction using a microphone of the particular device. For example, FIG. 4, e.g., FIG. 4A, shows microphone-based speech-facilitated transaction portion listening module 412 listening to at least a portion (e.g., using a microphone to receive audio data of the speech-facilitated transaction) of the speech-facilitated transaction (e.g., asking a GPS navigation device for directions to the nearest Dunkin' Donuts) using a microphone of the particular device (e.g., a smartphone).

Referring again to FIG. 8A, operation 806 may include operation 814 depicting monitoring at least one operation carried out by one or more of the target device and the particular party during the speech-facilitated transaction. For example, FIG. 4, e.g., FIG. 4A, shows target device or particular party operation during speech-facilitated transaction monitoring module 414 monitoring (e.g., detecting) at least one operation (e.g., interpreting a number spoken by the user placing the order) carried out by one or more of the target device (e.g., an automated drive thru window) and the particular party (e.g., the user ordering the food) during the speech-facilitated transaction (e.g., after the user says "I want some chicken nuggets," and the automated drive thru window responds, "How many," and the user responds, "twenty," then the interpretation of the number twenty is monitored).

Referring again to FIG. 8A, operation 814 may include operation 816 depicting counting a number of times the target device requests a same input consecutively. For example, FIG. 4, e.g., FIG. 4A, shows number of times the target device consecutively requests a same input monitoring module 416 counting a number of times (e.g., three) the target device (e.g., an in-vehicle navigation system) requests a same input consecutively (e.g., "please enter your destination city)

Referring again to FIG. 8A, operation 814 may include operation 818 depicting counting a number of times the target device failed to correctly interpret received speech during the speech-facilitated transaction. For example, FIG. 4, e.g., FIG. 4A, shows number of times the target device failed to correctly interpret received speech monitoring module 418 counting a number of times the target device (e.g., a voice-controlled DVD player) failed to correctly interpret (e.g., determines through user input, inability to process into recognizable input, or other heuristics that the received speech was not correctly interpreted) received speech during the speech-facilitated transaction (e.g., playing a movie and setting the screen settings to "widescreen").

Figure 8B:
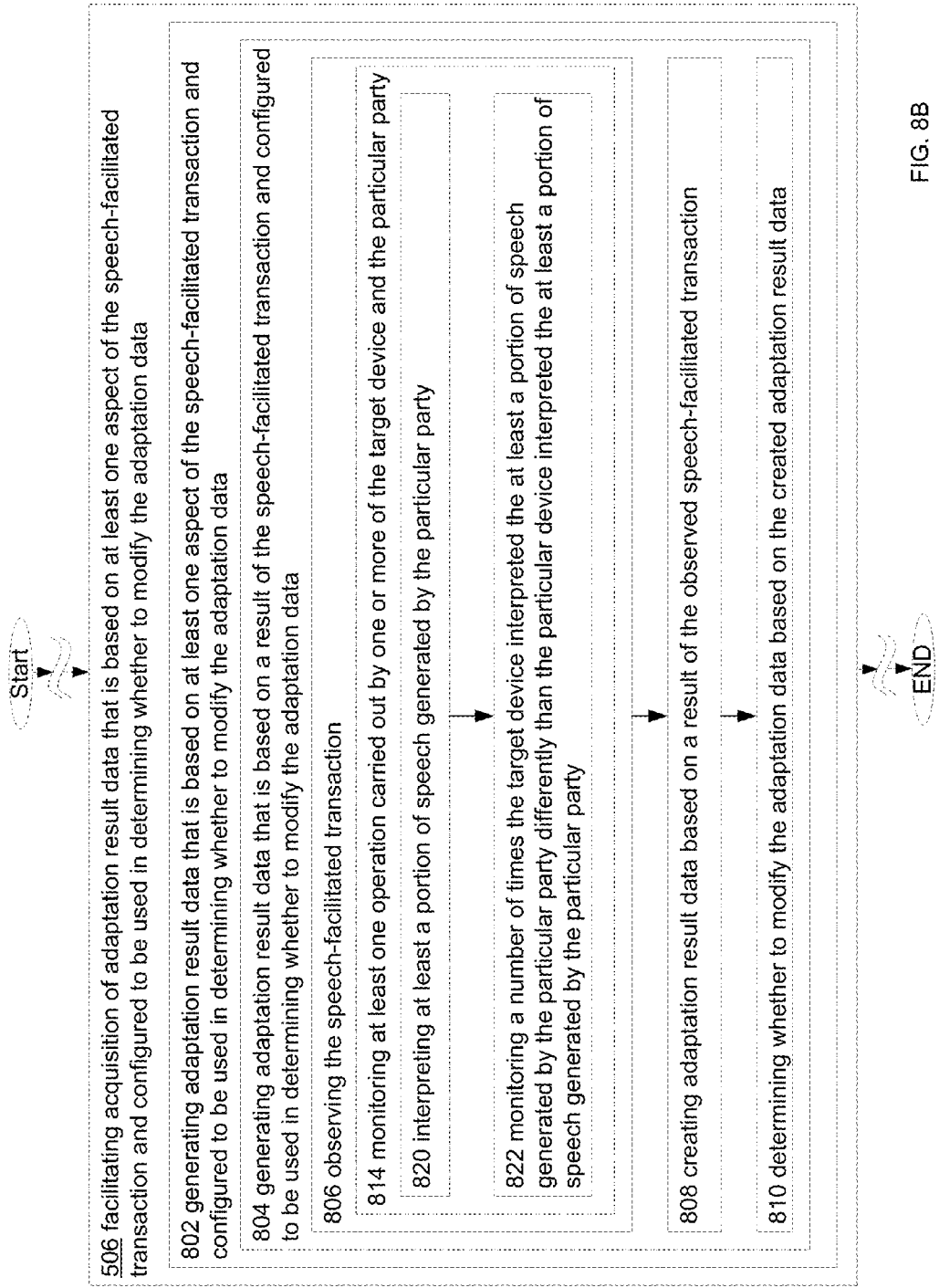
FIG. 8B is a high-level logic flowchart of a process depicting alternate implementations of the adaptation result data acquisition facilitating operation 506 of FIG. 5.

Referring now to FIG. 8B, operation 814 may include operation 820 depicting interpreting at least a portion of speech generated by the particular party. For example, FIG. 4, e.g., FIG. 4A, shows portion of speech generated by particular party interpreting module 420 interpreting (e.g., converting audio data into commands recognized by at least one module of a device) at least a portion of speech (e.g., at least one word) generated (e.g., spoken) by the particular party (e.g., the user).

Referring again to FIG. 8B, operation 814 may include operation 822 depicting monitoring a number of times the target device interpreted the at least a portion of speech generated by the particular party differently than the particular device interpreted the at least a portion of speech generated by the particular party. For example, FIG. 4, e.g., FIG. 4A, shows number of times the target device interpreted a portion of speech differently than the particular device interpreted the portion of speech counting module 422 monitoring a number of times the target device (e.g., an automated teller machine device) interpreted the at least a portion of speech generated by the particular party (e.g., the word "four" pronounced by the user) differently than the particular device (e.g., the user's smartphone with its microphone active inside the user's pocket) interpreted the at least a portion of speech generated by the particular party (e.g., the automated teller machine device interpreted the word as "forty," but the smartphone interpreted the word as "four").

Figure 8C:
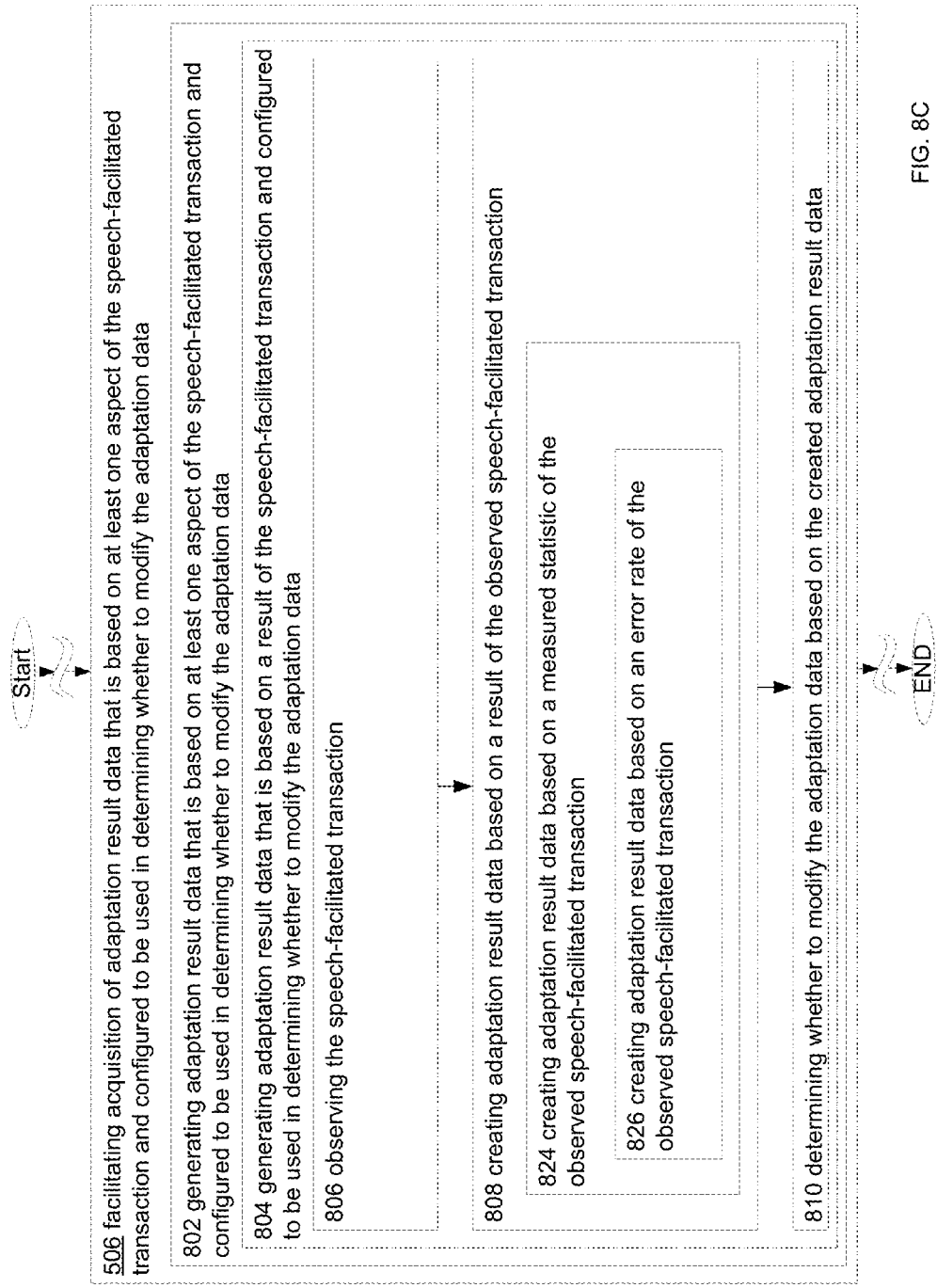
FIG. 8C is a high-level logic flowchart of a process depicting alternate implementations of the adaptation result data acquisition facilitating operation 506 of FIG. 5.

Referring now to FIG. 8C, operation 808 may include operation 824 depicting creating adaptation result data based on a measured statistic of the observed speech-facilitated transaction. For example, FIG. 4, e.g., FIG. 4A, shows observed speech-facilitated transaction measured statistic-based adaptation result data creating module 424 creating adaptation result data (e.g., instructions for modifying at least one parameter of at least one algorithm in the adaptation data) based on a measured statistic (e.g., confidence rate of interpretation over all the words of the speech-facilitated transaction) of the observed speech-facilitated transaction (e.g., checking luggage at an automated bag checking counter).

Referring again to FIG. 8C, operation 808 may include operation 826 depicting creating adaptation result data based on an error rate of the observed speech-facilitated transaction. For example, FIG. 4, e.g., FIG. 4A, shows observed speech-facilitated transaction error rate-based adaptation result data creating module 426 creating adaptation result data (e.g., a new upper and lower bound for an utterance ignoring algorithm) based on an error rate (e.g., a rate at which the received speech was not correctly interpreted into one or more words) of the observed speech-facilitated transaction (e.g., dictating a memorandum to a voice-facilitated word processing software loaded on a smartphone).

Figure 8D:
FIG. 8D is a high-level logic flowchart of a process depicting alternate implementations of the adaptation result data acquisition facilitating operation 506 of FIG. 5.

Referring now to FIG. 8D, operation 506 may include operation 828 depicting receiving adaptation result data that is based on at least one aspect of the speech-facilitated transaction and configured to be used in determining whether to modify the adaptation data. For example, FIG. 4, e.g., FIG. 4B, shows adaptation result data based on at least one aspect of the speech-facilitated transaction and configured to be used in determining whether to modify adaptation data receiving module 428 receiving adaptation result data (e.g., a list of one or more words that were correctly interpreted) that is based on at least one aspect (e.g., correct interpretation) of the speech-facilitated transaction (e.g., giving a command in a speech-enabled video game) and configured to be used in determining whether to modify the adaptation data (e.g., the words that were correctly interpreted may be protected from having their pronunciations stored in the adaptation data further modified).

Referring again to FIG. 8D, operation 506 may include operation 830 depicting providing a location at which adaptation result data is configured to be received, said adaptation result data based on at least one aspect of the speech-facilitated transaction and configured to be used in determining whether to modify the adaptation data. For example, FIG. 4, e.g., FIG. 4B, shows adaptation result data based on at least one aspect of the speech-facilitated transaction and configured to be used in determining whether to modify adaptation data location at which adaptation result data is configured to be received providing module 430 providing a location (e.g., a server) at which adaptation result data (e.g., feedback data from the particular party) is configured to be received, said adaptation result data based on at least one aspect of the speech-facilitated transaction (e.g., a user's subjective opinion of an ease with which the transaction was carried out) and configured to be used in determining whether to modify the adaptation data (e.g., the user's opinion may be one factor in determining whether the adaptation data should be modified to improve future speech-facilitated interactions).

Referring again to FIG. 8D, operation 506 may include operation 832 depicting receiving data regarding the speech-facilitated transaction. For example, FIG. 4, e.g., FIG. 4B, shows data regarding speech-facilitated transaction receiving module 432 receiving data (e.g., survey result data) regarding the speech-facilitated transaction (e.g., ordering an ice cream sundae from an automated sundae-making machine).

Referring again to FIG. 8D, operation 506 may include operation 834 depicting processing the received data into adaptation result data that is based on at least one aspect of the speech-facilitated transaction and configured to be used in determining whether to modify the adaptation data. For example, FIG. 4, e.g., FIG. 4B, shows received data into adaptation result data based on at least one aspect of speech-facilitated transaction processing module 434 processing the received data (e.g., the survey result data) into adaptation result data (e.g., a numeric score gauging the accuracy of the speech interpretation during the speech-facilitated transaction) that is based on at least one aspect of the speech-facilitated transaction (e.g., satisfaction based on ease of the transaction, e.g., how easily the person was understood) and configured to be used in determining whether to modify the adaptation data (e.g., determining whether the adaptation data could be improved through modification).

Referring again to FIG. 8D, operation 832 may include operation 836 depicting receiving data regarding the speech-facilitated transaction from the target device. For example, FIG. 4, e.g., FIG. 4B, shows data regarding speech-facilitated transaction receiving from target device 436 receiving data regarding the speech-facilitated transaction (e.g., error rates) from the target device (e.g., a vehicle control system).

Referring again to FIG. 8D, operation 506 may include operation 838 depicting receiving adaptation result data from the target device, said adaptation result data based on at least one aspect of the speech-facilitated transaction and configured to be used in determining whether to modify the adaptation data. For example, FIG. 4, e.g., FIG. 4B, shows adaptation result data based on at least one aspect of the speech-facilitated transaction and configured to be used in determining whether to modify adaptation data receiving from target device module 438 receiving adaptation result data (e.g., a list of one or more words for which the confidence rate of interpretation was less than a threshold value, e.g., 35%) from the target device, said adaptation result data based on at least one aspect of the speech-facilitated transaction (e.g., the confidence rate of word interpretation) and configured to be used in determining whether to modify the adaptation data.

Figure 8E:
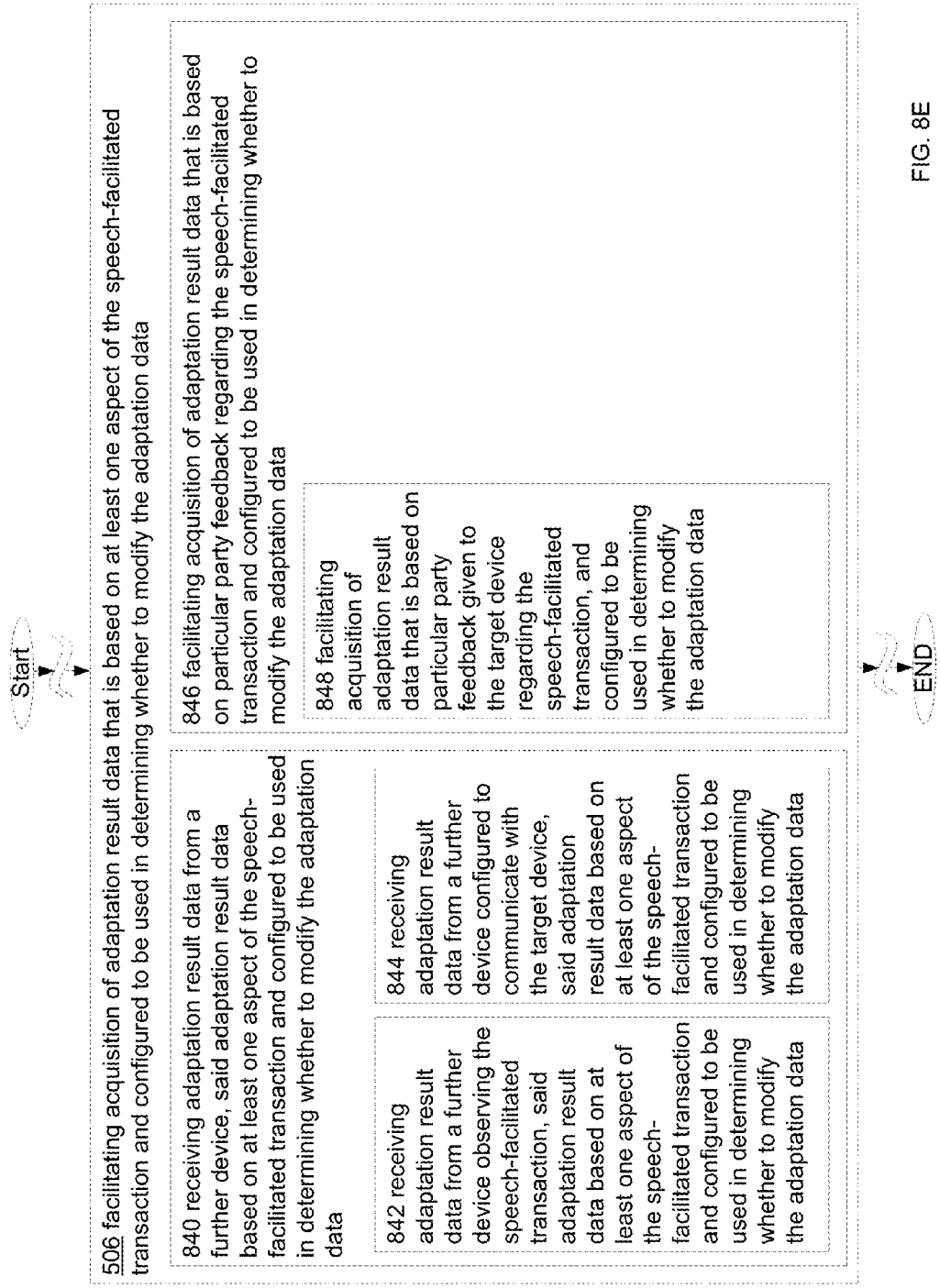
FIG. 8E is a high-level logic flowchart of a process depicting alternate implementations of the adaptation result data acquisition facilitating operation 506 of FIG. 5.

Referring now to FIG. 8E, operation 506 may include operation 840 depicting receiving adaptation result data from a further device, said adaptation result data based on at least one aspect of the speech-facilitated transaction and configured to be used in determining whether to modify the adaptation data. For example, FIG. 4, e.g., FIG. 4C, shows adaptation result data based on at least one aspect of the speech-facilitated transaction and configured to be used in determining whether to modify adaptation data receiving from a further device module 440 receiving adaptation result data (e.g., information regarding a user's subjective state from social networking after the transaction took place) from a further device (e.g., a server in communication with a social networking site), said adaptation result data based on at least one aspect of the speech-facilitated transaction (e.g., the information regarding the user's subjective state may be used to infer the user's impression of the speech-facilitated transaction) and configured to be used in determining whether to modify the adaptation data (e.g., the user's subjective state as expressed through social media may be one factor in determining the user's satisfaction with the speech-facilitated transaction, which may in turn be used in determining whether to modify the adaptation data).

Referring again to FIG. 8E, operation 840 may include operation 842 depicting receiving adaptation result data from a further device observing the speech-facilitated transaction, said adaptation result data based on at least one aspect of the speech-facilitated transaction and configured to be used in determining whether to modify the adaptation data. For example, FIG. 4, e.g., FIG. 4C, shows adaptation result data based on at least one aspect of the speech-facilitated transaction and configured to be used in determining whether to modify adaptation data receiving from a transaction-observing further device module 442 receiving adaptation result data (e.g., a report from an outside observer regarding the inferred efficiency of the transaction) from a further device (e.g., a centralized server that records speech-facilitated transactions, and one or more sensors for picking up audio data regarding the speech-facilitated transaction) observing the speech-facilitated transaction (e.g., ordering a hot dog and chips from an automated drive-in window) based on at least one aspect of the speech-facilitated transaction (e.g., the centralized server receives the audio data, compares it with a large database of other speech-facilitated transactions, and determines whether the speech is properly interpreted, e.g., in some embodiments, this does not happen in real time, but after the conclusion of the speech-facilitated transaction, at which point time may not be an issue) and configured to be used in determining whether to modify the adaptation data (e.g., the analysis of whether the target device processed the speech in the same manner as the centralized server may be one factor in determining whether the adaptation data should be replaced with different adaptation data).

Referring again to FIG. 8E, operation 840 may include operation 844 depicting receiving adaptation result data from a further device configured to communicate with the target device, said adaptation result data based on at least one aspect of the speech-facilitated transaction and configured to be used in determining whether to modify the adaptation data. For example, FIG. 4, e.g., FIG. 4C, shows adaptation result data based on at least one aspect of the speech-facilitated transaction and configured to be used in determining whether to modify adaptation data receiving from a further device configured to communicate with the target device module 444 receiving adaptation result data (e.g., an error rate of interpretation of speech during the speech-facilitated transaction) from a further device (e.g., a monitoring computer in communication with an enterprise network of speech-enabled computing machines) configured to communicate with the target device (e.g., a speech-enabled desktop computer on the same network as the monitoring computer), said adaptation result data (e.g., error rate of interpretation) based on at least one aspect of the speech-facilitated transaction (e.g., the error rate in interpreting one or more words) and configured to be used in determining whether to modify the adaptation data (e.g., if the error rate is above a threshold value, the adaptation data will be modified based on which words were misinterpreted).

Referring again to FIG. 8E, operation 506 may include operation 846 depicting facilitating acquisition of adaptation result data that is based on particular party feedback regarding the speech-facilitated transaction and configured to be used in determining whether to modify the adaptation data. For example, FIG. 4, e.g., FIG. 4C, shows acquisition of adaptation result data based on particular party feedback and configured to be used in determining whether to modify adaptation data facilitating module 446 facilitating acquisition of adaptation result data (e.g., survey results regarding the transaction) that is based on particular party feedback (e.g., after the operation is complete, the user logs on to her computer, uses the web browser to browse to the product site of the DVD recorder, logs in, and is prompted to take a survey in which the user is requested to rate the device's ability to understand your words on a scale from one to ten) regarding the speech-facilitated transaction (e.g., programming a voice-commanded DVD-Recorder) and configured to be used in determining whether to modify the adaptation data.

Referring again to FIG. 8E, operation 846 may include operation 848 depicting facilitating acquisition of adaptation result data that is based on particular party feedback given to the target device regarding the speech-facilitated transaction, and configured to be used in determining whether to modify the adaptation data. For example, FIG. 4, e.g., FIG. 4C, shows acquisition of adaptation result data based on particular party feedback given to target device and configured to be used in determining whether to modify adaptation data facilitating module 448 facilitating acquisition of adaptation result data (e.g., a first-try word recognizance rate) that is based on particular party feedback (e.g., a numerical result of a survey question, "On a scale of 1 to 5, rate this device's interpretation of your speech commands today") given to the target device (e.g., the target device, e.g., the automated teller machine device, displays a survey request after the banking transaction is completed) regarding the speech-facilitated transaction (depositing three checks into a checking account), and configured to be used in determining whether to modify the adaptation data.

Figure 8F:
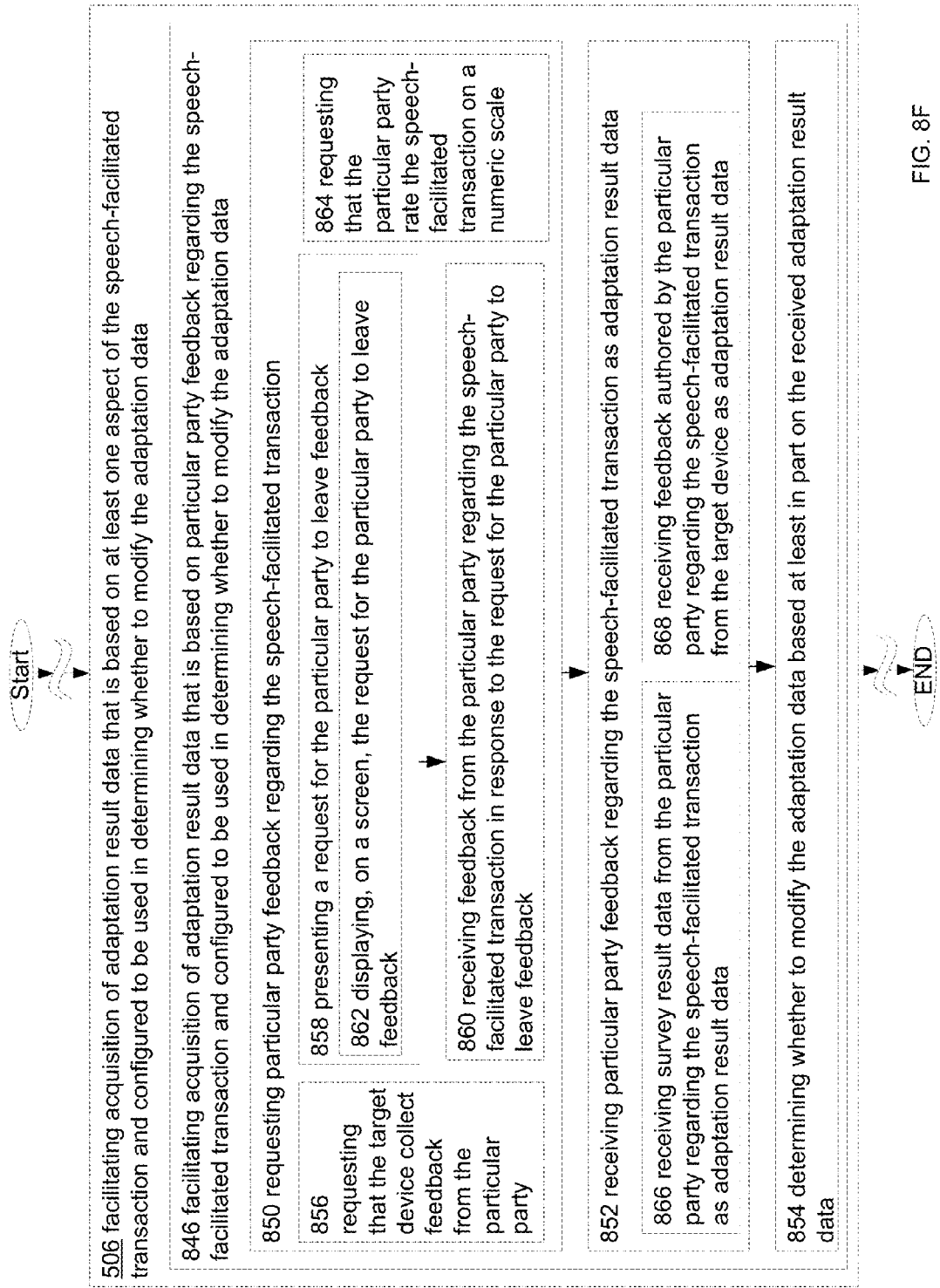
FIG. 8F is a high-level logic flowchart of a process depicting alternate implementations of the adaptation result data acquisition facilitating operation 506 of FIG. 5.

Referring now to FIG. 8F, operation 846 may include operation 850 depicting requesting particular party feedback regarding the speech-facilitated transaction. For example, FIG. 4, e.g., FIG. 4D, shows particular party feedback regarding speech-facilitated transaction requesting module 450 requesting particular party feedback (e.g., numerical survey results) regarding the speech-facilitated transaction (e.g., interacting with an automated grocery checkout machine).

Referring again to FIG. 8F, operation 846 may include operation 852 depicting receiving particular party feedback regarding the speech-facilitated transaction as adaptation result data. For example, FIG. 4, e.g., FIG. 4D, shows particular party feedback as adaptation result data receiving module 452 receiving particular party feedback (e.g., the numerical survey results) regarding the speech-facilitated transaction (e.g., purchasing groceries from an automated grocery checkout machine) as adaptation result data (e.g., the numerical survey results).

Referring again to FIG. 8F, operation 846 may include operation 854 depicting determining whether to modify the adaptation data based at least in part on the received adaptation result data. For example, FIG. 4, e.g., FIG. 4D, shows adaptation result data-based adaptation data modification determining module 454 determining whether to modify the adaptation data (e.g., the phrase completion algorithm) based at least in part on the received adaptation result data (e.g., the numerical survey results).

Referring again to FIG. 8F, operation 850 may include operation 856 depicting requesting that the target device collect feedback from the particular party. For example, FIG. 4, e.g., FIG. 4D, shows feedback from particular party requesting from target device module 456 requesting that the target device (e.g., the speech-enabled video game system) collect feedback (e.g., one or more of the user's subjective impressions of the transaction) from the particular party (e.g., the game player).

Referring again to FIG. 8F, operation 850 may include operation 858 depicting presenting a request for the particular party to leave feedback. For example, FIG. 4, e.g., FIG. 4D, shows request for particular party feedback presenting module 458 presenting (e.g., displaying, e.g., displaying on a screen of a tablet) a request for the particular party to leave feedback (e.g., displaying on the tablet screen, "please rate your previous speech-facilitated ATM transaction").

Referring again to FIG. 8F, operation 850 may include operation 860 depicting receiving feedback from the particular party regarding the speech-facilitated transaction in response to the request for the particular party to leave feedback. For example, FIG. 4, e.g., FIG. 4D, shows particular party feedback receiving in response to request module 460 receiving feedback from the particular party (e.g., the user presses a soft button on a tablet indicating the user's rating of the transaction from A to F) regarding the speech-facilitated transaction (e.g., withdrawing money from the automated teller machine device) in response to the request for the particular party to leave feedback (e.g., the displaying on the tablet screen, "please rate your previous speech-facilitated ATM transaction").

Referring again to FIG. 8F, operation 858 may include operation 862 depicting displaying, on a screen, the request for the particular party to leave feedback. For example, FIG. 4, e.g., FIG. 4D, shows request for particular party feedback displaying on a screen module 462 displaying, on a screen (e.g., a screen of a computer), the request for the particular party to leave feedback (e.g., "please speak a number between 0 and 9 that rates the ease of this transaction").

Referring again to FIG. 8F, operation 850 may include operation 864 depicting requesting that the particular party rate the speech-facilitated transaction on a numeric scale. For example, FIG. 4, e.g., FIG. 4D, shows particular party feedback rating speech-facilitated transaction on numeric scale requesting module 464 requesting that the particular party (e.g., the user controlling his voice-activated television set) rate the speech-facilitated transaction (e.g., programming the user's favorite channels) on a numeric scale (e.g., from 1 to 100).

Referring again to FIG. 8F, operation 852 may include operation 866 depicting receiving survey result data from the particular party regarding the speech-facilitated transaction as adaptation result data. For example, FIG. 4, e.g., FIG. 4D, shows particular party survey result data regarding speech-facilitated transaction as adaptation result data receiving module 466 receiving survey result data (e.g., text of a user's answers to a survey) from the particular party (e.g., the user) regarding the speech-facilitated transaction (e.g., a home convenience voice system where the user walks in and speaks to the room, commanding the temperature to go to a certain level, and for Bach to play over the speakers) as adaptation result data (e.g., the adaptation result data is the text of a user's answers to the survey, or, in some embodiments, a numeric representation of the text of the user's answers to the survey).

Referring again to FIG. 8F, operation 852 may include operation 868 depicting receiving feedback authored by the particular party regarding the speech-facilitated transaction from the target device as adaptation result data. For example, FIG. 4, e.g., FIG. 4D, shows particular party authored feedback as adaptation result data receiving module 468 receiving feedback authored by the particular party (e.g., a text string of feedback that was converted from voice data) regarding the speech-facilitated transaction from the target device (e.g., the home security system positioned just inside the front door, to which the user speaks her thoughts regarding the system upon prompting) as adaptation result data (e.g., the adaptation result data is the text representation that is authored by the user through voice interaction).

Figure 8G:
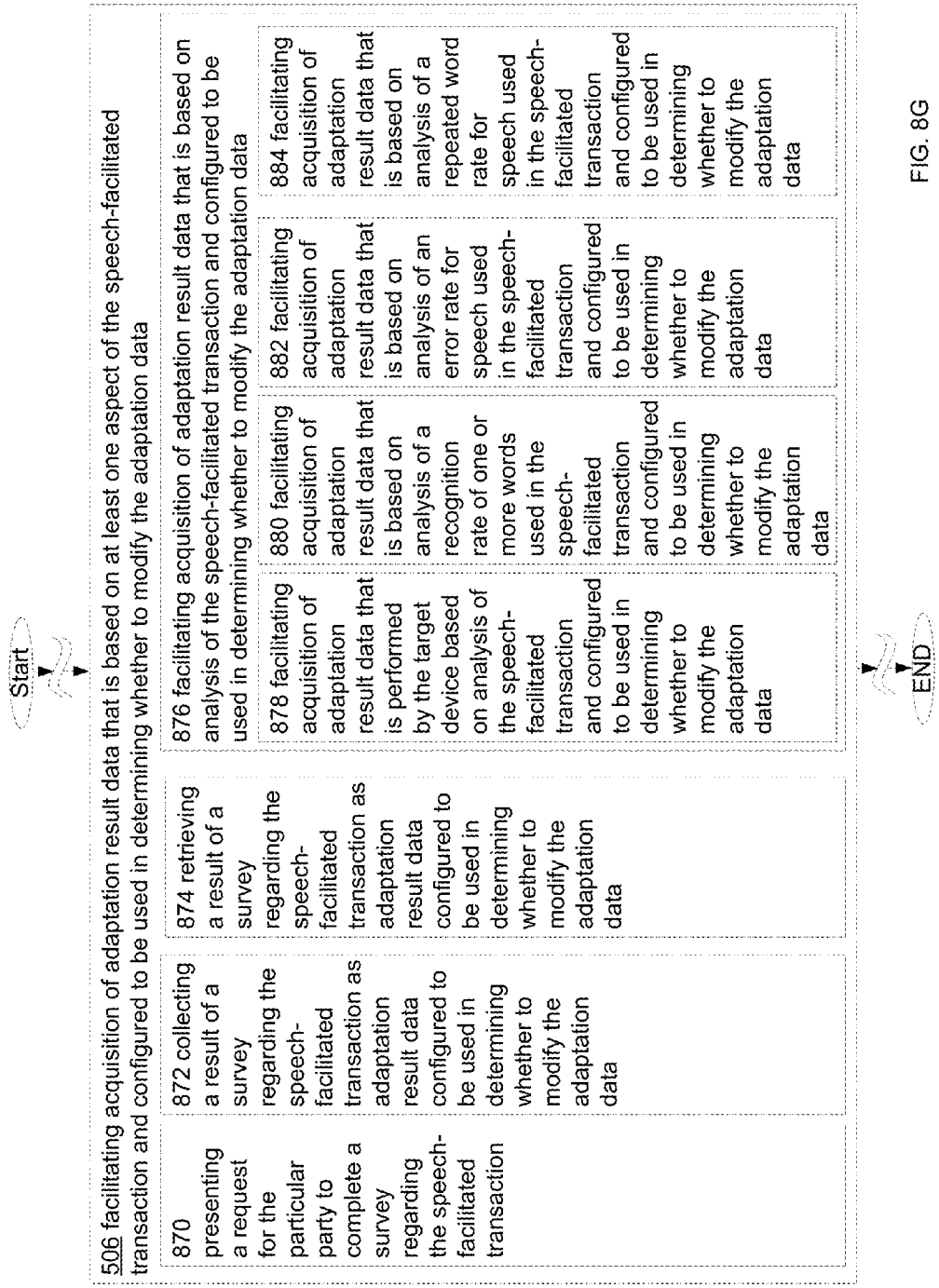
FIG. 8G is a high-level logic flowchart of a process depicting alternate implementations of the adaptation result data acquisition facilitating operation 506 of FIG. 5.

Referring now to FIG. 8G, operation 506 may include operation 870 depicting presenting a request for the particular party to complete a survey regarding the speech-facilitated transaction. For example, FIG. 4, e.g., FIG. 4D, shows request for particular party to complete a survey regarding the speech-facilitated transaction presenting module 470 presenting a request (e.g., playing a vocal request over a speaker of a device) for the particular party (e.g., the user) to complete a survey (e.g., a five-question survey ranking various parts of using the speech-enabled dual-use convection oven from 0 to 5) regarding the speech-facilitated transaction. In an embodiment, this is done by a device other than the dual-use convection oven, e.g., the user's smartphone.

Referring again to FIG. 8G, operation 506 may include operation 872 depicting collecting a result of a survey regarding the speech-facilitated transaction as adaptation result data configured to be used in determining whether to modify the adaptation data. For example, FIG. 4, e.g., FIG. 4E, shows result of survey regarding the speech-facilitated transaction collecting module 472 collecting a result (e.g., receiving input from the user) of a survey regarding the speech-facilitated transaction (e.g., a survey that asks the user to rank a particular interaction with a voice-controlled home security system against previous interactions with the voice-controlled home security system) as adaptation result data configured to be used in determining whether to modify the adaptation data (e.g., based on the survey results, the adaptation data may be modified slightly, substantially modified, or not modified at all).

Referring again to FIG. 8G, operation 506 may include operation 874 depicting retrieving a result of a survey regarding the speech-facilitated transaction as adaptation result data configured to be used in determining whether to modify the adaptation data. For example, FIG. 4, e.g., FIG. 4E, shows result of survey regarding the speech-facilitated transaction retrieving module 474 retrieving a result of a survey (e.g., from a survey repository on the Internet, e.g., a user logs on, takes a survey online, and those survey results are stored there until the retrieval) regarding the speech-facilitated transaction as adaptation result data configured to be used in determining whether to modify the adaptation data (e.g., the uncommon word pronunciation guide).

Referring again to FIG. 8G, operation 506 may include operation 876 depicting facilitating acquisition of adaptation result data that is based on analysis of the speech-facilitated transaction and configured to be used in determining whether to modify the adaptation data. For example, FIG. 4, e.g., FIG. 4E, shows acquisition of adaptation result data based analysis of the speech-facilitated transaction and configured to be used in determining whether to modify adaptation data facilitating module 476 facilitating acquisition of adaptation result data (e.g., a proper noun correct recognition rate) that is based on analysis of the speech-facilitated transaction (e.g., analyzing which of the proper nouns spoken during the transaction were correctly interpreted) and configured to be used in determining whether to modify the adaptation data (e.g., a set of proper noun pronunciations, e.g., city names).

Referring again to FIG. 8G, operation 876 may include operation 878 depicting facilitating acquisition of analysis performed by the target device of the speech-facilitated transaction and configured to be used in determining whether to modify the adaptation data. For example, FIG. 4, e.g., FIG. 4E, shows acquisition of adaptation result data based target device-performed analysis of the speech-facilitated transaction and configured to be used in determining whether to modify adaptation data facilitating module 478 facilitating acquisition of analysis performed by the target device (e.g., error rate calculation performed on-the-fly by the automated teller machine device) of the speech-facilitated transaction and configured to be used in determining whether to modify the adaptation data.

Referring again to FIG. 8G, operation 876 may include operation 880 depicting facilitating acquisition of adaptation result data that is based on analysis of a recognition rate of one or more words used in the speech-facilitated transaction and configured to be used in determining whether to modify the adaptation data. For example, FIG. 4, e.g. FIG. 4E, shows acquisition of adaptation result data based analysis of a recognition rate of one or more words of the speech-facilitated transaction and configured to be used in determining whether to modify adaptation data facilitating module 480 facilitating acquisition of adaptation result data that is based on analysis of a recognition rate of one or more words used in the speech-facilitated transaction (e.g., giving orders in the context of a speech-enabled video game) and configured to be used in determining whether to modify the adaptation data (e.g., a latent dialogue act matrix).

Referring again to FIG. 8G, operation 876 may include operation 882 depicting facilitating acquisition of adaptation result data that is based on analysis of an error rate for speech used in the speech-facilitated transaction and configured to be used in determining whether to modify the adaptation data. For example, FIG. 4, e.g., FIG. 4E, shows acquisition of adaptation result data based analysis of an error rate of at least a portion of the speech-facilitated transaction and configured to be used in determining whether to modify adaptation data facilitating module 482 facilitating acquisition of adaptation result data that is based on analysis of an error rate for speech used in the speech-facilitated transaction (e.g., setting up a calendar reminder on a smartphone using voice interaction with the smartphone) and configured to be used in determining whether to modify the adaptation data (e.g., an ungrammatical utterance deletion algorithm).

Referring again to FIG. 8G, operation 876 may include operation 884 depicting facilitating acquisition of adaptation result data that is based on analysis of a repeated word rate for speech used in the speech-facilitated transaction and configured to be used in determining whether to modify the adaptation data. For example, FIG. 4, e.g., FIG. 4E, shows acquisition of adaptation result data based analysis of a repeated word rate in the speech-facilitated transaction and configured to be used in determining whether to modify adaptation data facilitating module 484 facilitating acquisition of adaptation result data that is based on analysis of a repeated word rate (e.g., how often a word is required to be repeated) for speech used in the speech-facilitated transaction (e.g., using speech to quickly create a playlist for a portable music player) and configured to be used in determining whether to modify the adaptation data (e.g., a regional dialect application algorithm).

Referring now to FIG. 8H, operation 876 may include operation 886 depicting facilitating acquisition of adaptation result data that is based on analysis of a confidence during at least one portion of the speech-facilitated transaction and configured to be used in determining whether to modify the adaptation data. For example, FIG. 4, e.g., FIG. 4F, shows acquisition of adaptation result data based analysis of a confidence rate of at least a portion of the speech-facilitated transaction and configured to be used in determining whether to modify adaptation data facilitating module 486 facilitating acquisition of adaptation result data that is based on analysis of a confidence (e.g., a correct word interpretation confidence) during at least one portion of the speech-facilitated transaction (e.g., after the user has completed speaking one sentence, but before the end of the transaction) and configured to be used in determining whether to modify the adaptation data (e.g., if the confidence numeric representation stays below a threshold level for a particular amount of time, or for a particular consecutive number of interpreted words, then the adaptation data may be modified).

Referring again to FIG. 8H, operation 876 may include operation 888 depicting facilitating acquisition of adaptation result data that is based on detected proximate utterances during the speech facilitated transaction and configured to be used in determining whether to modify the adaptation data. For example, FIG. 4, e.g., FIG. 4F, shows acquisition of adaptation result data based on detected proximate utterances during the speech-facilitated transaction and configured to be used in determining whether to modify adaptation data facilitating module 488 facilitating acquisition of adaptation result data that is based on detected proximate utterances during the speech-facilitated transaction (e.g., dictating a text message using speech to be sent via a smartphone) and configured to be used in determining whether to modify the adaptation data (e.g., an utterance ignoring algorithm).

Referring again to FIG. 8H, operation 506 may include operation 890 depicting facilitating acquisition of adaptation result data that comprises pronunciation information based on one or more words spoken during the speech-facilitated transaction and configured to be used in determining whether to modify the adaptation data. For example, FIG. 4, e.g., FIG. 4F, shows acquisition of adaptation result data comprising pronunciation information based on one or more words in speech-facilitated transaction and configured to be used in determining whether to modify adaptation data facilitating module 490 facilitating acquisition of adaptation result data that comprises pronunciation information (e.g., how a user has pronounced one or more words during the speech-facilitated transaction) based on one or more words spoken during the speech-facilitated transaction and configured to be used in determining whether to modify the adaptation data (e.g., a word and/or syllable dependency parser).

Referring again to FIG. 8H, operation 506 may include operation 892 depicting facilitating acquisition of adaptation result data that comprises frequency information for one or more words used in the speech-facilitated transaction and configured to be used in determining whether to modify the adaptation data. For example, FIG. 4, e.g., FIG. 4F, shows acquisition of adaptation result data comprising frequency information of one or more words in speech-facilitated transaction and configured to be used in determining whether to modify adaptation data facilitating module 492 facilitating acquisition of adaptation result data that comprises frequency information for one or more words used (e.g., spoken during) in the speech-facilitated transaction and configured to be used in determining whether to modify the adaptation data (e.g., instructions for replacing a word frequency table with a modified word frequency table that reflects the particular party's word usage, wherein the instructions can be modified or updated based on the frequency information and/or said frequency information's deviance from the word frequency table that is part of the adaptation data).

Referring again to FIG. 8H, operation 506 may include operation 894 depicting facilitating acquisition of adaptation result data that comprises a phonemic transcription of one or more words used in the speech-facilitated transaction and configured to be used in determining whether to modify the adaptation data. For example, FIG. 4, e.g., FIG. 4F, shows acquisition of adaptation result data comprising a phonemic transcription of one or more words in speech-facilitated transaction and configured to be used in determining whether to modify adaptation data facilitating module 494 facilitating acquisition of adaptation result data that comprises a phonemic transcription of one or more words used in the speech-facilitated transaction (e.g., unlocking a voice-activated safe with a particular phrase code) and configured to be used in determining whether to modify the adaptation data (e.g., a list of the way that the particular party pronounces ten words, e.g., four words that are part of the phrase code).

Referring again to FIG. 8H, operation 894 may include operation 896 depicting facilitating acquisition of adaptation result data that comprises a user-specific phonemic transcription of one or more words used in the speech-facilitated transaction and configured to be used in determining whether to modify the adaptation data. For example, FIG. 4, e.g., FIG. 4F, shows acquisition of adaptation result data comprising a user-specific phonemic transcription of one or more words in speech-facilitated transaction and configured to be used in determining whether to modify adaptation data facilitating module 496 facilitating acquisition of adaptation result data that comprises a user-specific phonemic transcription of one or more words used in the speech-facilitated transaction (e.g., commanding a motor vehicle to start using a voice command coupled with a detected key in the user's pocket) and configured to be used in determining whether to modify the adaptation data (e.g., a phoneme pronunciation database).

Figure 8I:
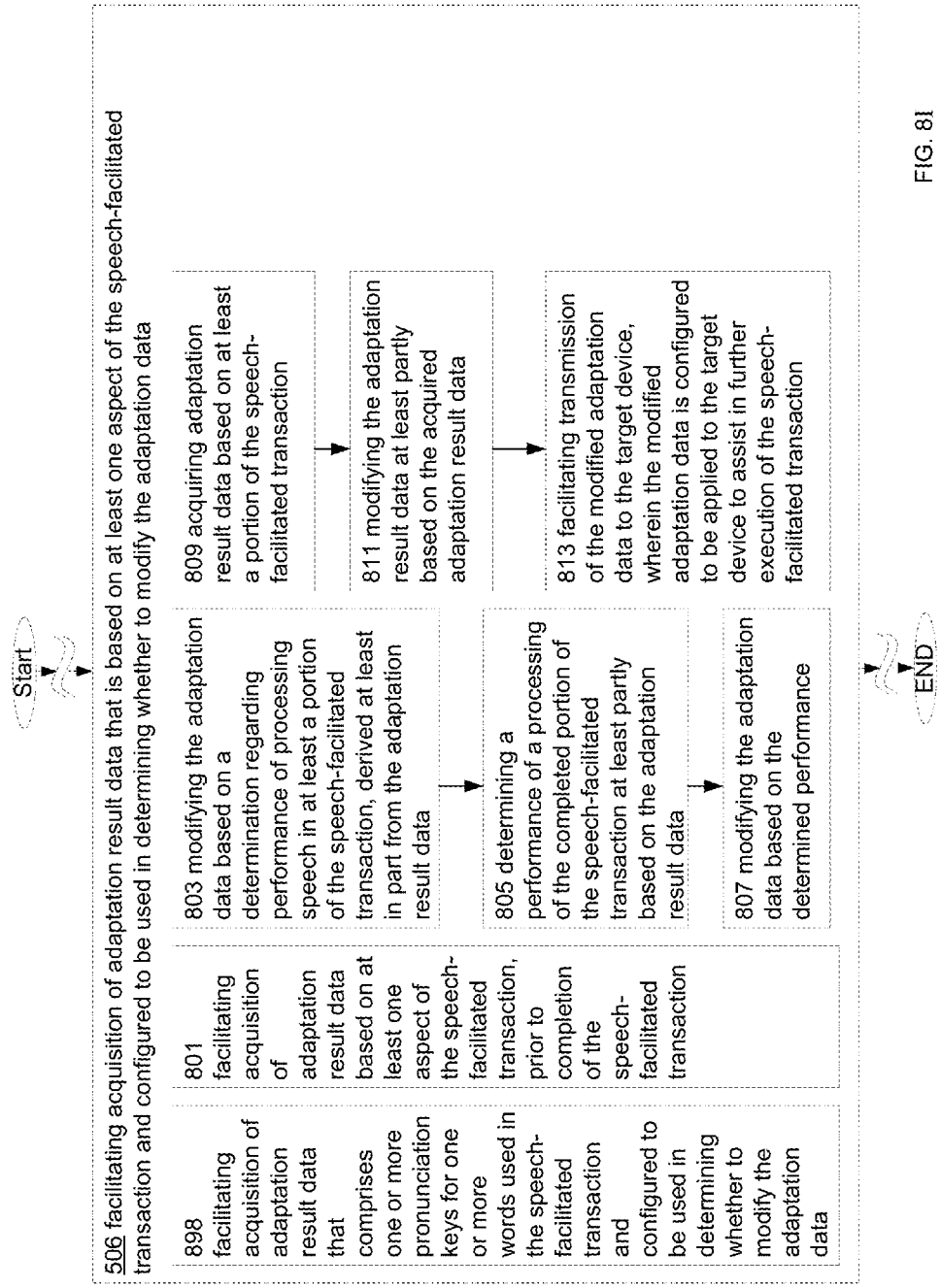
FIG. 8I is a high-level logic flowchart of a process depicting alternate implementations of the adaptation result data acquisition facilitating operation 506 of FIG. 5.

Referring now to FIG. 8I, operation 506 may include operation 898 depicting facilitating acquisition of adaptation result data that comprises one or more pronunciation keys for one or more words used in the speech-facilitated transaction and configured to be used in determining whether to modify the adaptation data. For example, FIG. 4, e.g., FIG. 4G, shows acquisition of adaptation result data comprising one or more pronunciation keys of one or more words in speech-facilitated transaction and configured to be used in determining whether to modify adaptation data facilitating module 498 facilitating acquisition of adaptation result data that comprises one or more pronunciation keys for one or more words used in the speech-facilitated transaction (e.g., ordering sushi rolls by number from an automated drive-thru window) and configured to be used in determining whether to modify the adaptation data (e.g., list of the way that the particular party pronounces ten words, e.g., the numbers zero through nine).

Referring again to FIG. 8I, operation 506 may include operation 801 depicting facilitating acquisition of adaptation result data based on at least one aspect of the speech-facilitated transaction, prior to completion of the speech-facilitated transaction. For example, FIG. 4, e.g., FIG. 4G, shows acquisition of adaptation result data based on at least one aspect of the speech-facilitated transaction facilitating prior to completion of the speech-facilitated transaction module 401 facilitating acquisition of adaptation result data (e.g., a list of one or more words whose pronunciation was detected to be different than the pronunciation stored in the pronunciation dictionary of the adaptation data) based on at least one aspect of the speech-facilitated transaction (e.g., the first two sentences of an order from an automated drive thru window), prior to completion of the speech-facilitated transaction (e.g., before the order is complete).

Referring again to FIG. 8I, operation 506 may include operation 803 depicting acquiring adaptation result data based on at least one aspect of a completed portion of the speech-facilitated transaction, prior to completion of the speech-facilitated transaction. For example, FIG. 4, e.g., FIG. 4G, shows adaptation result data based on at least one aspect of a completed portion of the speech-facilitated transaction, prior to completion of the speech-facilitated transaction acquiring module 403 acquiring adaptation result data (e.g., a correct word interpretation rate) based on at least one aspect (e.g., word interpretation) of a completed portion of the speech-facilitated transaction (e.g., the first four sentences spoken to the automated teller machine device), prior to completion of the speech-facilitated transaction (e.g., before the user's business at the automated teller machine device is completed).

Referring again to FIG. 8I, operation 506 may include operation 805 depicting determining a performance of a processing of the completed portion of the speech-facilitated transaction at least partly based on the adaptation result data. For example, FIG. 4, e.g., FIG. 4G, shows performance of processing of the completed portion of the speech-facilitated transaction at least partly based on adaptation result data determining module 405 determining a performance (e.g., determining a speed, accuracy, or other at least partially quantifiable metric) of a processing of the completed portion of the speech-facilitated transaction (e.g., the first four sentences spoken to the automated teller machine device) of a processing of the completed portion (e.g., the first four sentences spoken to the automated teller machine device) of the speech-facilitated transaction at least partly based on the adaptation result data (e.g., the higher the correct word interpretation rate, the better the performance is determined to be, along with one or more other factors)

Referring again to FIG. 8I, operation 506 may include operation 807 depicting modifying the adaptation data based on the determined performance. For example, FIG. 4, e.g., FIG. 4G, shows adaptation data modifying based on determined performance module 407 modifying the adaptation data (e.g., modifying at least one portion of a phrase completion algorithm) based on the determined performance.

Referring again to FIG. 8I, operation 506 may include operation 809 depicting acquiring adaptation result data based on at least a portion of the speech-facilitated transaction. For example, FIG. 4, e.g., FIG. 4G, shows adaptation result data based on at least a portion of the speech-facilitated transaction acquiring module 409 acquiring (e.g., receiving, generating, creating, retrieving, or otherwise obtaining) adaptation result data (e.g., a list of one or more times when an attempted interpretation of a word ran into an upper bound of an algorithm used to process the speech) based on at least a portion of the speech-facilitated transaction (e.g., the portion that caused the algorithm to generate a value at an upper bound).

Referring again to FIG. 8I, operation 506 may include operation 811 depicting modifying the adaptation data at least partly based on the acquired adaptation result data. For example, FIG. 4, e.g., FIG. 4G, shows adaptation data modifying partly based on acquired adaptation result data module 411 modifying the adaptation data (e.g., noise level dependent filtration algorithm) at least partly based on the acquired adaptation result data (e.g., the list of the one or more times when an upper bound of a parameter of the noise level dependent filtration algorithm was reached).

Referring again to FIG. 8I, operation 506 may include operation 813 depicting facilitating transmission of the modified adaptation data to the target device, wherein the modified adaptation data is configured to be applied to the target device to assist in further execution of the speech-facilitated transaction. For example, FIG. 4, e.g., FIG. 4G, shows modified adaptation data configured to be applied to target device transmission to target device facilitating module 413 facilitating transmission of the modified adaptation data (e.g., the list of the one or more times when the upper bound of the parameter of the noise level dependent filtration algorithm was reached), wherein the modified adaptation data (e.g., the noise level dependent filtration algorithm with a modified upper bound of a parameter) is configured to be applied to the target device (e.g., received and incorporated into at least a portion of the logic, e.g., hardware or software, of the target device) to assist in further execution of the speech-facilitated transaction (e.g., this all takes place before the end of the speech-facilitated transaction, and the modified adaptation data is used for the remainder of the speech-facilitated transaction after the modified adaptation data is received).

Figure 4H:
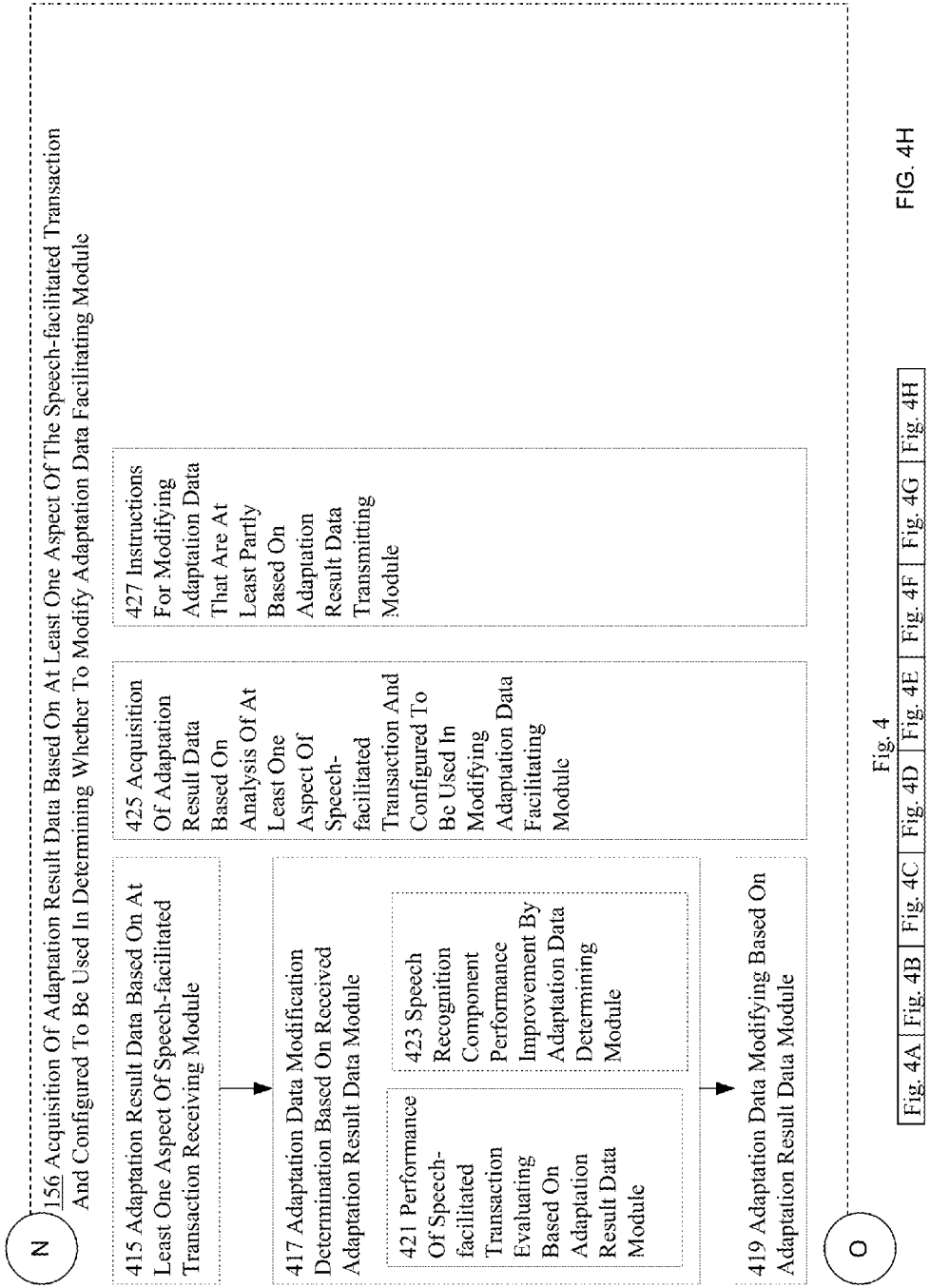
Figure 8J:
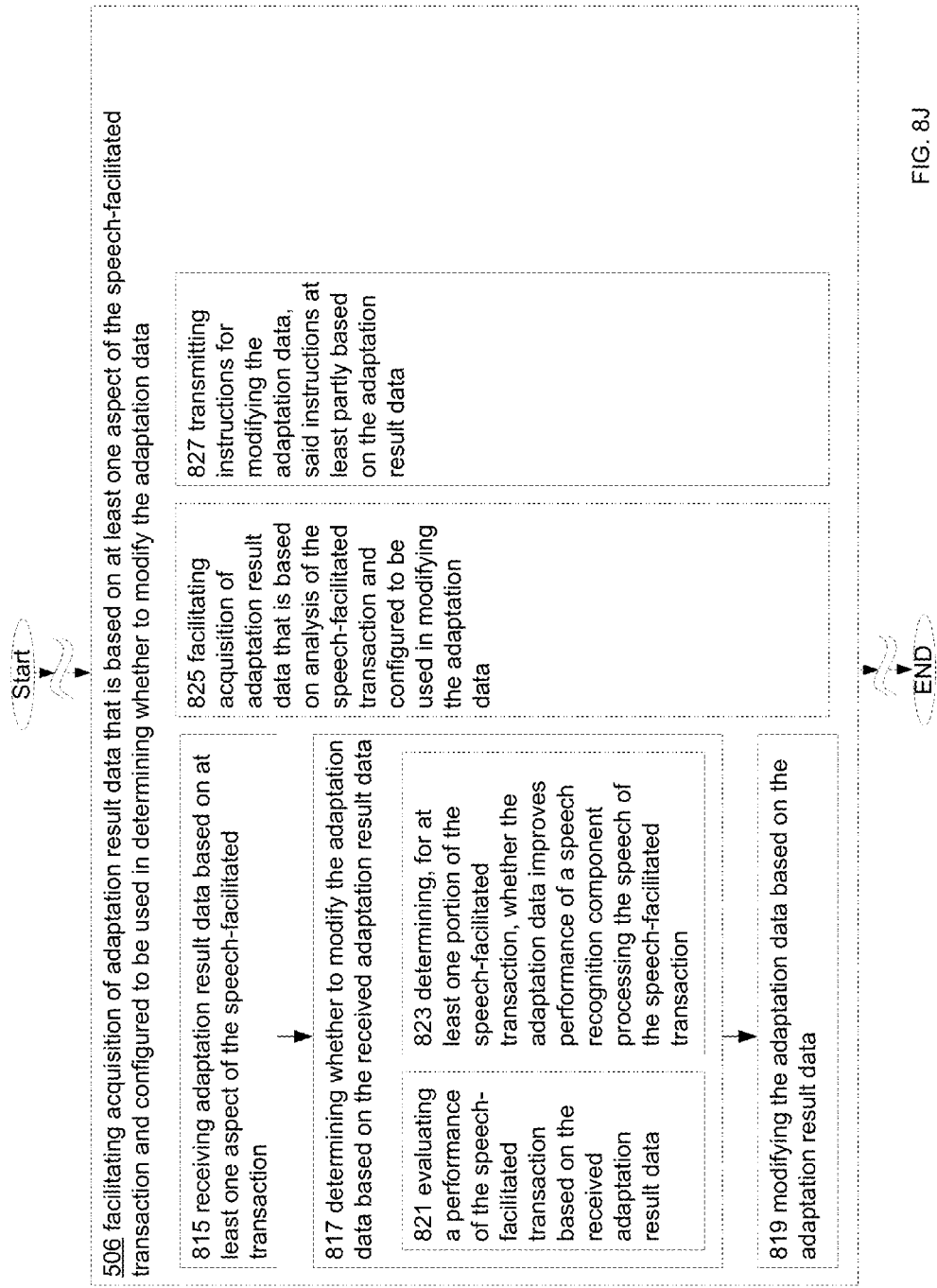
FIG. 8J is a high-level logic flowchart of a process depicting alternate implementations of the adaptation result data acquisition facilitating operation 506 of FIG. 5.

Referring now to FIG. 8J, operation 506 may include operation 815 depicting receiving adaptation result data based on at least one aspect of the speech-facilitated transaction. For example, FIG. 4, e.g., FIG. 4H, shows adaptation result data based on at least one aspect of speech-facilitated transaction receiving module 415 receiving adaptation result data (e.g., a calculated word interpretation confidence rate) based on at least one aspect of the speech-facilitated transaction (e.g., interpretation of one or more words spoken by the particular party).

Referring again to FIG. 8J, operation 506 may include operation 817 depicting determining whether to modify the adaptation data based on the received adaptation result data. For example, FIG. 4, e.g., FIG. 4H, shows adaptation data modification determination based on received adaptation result data module 417 determining whether to modify the adaptation data (e.g., a sentence diagramming path selection algorithm) based on the received adaptation result data (e.g., the calculated word interpretation confidence rate)

Referring again to FIG. 8J, operation 506 may include operation 819 depicting modifying the adaptation data based on the adaptation result data. For example, FIG. 4, e.g., FIG. 4H, shows adaptation data modifying based on adaptation result data module 419 modifying the adaptation data (e.g., the sentence diagramming path selection algorithm) based on the adaptation result data (e.g., the calculated word interpretation confidence rate).

Referring again to FIG. 8J, operation 817 may include operation 821 depicting evaluating a performance of the speech-facilitated transaction based on the received adaptation result data. For example, FIG. 4, e.g., FIG. 4H, shows performance of speech-facilitated transaction evaluating based on adaptation result data module 421 evaluating a performance (e.g., accuracy, speed, ease, or other at least partially quantifiable metric) of the speech-facilitated transaction (e.g., turning on the heated seats using an in-vehicle speech command system) based on the received adaptation result data (e.g., a list of one or more words interpreted by the system and the audio data from which the one or more words were interpreted is used to calculate performance).

Referring again to FIG. 8J, operation 817 may include operation 823 depicting determining, for at least one portion of the speech-facilitated transaction, whether the adaptation data improved performance of a speech recognition component processing the speech of the speech-facilitated transaction. For example, FIG. 4, e.g., FIG. 4H, shows speech recognition component performance improvement by adaptation data determining module 423 determining (e.g., separately calculating, using a copy of a speech recognition component for which the adaptation data has not been applied), for at least one portion of the speech facilitated transaction, whether the adaptation data improved performance (e.g., speed, accuracy, and/or ease) of a speech recognition component processing the speech of the speech-facilitated transaction (e.g., ordering a hot fudge sundae from an automated voice-enabled ice cream machine).

Referring again to FIG. 8J, operation 506 may include operation 825 depicting facilitating acquisition of adaptation result data that is based on analysis of the speech-facilitated transaction and configured to be used in modifying the adaptation data. For example, FIG. 4, e.g., FIG. 4H, shows acquisition of adaptation result data based on analysis of at least one aspect of speech-facilitated transaction and configured to be used in modifying adaptation data facilitating module 425 facilitating acquisition (e.g., generating) of adaptation result data (e.g., instructions for changing branches of a phrase completion tree) that is based on analysis of the speech-facilitated transaction (e.g., analyzing which phonemes and words were properly analyzed) and configured to be used in modifying the adaptation data (e.g., changing one or more branches of the phrase completion tree).

Referring again to FIG. 8J, operation 506 may include operation 827 depicting transmitting instructions for modifying the adaptation data, said instructions at least partly based on the adaptation result data. For example, FIG. 4, e.g., FIG. 4H, shows instructions for modifying adaptation data that are at least partly based on adaptation result data transmitting module 427 transmitting instructions for modifying the adaptation data (e.g., "change the lower bound of the third parameter of the emotion-based pronunciation adjustment algorithm"), said instructions at least partly based on the adaptation result data (e.g., the analyzed data that indicates that words commonly pronounced with an accent, e.g., "harbor" and "chopper" in Boston, have been misinterpreted).

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory)

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "capable of being operably coupled", to each other to achieve the desired functionality. Specific examples of operably coupled include but are not limited to physically mateable and/or physically interacting components and/or wirelessly interactable and/or wirelessly interacting components and/or logically interacting and/or logically interactable components.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. In addition, although various operational flows are presented in a sequence(s), it should be understood that the various operations may be performed in other orders than those that are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A device comprising:
    a memory; and
    a processor that is operably coupled to the memory, said processor designed to be configured as, at one or more various optionally cotemporaneous times,
        an adaptation data correlated to at least one particular party speech aspect managing module configured to manage adaptation data, wherein the adaptation data is at least partly based on at least one speech interaction of a particular party;
        an adaptation data configured to be applied to a target device transmission facilitating module, that facilitates transmission of the adaptation data to the target device when there is an indication of a speech-facilitated transaction between the target device and the particular party, to assist in execution of the speech-facilitated transaction; and
        an acquisition of adaptation result data facilitating module, said adaptation result data configured to be used in determining whether to modify the adaptation data, and said adaptation result data based on at least one aspect of the speech-facilitated transaction.

2. The device of claim 1, wherein said adaptation data correlated to at least one particular party speech aspect managing module comprises:
    a location of adaptation data reference storing module; and
    a location of adaptation data providing at particular intervals module.

3. The device of claim 1, wherein said adaptation data correlated to at least one particular party speech aspect managing module comprises:
    an adaptation data managing module, wherein said adaptation data includes an authorization to retrieve data from a particular location.

4. The device of claim 1, wherein said adaptation data correlated to at least one particular party speech aspect managing module comprises:
    an adaptation data managing module, wherein said adaptation data includes link data that links particular party pronunciation of one or more phonemes to one or more concepts.

5. The device of claim 1, wherein said adaptation data correlated to at least one particular party speech aspect managing module comprises:
    an adaptation data managing module configured to manage adaptation data that includes one or more words to which a weight based upon a statistical prediction is assigned to the one or more words.

6. The device of claim 5, wherein said adaptation data managing module configured to manage adaptation data that includes one or more words to which a weight based upon a statistical prediction is assigned to the one or more words comprises:
    an adaptation data managing module configured to manage adaptation data that includes one or more words to which a weight based upon a frequency of appearance of the one or more words is assigned to the one or more words.

7. The device of claim 5, wherein said adaptation data managing module configured to manage adaptation data that includes one or more words to which a weight based upon a statistical prediction is assigned to the one or more words comprises:
    an adaptation data managing module configured to manage adaptation data that includes one or more words to which a weight based upon a phrase completion statistical prediction is assigned to the one or more words.

8. The device of claim 1, wherein said adaptation data configured to be applied to the target device transmission facilitating module, that facilitates transmission of the adaptation data to the target device when there is an indication of a speech-facilitated transaction between the target device and the particular party, to assist in execution of the speech-facilitated transaction comprises:
    an instruction for transmitting adaptation data configured to be applied to the target device for assistance in execution of the speech-facilitated transaction transmitting module.

9. The device of claim 1, wherein said adaptation data configured to be applied to the target device transmission facilitating module, that facilitates transmission of the adaptation data to the target device when there is an indication of a speech-facilitated transaction between the target device and the particular party, to assist in execution of the speech-facilitated transaction comprises:
    an adaptation data configured to be received by the target device broadcasting module.

10. The device of claim 9, wherein said an adaptation data configured to be received by the target device broadcasting module comprises:
    an adaptation data configured to be received by the target device broadcasting when the target device is in a capable range module.

11. The device of claim 1, wherein said adaptation data configured to be applied to the target device transmission facilitating module, that facilitates transmission of the adaptation data to the target device when there is an indication of a speech-facilitated transaction between the target device and the particular party, to assist in execution of the speech-facilitated transaction comprises:
    an adaptation data configured to be applied to the target device transmission facilitating module configured to facilitate transmission to the target device upon receipt of a signal indicating that the particular party is within a particular proximity to the target device.

12. The device of claim 1, wherein said adaptation data configured to be applied to the target device transmission facilitating module, that facilitates transmission of the adaptation data to the target device when there is an indication of a speech-facilitated transaction between the target device and the particular party, to assist in execution of the speech-facilitated transaction comprises:
- an adaptation data configured to be applied to the target device transmission facilitating module configured to facilitate transmission of the adaptation data to the target device upon receipt of an indication that a particular device associated with the particular party interacts with the target device.

13. The device of claim 12, wherein said adaptation data configured to be applied to the target device transmission facilitating module configured to facilitate transmission of the adaptation data to the target device upon receipt of an indication that a particular device associated with the particular party interacts with the target device comprises:
- an adaptation data configured to be applied to the target device transmission facilitating module configured to facilitate transmission of the adaptation data to the target device when the particular device associated with the particular party is coupled to the target device.

14. The device of claim 1, wherein said adaptation data configured to be applied to the target device transmission facilitating module, that facilitates transmission of the adaptation data to the target device when there is an indication of a speech-facilitated transaction between the target device and the particular party, to assist in execution of the speech-facilitated transaction comprises:
- an adaptation data configured to be applied to the target device transmission facilitating module configured to facilitate transmission of the adaptation data to the target device when there is an indication of a speech-facilitated transaction between the target device and the particular party.

15. The device of claim 1, wherein said acquisition of adaptation result data facilitating module, said adaptation result data configured to be used in determining whether to modify the adaptation data, and said adaptation result data based on at least one aspect of the speech-facilitated transaction comprises:
- an adaptation result data generating module configured to generate adaptation result data that is based on at least one aspect of the speech-facilitated transaction and configured to be used in determination of whether to modify the adaptation data.

16. The device of claim 15, wherein said adaptation result data generating module configured to generate adaptation result data that is based on at least one aspect of the speech-facilitated transaction and configured to be used in determination of whether to modify the adaptation data comprises:
- an adaptation result data generating module configured to generate adaptation result data that is based on a result of the speech-facilitated transaction and configured to be used in determining whether to modify the adaptation data.

17. The device of claim 16, wherein said adaptation result data generating module configured to generate adaptation result data that is based on a result of the speech-facilitated transaction and configured to be used in determining whether to modify the adaptation data comprises:
- a speech-facilitated transaction observing module;
- an observed speech-facilitated transaction result-based adaptation result data creating module; and
- a created adaptation result data-based adaptation data modification determining module configured to determine whether to modify the adaptation data based on the created adaptation result data.

18. The device of claim 17, wherein said speech-facilitated transaction observing module comprises:
- a target device or particular party operation during speech-facilitated transaction monitoring module configured to monitor at least one operation carried out by one or more of the target device and the particular party during the speech-facilitated transaction.

19. The device of claim 18, wherein said target device or particular party operation during speech-facilitated transaction monitoring module comprises:
- a number of times the target device consecutively requests a same input monitoring module.

20. The device of claim 1, wherein said acquisition of adaptation result data facilitating module, said adaptation result data configured to be used in determining whether to modify the adaptation data, and said adaptation result data based on at least one aspect of the speech-facilitated transaction comprises:
- a data regarding speech-facilitated transaction receiving module; and
- a received data into adaptation result data based on at least one aspect of speech-facilitated transaction processing module configured to process the received data into adaptation result data that is based on at least one aspect of the speech-facilitated transaction.

21. The device of claim 1, wherein said acquisition of adaptation result data facilitating module, said adaptation result data configured to be used in determining whether to modify the adaptation data, and said adaptation result data based on at least one aspect of the speech-facilitated transaction comprises:
- an adaptation result data receiving from a further device module.

22. The device of claim 21, wherein said adaptation result data receiving from a further device module comprises:
- an adaptation result data receiving from a further device configured to communicate with the target device module.

23. The device of claim 1, wherein said acquisition of adaptation result data facilitating module, said adaptation result data configured to be used in determining whether to modify the adaptation data, and said adaptation result data based on at least one aspect of the speech-facilitated transaction comprises:
- an acquisition of adaptation result data facilitating module configured to facilitate acquisition of adaptation result data that is based on particular party feedback that regards the speech-facilitated transaction.

24. The device of claim 23, wherein said acquisition of adaptation result data facilitating module configured to facilitate acquisition of adaptation result data that is based on particular party feedback that regards the speech-facilitated transaction comprises:
- an acquisition of adaptation result data based on particular party feedback given to target device and configured to be used in determining whether to modify adaptation data facilitating module configured to facilitate acquisition of adaptation result data that is based on particular party feedback given to the target device that regards the speech-facilitated transaction.

25. The device of claim 23, wherein said acquisition of adaptation result data facilitating module configured to facilitate acquisition of adaptation result data that is based on particular party feedback that regards the speech-facilitated transaction comprises:
- a particular party feedback that regards the speech-facilitated transaction requesting module;
- a particular party feedback as adaptation result data receiving module configured to receive adaptation result data that includes the particular party feedback; and
- an adaptation result data-based adaptation data modification determining module configured to determine whether to modify the adaptation data based at least in part on the received adaptation result data.

26. The device of claim 25, wherein said particular party feedback that regards the speech-facilitated transaction requesting module comprises:
- a request for particular party feedback presenting module; and
- a particular party feedback receiving in response to request module.

27. The device of claim 25, wherein said particular party feedback as adaptation result data receiving module configured to receive adaptation result data that includes the particular party feedback comprises:
- a particular party authored feedback as adaptation result data receiving module configured to receive adaptation result data that includes feedback authored by the particular party regarding the speech-facilitated transaction from the target device.

28. The device of claim 1, wherein said acquisition of adaptation result data facilitating module, said adaptation result data configured to be used in determining whether to modify the adaptation data, and said adaptation result data based on at least one aspect of the speech-facilitated transaction comprises:
- a result of a survey that regards the speech-facilitated transaction collecting module.

29. The device of claim 1, wherein said acquisition of adaptation result data facilitating module, said adaptation result data configured to be used in determining whether to modify the adaptation data, and said adaptation result data based on at least one aspect of the speech-facilitated transaction comprises:
- an acquisition of adaptation result data facilitating module configured to facilitate acquisition of adaptation result data that is based on analysis of the speech-facilitated transaction.

30. The device of claim 29, wherein said acquisition of adaptation result data facilitating module comprises:
- an acquisition of adaptation result data facilitating module configured to facilitate acquisition of adaptation result data that is based on analysis of an error rate of at least a portion of the speech-facilitated transaction.

31. The device of claim 29, wherein said acquisition of adaptation result data facilitating module comprises:
- an acquisition of adaptation result data facilitating module configured to facilitate acquisition of adaptation result data that is based on analysis of a repeated word rate of at least a portion of the speech-facilitated transaction.

32. The device of claim 29, wherein said acquisition of adaptation result data facilitating module comprises:
- an acquisition of adaptation result data facilitating module configured to facilitate acquisition of adaptation result data that is based on detected proximate utterances during the speech-facilitated transaction.

33. The device of claim 1, wherein said acquisition of adaptation result data facilitating module, said adaptation result data configured to be used in determining whether to modify the adaptation data, and said adaptation result data based on at least one aspect of the speech-facilitated transaction comprises:
- an acquisition of adaptation result data facilitating module configured to facilitate acquisition of adaptation result data that includes frequency information of one or more words in the speech-facilitated transaction.

34. The device of claim 1, wherein said acquisition of adaptation result data facilitating module, said adaptation result data configured to be used in determining whether to modify the adaptation data, and said adaptation result data based on at least one aspect of the speech-facilitated transaction comprises:
- an acquisition of adaptation result data facilitating prior to completion of the speech-facilitated transaction module.

35. The device of claim 1, wherein said acquisition of adaptation result data facilitating module, said adaptation result data configured to be used in determining whether to modify the adaptation data, and said adaptation result data based on at least one aspect of the speech-facilitated transaction comprises:
- an adaptation result data based on at least a portion of the speech-facilitated transaction acquiring module;
- an adaptation data modification module, said modification at least partly based on the acquired adaptation result data; and
- a modified adaptation data facilitating module, wherein the modified adaptation data is configured to be transmitted to target device.

36. The device of claim 1, wherein said acquisition of adaptation result data facilitating module, said adaptation result data configured to be used in determining whether to modify the adaptation data, and said adaptation result data based on at least one aspect of the speech-facilitated transaction comprises:
- an acquisition of adaptation result data configured to be used in modifying modification of adaptation data facilitating module.

37. The device of claim 1, wherein said acquisition of adaptation result data facilitating module, said adaptation result data configured to be used in determining whether to modify the adaptation data, and said adaptation result data based on at least one aspect of the speech-facilitated transaction comprises:
- instructions for modifying adaptation data transmitting module configured to transmit instructions for modification of the adaptation data.

38. A device comprising:
- a memory; and
- a processor that is operably coupled to the memory, said processor designed to be configured as, at one or more various optionally cotemporaneous times,
  - an adaptation data correlated to at least one particular party speech aspect managing module configured to manage adaptation data, wherein the adaptation data is at least partly based on at least one speech interaction of a particular party;
  - an adaptation data transmission facilitating module that is configured to be active when there is an indication of a speech-facilitated transaction between a target device and the particular party; and
  - an adaptation result data generating module, said adaptation result data configured to be generated based on a result of the speech-facilitated transaction, and configured to be used in a determination of whether to modify the adaptation data, wherein said adaptation result data generating module includes:

a portion of speech interpreting module configured to interpret a portion of speech generated by the particular party;

a differently-interpreted monitoring module configured to monitor a number of times that the target device interpreted the at least a portion of speech generated by the particular party differently than a particular device interpreted the at least the portion of speech generated by the particular party.

* * * * *